(12) United States Patent
Yin et al.

(10) Patent No.: US 8,934,424 B2
(45) Date of Patent: Jan. 13, 2015

(54) DEVICES FOR RECONFIGURING A SUBFRAME ALLOCATION

(75) Inventors: Zhanping Yin, Vancouver, WA (US); Shohei Yamada, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 519 days.

(21) Appl. No.: 13/248,777

(22) Filed: Sep. 29, 2011

(65) Prior Publication Data

US 2013/0083736 A1 Apr. 4, 2013

(51) Int. Cl.
*H04W 4/00* (2009.01)
*H04W 72/04* (2009.01)
*H04W 88/08* (2009.01)

(52) U.S. Cl.
CPC .......... *H04W 72/0446* (2013.01); *H04W 88/08* (2013.01)
USPC ....................................................... 370/329

(58) Field of Classification Search
USPC .................. 370/277–282, 310–350, 431–460
See application file for complete search history.

(56) References Cited

U.S. PATENT DOCUMENTS

| | | | | |
|---|---|---|---|---|
| 8,209,576 B2 * | 6/2012 | Zhang | | 714/748 |
| 8,233,413 B2 * | 7/2012 | Zhang et al. | | 370/280 |
| 8,503,328 B2 * | 8/2013 | Tian et al. | | 370/254 |
| 8,605,676 B2 * | 12/2013 | Xin | | 370/330 |
| 2009/0135748 A1 | 5/2009 | Lindoff et al. | | |
| 2009/0201838 A1 | 8/2009 | Zhang et al. | | |
| 2009/0249153 A1 | 10/2009 | Zhang | | |
| 2009/0274071 A1 | 11/2009 | Ramesh et al. | | |
| 2010/0189081 A1 | 7/2010 | Zhang et al. | | |
| 2010/0238847 A1 | 9/2010 | Suo et al. | | |
| 2010/0246456 A1 | 9/2010 | Suo et al. | | |
| 2010/0278083 A1 | 11/2010 | Kwak et al. | | |
| 2011/0032855 A1 | 2/2011 | Kim et al. | | |
| 2011/0211503 A1 * | 9/2011 | Che et al. | | 370/280 |

FOREIGN PATENT DOCUMENTS

| | | |
|---|---|---|
| WO | 2009/035399 | 3/2009 |
| WO | 2011/044494 | 4/2011 |
| WO | 2012/046505 | 4/2012 |

OTHER PUBLICATIONS

Sharp, "Fast Uplink-Downlink Re-configuration with Traffic Adaptation by PHY Layer Signaling, " 3GPP TSG-RAN WG1 #66, R1-112300, Aug. 2011.

U.S. Appl. No. 13/208,529, filed Aug. 12, 2011, Zhanping Yin.

(Continued)

*Primary Examiner* — Kwang B Yao
*Assistant Examiner* — Juvena Loo
(74) *Attorney, Agent, or Firm* — Austin, Rapp & Hardman

(57) ABSTRACT

An evolved Node B (eNB) for reconfiguring a subframe allocation is described. The eNB includes a processor and instructions stored in memory that is in electronic communication with the processor. The eNB determines whether to adjust a subframe allocation. If it is determined to adjust the subframe allocation, then the eNB determines whether to adjust the subframe allocation with a radio resource control (RRC) reconfiguration or a physical (PHY) layer reconfiguration. The eNB also adjusts the subframe allocation for the PHY layer reconfiguration. The eNB further adjusts the subframe allocation according to a standard configuration for the RRC reconfiguration.

6 Claims, 23 Drawing Sheets

(56) References Cited

OTHER PUBLICATIONS

CATT, Ericsson, ST-Ericsson, "New Study Item Proposal for Further Enhancements to LTE TDD for DL-UL Interference Management and Traffic Adaptation," 3GPP TSG-RAN Meeting #51, RP-110450, Mar. 2010.

CMCC, "Application Scenario of Dynamic UL/DL Asymmetry for TDD," 3GPP TSG-RAN WG1 #65, R1-111778, May 2011.

ZTE, "Support to Live-Change of Downlink-Uplink Allocation Ratio in LTE/TDD," 3GPP TSG RAN WG1 Meeting #52bis, R1-081415, Apr. 2008.

3GPP TS 36.211 V10.2.0, "Evolved Universal Terrestrial Radio Access (E-UTRA); Physical Channels and Modulation (Release 10)," Jun. 2011.

3GPP TS 36.213 V10.2.0, "Evolved Universal Terrestrial Radio Access (E-UTRA); Physical Layer Procedures (Release 10)," Jun. 2011.

3GPP TS 36.331 V10.2.0, "Evolved Universal Terrestrial Radio Access (E-UTRA); Radio Resource Control (RRC); Protocol Specification (Release 10)," Jun. 2011.

3GPP TS 36.212 V10.2.0, "Evolved Universal Terrestrial Radio Access (E-UTRA); Multiplexing and Channel Coding (Release 10)," Jun. 2011.

U.S. Appl. No. 13/360,572, filed Jan. 27, 2012, Zhanping Yin et al.

Email Discussion Rapporteur (CATT), "Summary of Email Discussion on Simulation Assumptions for Study on Further Enhancements to LTE for DL-UL Interference Management and Traffic Adaptation," 3GPP TSG RAP WG1 Meeting #66, R1-112884, Aug. 2011.

RAN1 Chairman, RAN4 Chairman, "Work Plan for Rel-11 SI FS_LTE_TDD_eIMTA," 3GPP TSG RAN Meeting #54, RP-111755, Dec. 2011.

CMCC, "Further Discussion on UL/DL Asymmetry for TDD System," 3GPP TSG-RAN WG1 #66, R1-112590, Aug. 2011.

Sharp, "Fast Uplink-Downlink Re-Configuration with Traffic Adaptation by PHY Layer Signaling," 3GPP TSG-RAN WG1 #66, R1-112487, Aug. 2011.

Samsung, "Preliminary Evaluation of TDD UL-DL Reconfiguration Performance," 3GPP TSG RAN WG1 #66, R1-112525, Aug. 2011.

International Search Report issued for International Application No. PCT/JP2012/005126 on Oct. 30, 2012.

* cited by examiner

DEVICES FOR RECONFIGURING A SUBFRAME ALLOCATION

TECHNICAL FIELD

The present disclosure relates generally to communication systems. More specifically, the present disclosure relates to devices for reconfiguring a subframe allocation.

BACKGROUND

Wireless communication devices have become smaller and more powerful in order to meet consumer needs and to improve portability and convenience. Consumers have become dependent upon wireless communication devices and have come to expect reliable service, expanded areas of coverage, and increased functionality. A wireless communication system may provide communication for a number of wireless communication devices, each of which may be serviced by a base station. A base station may be a fixed station that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
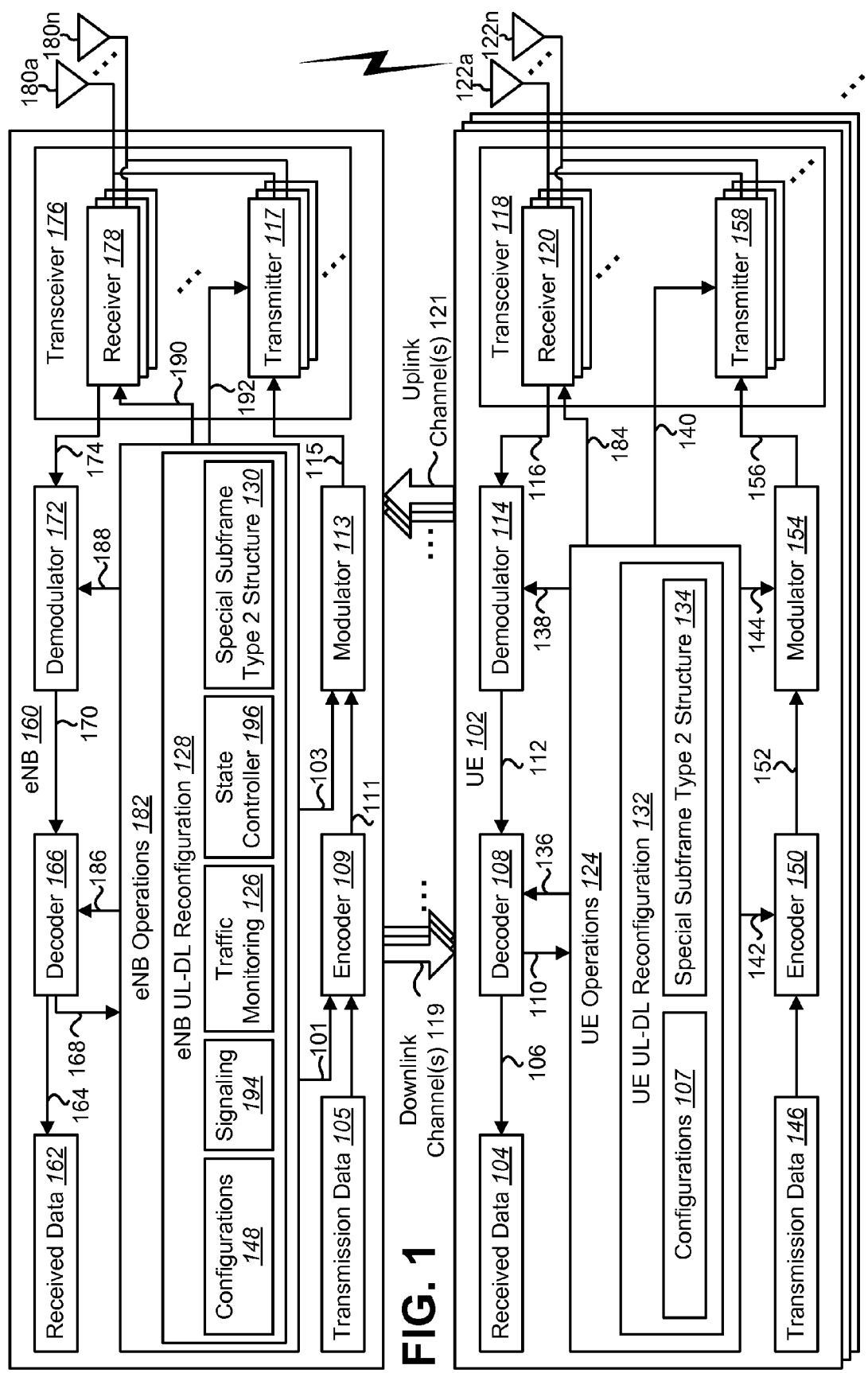
FIG. 1 is a block diagram illustrating one configuration of an evolved Node B (eNB) and one or more User Equipments (UEs) in which systems and methods for reconfiguring a subframe allocation may be implemented.

An evolved Node B (eNB) for reconfiguring a subframe allocation is disclosed. The eNB includes a processor and instructions stored in memory that is in electronic communication with the processor. The eNB determines whether to adjust a subframe allocation. If it is determined to adjust the subframe allocation, the eNB determines whether to adjust the subframe allocation with a radio resource control (RRC) reconfiguration or a physical (PHY) layer reconfiguration. The eNB adjusts the subframe allocation for the PHY layer reconfiguration. The eNB also adjusts the subframe allocation according to a standard configuration for the RRC reconfiguration.

Determining whether to adjust the subframe allocation, determining whether to adjust the subframe allocation with the RRC reconfiguration or the PHY layer reconfiguration, adjusting the subframe allocation for the PHY layer reconfiguration and adjusting the subframe allocation according to a standard configuration for the RRC reconfiguration may include entering a state with a standard uplink-downlink (UL-DL) configuration. They also may include initializing a counter and determining whether to allocate an additional downlink subframe. They may further include transitioning to a standard UL-DL configuration with one or more additional downlink subframes if possible if it is determined to allocate the additional downlink subframe.

If it is determined to not allocate the additional downlink subframe, then the eNB may also determine whether to allocate an additional uplink subframe based on a traffic load. If it is determined to allocate the additional uplink subframe, the eNB may determine whether the counter is less than a maximum allowed number of special subframe type 2 subframes. If it is determined that the counter is less than the maximum allowed number of special subframe type 2 subframes, the eNB may transition to a state with an additional special subframe type 2 and increment the counter.

If it is determined that the counter is not less than the maximum allowed number of special subframe type 2 subframes, then the eNB may determine whether an uplink subframe can be allocated by RRC reconfiguration. The eNB may also transition to a standard UL-DL configuration with one or more additional uplink subframes if the uplink subframe can be allocated by RRC reconfiguration.

If it is determined to not allocate the additional uplink subframe, then the eNB may determine whether the counter has a value greater than zero. If the counter has a value greater than zero, then the eNB may determine whether the number of special subframe type 2 subframes can be reduced. If the number of subframe type 2 subframes can be reduced, then the eNB may transition to a state with fewer special subframe type 2 subframes and decrement the counter.

Adjusting the subframe allocation for the PHY layer reconfiguration may include determining whether to add or remove a special subframe type 2. It may also include adding the special subframe type 2 and starting a timer if it is determined to add the special subframe type 2. It may further include removing the special subframe type 2 if it is determined to remove the special subframe type 2.

If it is determined to add the special subframe type 2, then the eNB may clear another timer, freeze the other timer or continue the other timer. If it is determined to remove the special subframe type 2, then the eNB may clear the timer, start another timer, resume the other timer or continue the other timer.

Determining whether to adjust the subframe allocation may be based on a traffic load. Adjusting the subframe allocation for the PHY layer reconfiguration and adjusting the subframe allocation according to the standard configuration for the RRC reconfiguration may include transitioning between states. Adjusting the subframe allocation according to the standard configuration for the RRC reconfiguration may be based on a timer. The eNB may be initialized in favor of downlink allocation.

A User Equipment (UE) for reconfiguring a subframe allocation is also described. The UE includes a processor and instructions stored in memory that is in electronic communication with the processor. The UE receives physical (PHY) layer signaling in a downlink subframe where an uplink (UL) grant is not permitted in standard configurations. The UE also determines whether an error is detected. The UE further converts a downlink subframe to a special subframe type 2 based on the PHY layer signaling if no error is detected.

Determining whether an error is detected may be based on a set of downlink subframes that are allowed to be converted to special subframe type 2 subframes. Determining whether an error is detected may be based on a set of allowed transitional states.

A communication device for reconfiguring a subframe allocation is also disclosed. The communication device includes a processor and instructions stored in memory that is in electronic communication with the processor. The communication device reconfigures a subframe allocation based on a definition. The definition includes a set of allowed downlink subframes for conversion, orders for subframe conversion, a configuration of transitional states and a set of allowed transitional states. The communication device may be an evolved Node B (eNB). The communication device may be a User Equipment (UE).

A method for reconfiguring a subframe allocation is also disclosed. The method includes determining whether to adjust a subframe allocation. If it is determined to adjust the subframe allocation, the method includes determining whether to adjust the subframe allocation with a radio resource control (RRC) reconfiguration or a physical (PHY) layer reconfiguration. The method also includes adjusting the subframe allocation for the PHY layer reconfiguration. The method additionally includes adjusting the subframe allocation according to a standard configuration for the RRC reconfiguration.

A method for reconfiguring a subframe allocation on a User Equipment (UE) is also disclosed. The method includes receiving physical (PHY) layer signaling in a downlink subframe where an uplink (UL) grant is not permitted in standard configurations. The method also includes determining whether an error is detected. The method further includes converting a downlink subframe to a special subframe type 2 based on the PHY layer signaling if no error is detected.

A method for reconfiguring a subframe allocation on a communication device is also disclosed. The method includes reconfiguring a subframe allocation based on a definition. The definition includes a set of allowed downlink subframes for conversion, orders for subframe conversion, a configuration of transitional states and a set of allowed transitional states.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP Long Term Evolution (LTE), LTE-Advanced (LTE-A) and other standards (e.g., 3GPP Releases 8, 9, 10 and/or 11). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a User Equipment (UE), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a User Equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device (e.g., UE) and/or a base station (e.g. eNB).

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands to be used for communication between a Node B (e.g., eNodeB) and a UE. "Configured cells" are those cells of which the UE is aware and is allowed by a Node B (e.g., eNB) to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed herein may be used to dynamically change an uplink-downlink (UL-DL) allocation or configuration. In LTE time-division duplexing (TDD), the same frequency band may be used for both uplink and downlink signals. To achieve different downlink and uplink traffic ratios, seven UL-DL configurations are specified in 3GPP specifications (e.g., 3GPP TS 36.211). These allocations can allocate between 40% and 90% of subframes to downlink signals.

According to current specifications (e.g., LTE Releases 8, 9 and 10), a system information change procedure is used to change the UL-DL configuration. This procedure has long delay, and requires a cold system restart (e.g., all UEs in a system cannot transmit and receive for a certain period of time in order to disconnect the uplink-downlink associations of the old configuration and set up new associations). It should be noted that a subframe association may be referred to as an "uplink-downlink association", which may include uplink to downlink subframe associations and/or downlink to uplink subframe associations. Examples of associations include association of a downlink subframe physical downlink control channel (PDCCH) to uplink power control in an uplink subframe, association of a downlink subframe physical downlink control channel (PDCCH) to physical uplink shared channel (PUSCH) allocation in an uplink subframe, associations of acknowledgement and negative acknowledgement (ACK/NACK) feedback on uplink subframe(s) for physical downlink shared channel (PDSCH) transmissions in downlink subframe(s), association of acknowledgement and negative acknowledgement (ACK/NACK) feedback on a physical hybrid automatic repeat request (HARQ) indicator channel (PHICH) or physical downlink control channel (PDCCH) for physical uplink shared channel (PUSCH) transmission(s) in uplink subframe(s), etc.

In a 3GPP meeting, a new study item was approved to study further enhancement to LTE TDD for downlink and uplink interference management and traffic adaptation. One objective of this study item would evaluate the benefits of uplink-downlink reconfiguration dependent upon traffic conditions (for both isolated cell and multi-cell scenarios, for example).

Existing physical (PHY) layer signaling may be extended to enable dynamic downlink to uplink conversion. For example, a special subframe type 2 may be used, which may be viewed as an extension of a current standard special subframe that is used for downlink to uplink transition. This special subframe type 2 can be used to provide uplink transmissions while maintaining existing UL-DL associations. The special subframe type 2 may have a particular structure, and may be triggered under certain conditions.

The systems and methods disclosed herein provide possible transitional states for each standard TDD configuration to achieve different UL-DL allocations. This may be done using a special subframe type 2 and PHY layer signaling. To reduce complexity, positions and orders of subframe type 2 conversions may be defined. Procedures for dynamic uplink-downlink reconfiguration with PHY layer signaling are described herein.

In current LTE TDD systems, the uplink and downlink allocation is chosen from seven defined configurations, and is synchronized system wide. Currently, uplink-downlink allocation reconfiguration in a cell may be very costly because all transmissions have to be stopped to adjust the uplink-downlink associations. A change in one cell may cause or accompany a sequence of changes at neighbor cells (and their neighbor cells, etc.) to match uplink-downlink configuration synchronization at neighbor cells (and their neighbor cells, etc.). Furthermore, current uplink-downlink allocation reconfiguration requires a system information change, thus it has long delay and is not adaptive to instantaneous or short term changes in traffic load.

To support dynamic uplink and downlink allocation while reducing uplink-downlink allocation reconfiguration (using a system information change, for example), the systems and methods disclosed herein describe using physical layer (e.g., PHY layer) signaling to change the uplink and downlink allocation with traffic adaptation. The PHY layer signalling may be an extension of existing PHY layer signalling so that all standard uplink-downlink associations are maintained.

The systems and methods disclosed herein describe a special subframe. This special subframe may be referred to herein as a "special subframe type 2." The special subframe type 2 may support physical uplink shared channel (PUSCH) transmissions in a currently configured downlink subframe. A special subframe type 2 may allocate most channel resources for PUSCH transmission while maintaining the physical downlink control channel (PDCCH) as needed. Structure and configuration procedures for the special subframe type 2 are provided herein. In one configuration, all existing uplink-downlink associations are maintained and are transparent to legacy UEs (e.g., UEs that function according to earlier specifications). Thus, no uplink-downlink allocation reconfiguration (with a system information change) procedure may be needed in some cases.

The systems and methods disclosed herein describe possible transition states of each standard TDD configuration. To reduce complexity, a state transition procedure is illustrated with defined subframe positions for each state. With the PHY layer signaling described, the systems and methods disclosed herein describe dynamic uplink-downlink reconfiguration procedures with a traffic load. The PHY layer signaling with one or more special subframe type 2 subframes provides dynamic downlink to uplink conversion. This may provide a buffer zone for uplink traffic load increase and may reduce the radio resource control (RRC) layer system information change.

Some aspects of systems and methods disclosed herein may include using physical layer signaling to dynamically change uplink and downlink allocation without changing existing uplink downlink associations and may include a special subframe type 2 for transitional and temporary subframe conversion. Additionally, they may include procedures for control signaling associations for the special subframe type 2. Another aspect of the systems and methods disclosed herein includes states and provides a subframe position at each transitional state with a special subframe type 2. Yet another aspect includes procedures for dynamic uplink-downlink reconfiguration with PHY layer signalling and a special subframe type 2.

For clarity, one example of a frame structure that may be used in accordance with the systems and methods disclosed herein is given from 3GPP TS 36.211 as follows. This frame structure may be applicable in time-division duplexing (TDD) approaches. Each frame may have a length of $T_f=307200 \cdot T_s=10$ milliseconds (ms), where $T_f$ is a radio frame duration and $T_s$ is a time unit equal to $$\frac{1}{(15000 \times 2048)}$$

seconds. The frame may include two half-frames, each having a length of $153600 \cdot T_s=5$ ms. Each half-frame may include five subframes, each having a length of $30720 \cdot T_s=1$ ms. Some UL-DL frame configurations are illustrated in Table (1) below.

TABLE (1)

| UL-DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table (1), for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table (2) (from Table 4.2-1 of 3GPP TS 36.211) subject to the total length of DwPTS, GP and UpPTS being equal to $30720 \cdot T_s=1$ ms. Table (2) illustrates several configurations of (standard) special subframes. Each subframe i is defined as two slots, 2i and 2i+1 of length $T_{slot}=15360 \cdot T_s=0.5$ ms in each subframe. In Table (2), "cyclic prefix" is abbreviated as "CP" and "configuration" is abbreviated as "Config" for convenience.

TABLE (2)

| Special Subframe Config | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL-DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission. In case multiple cells are aggregated, a UE may assume the same UL-DL configuration across all the cells and that the guard period of the special subframe in the different cells have an overlap of at least $1456 \cdot T_s$.

The UL-DL configuration may be a part of a SystemInformationBlockType1 (SIB1), defined by an information element (IE) TDD-Config, which includes a subframe assignment and specialSubframePatterns. The SIB1 may be transmitted on a broadcast control channel as a logical channel. To change the UL-DL configuration, a system information change procedure may be performed.

Some TDD configuration and reconfiguration issues are described as follows. A TDD configuration does not require paired frequency bands. Thus, one advantage of a TDD configuration is the flexibility of bandwidth allocation. In a TDD configuration, a frame may have 10 subframes. UL-DL configurations with both 5 ms and 10 ms downlink-to-uplink switch-point periodicity may be supported. Seven UL-DL configurations are specified in 3GPP standards. To avoid interference between uplink and downlink transmissions, system wide synchronization may be necessary. Therefore, all evolved Node Bs (eNBs) and all UEs may follow the same UL-DL configuration and timing.

In current specifications (e.g., LTE Releases 8, 9 and 10), a system information change procedure may be used to change the UL-DL configuration. This process requires multiple broadcast channel intervals and thus has a long delay and cannot adapt to an instantaneous traffic load change. Due to different uplink-downlink associations, all transmitters may have to turn off the transmissions altogether to disconnect the uplink-downlink associations of the old configuration and to set up the new associations. This may cause a huge loss of system capacity and user traffic interruption. Thus, the reconfiguration of uplink and downlink allocation may also be very costly. Furthermore, a change in one cell may force adjacent cells to change their UL-DL configurations. Thus, a "ripple" effect may occur. With high traffic load fluctuation, frequent uplink-downlink reconfiguration may cause serious network problems.

Examples of associations (in LTE-TDD, for instance) include the association of a PDCCH for uplink power control of an uplink subframe, association of a PDCCH for physical uplink shared channel (PUSCH) allocation in an uplink subframe, associations of ACK/NACK feedback of downlink transmission on uplink subframe(s), ACK/NACK feedback of uplink transmission on PHICH or PDCCH, etc.

The LTE TDD uplink-downlink configuration is designed for aggregated network traffic flow. The traffic characteristics of each application and/or each UE may be significantly different. Statistically, the network traffic load (e.g., the aggregated traffic load of all UEs in a cell) should be relatively stable and change more gradually compared with the traffic characteristics of an individual UE. However, the aggregated traffic load may also fluctuate a lot around an average value. The average traffic load at a different time of the day can vary significantly. The uplink and downlink ratio may change significantly when some UEs use high bandwidth applications like video streaming and large file downloads.

Operators may configure the network with some desired load ratio "target" based on an operator's preference for its revenue model. The actual system traffic characteristic may contain two aspects. The first aspect is the total traffic load to capacity ratio. The second aspect is the uplink to downlink traffic ratio. The uplink to downlink traffic ratio may or may not match an operator's target or desired load ratio.

When the network aggregated traffic load to capacity ratio is low, an UL-DL configuration is acceptable if the uplink traffic and downlink traffic load can be supported by the allocated uplink subframes and downlink subframes as respectively. In this case, the actual uplink-downlink traffic ratio may be the same or different from the uplink-downlink allocation. On the other hand, if the total traffic load to capacity ratio is high, a better matching uplink-downlink ratio may be configured.

A reconfiguration may be needed in several cases. For example, a reconfiguration may be needed if the allocated uplink resource cannot support the uplink traffic load. In another example, reconfiguration may be needed if the allocated downlink resource cannot support the downlink traffic load. Furthermore, a reconfiguration may be used to adapt to traffic load with a better match uplink-downlink allocation. For instance, a reconfiguration may be needed if a current UL-DL configuration does not match the uplink to downlink traffic ratio.

Some explanation on standard uplink-downlink (UL-DL) configurations and reconfiguration between the configurations is given hereafter. In LTE-TDD, uplink-downlink configurations with both 5 millisecond (ms) and 10 ms downlink-to-uplink switch-point periodicity are supported. The reconfiguration between a 5 ms configuration and a 10 ms configuration requires more change than a reconfiguration with the same periodicity. With a given periodicity setting, the reconfiguration may choose a better uplink-downlink configuration with the same periodicity. However, with 10 ms periodicity, the maximum uplink allocation provides three UL subframes. If the uplink traffic load is higher than three UL subframes, the system needs to be re-configured to a 5 ms configuration with more UL resources. Greater detail on LTE-TDD UL-DL configurations and reconfigurations is given below.

Currently, a change of system information procedure may be used for uplink-downlink (UL-DL) reconfiguration. This process is a radio resource control (RRC) layer procedure. It may take a long time and cannot be adjusted to instantaneous traffic load change. The instantaneous traffic load change may be temporary. By the time the network configuration is changed, the traffic load may have already changed back to the normal state. Thus, another reconfiguration may be needed.

Even worse (with Release-8, 9 and 10, for example), a change of UL-DL configuration in one cell may trigger the change of UL-DL configurations in adjacent cells, since the TDD system is designed to have the same UL-DL configuration to avoid interference between downlink and uplink transmissions. Therefore, changing an UL-DL configuration (using a change of system information) may be very costly at the RRC level, and may be beneficially avoided in some cases.

In order to better adapt to traffic conditions, dynamic UL-DL reconfiguration procedures may be supported besides the system information change. Dynamic UL-DL reconfiguration may maintain backward compatibility and provide fast subframe modifications based on real-time traffic changes. Furthermore, different UL-DL configurations in neighboring cells may be supported (in Rel-11, for example) in a temporal or persistent manner with co-channel interference mitigation techniques. The different UL-DL configurations may be caused by different initial network configurations and/or by dynamic UL-DL configuration changes with traffic adaptation.

Some physical (PHY) layer uplink-downlink reconfiguration considerations (using a special subframe type 2) are detailed hereafter. Considering real-time traffic load fluctuations, a more flexible time domain uplink-downlink reconfiguration may follow the characteristics of the traffic fluctuations. Thus, a PHY layer reconfiguration may be supported besides the system information change procedure. The PHY layer procedure may deal with most temporary traffic load fluctuations. The system information change procedure may be used only when the traffic change is very significant and the PHY layer procedure cannot handle the change.

The dynamic UL-DL reconfiguration may provide fast subframe conversion with PHY layer signalling. The PHY signalling may be an extension of existing signalling of UL-DL associations, so that backward compatibility can be maintained for legacy UEs. Therefore, current UL-DL associations may not be changed, and dynamic UL-DL reconfiguration may provide extra flexibility and features to new (e.g., Rel-11) UEs.

The eNB may have full control of channel resources and UE behavior. Several downlink control information (DCI) formats are specified to carry different control information. For example, DCI format 0 is used for the scheduling of a physical uplink shared channel (PUSCH). DCI format 1 is used for the scheduling of physical downlink shared channel (PDSCH) codeword. Furthermore, DCI format 3 is used for the transmission of transmit power control (TPC) commands for a physical uplink control channel (PUCCH) and physical uplink shared channel (PUSCH) with a two-bit power adjustment.

In an uplink subframe in LTE-TDD, only the UEs that have scheduled PUCCH and/or PUSCH transmissions may transmit on the channel. Other UEs may not sense the channel. For downlink data transmission, the PUSCH may be scheduled only by the PDCCH of the same subframe. Therefore, dynamically changing an uplink subframe to a downlink subframe at the PHY layer is not feasible with existing PHY layer signaling.

In a downlink subframe, a UE should monitor the physical downlink control channel (PDCCH) and try to decode the PDCCH. The PHY layer procedure may be extended by a PDCCH to allocate PUSCH transmissions in a standard downlink subframe. Such a PDCCH command may be treated as an error in Rel-10 and previous TDD systems.

Extended PHY layer signalling may be used to dynamically convert a downlink subframe to allow uplink PUSCH transmission. Thus, downlink to uplink subframe conversion may be controlled dynamically by PHY layer signalling. All legacy UEs (e.g., UEs that conform to 3GPP Releases 8, 9 and/or 10) may still designate the subframe as a downlink subframe and monitor it for a PDCCH. In case a PDCCH is not present, they may assume a discontinuous transmission (DTX) in the given subframe. Other UEs that support dynamic subframe conversion may use the given subframe as an uplink subframe following the PHY layer signaling.

When dynamic uplink and downlink (re)configuration (e.g., conversion) is applied, it is desirable to maintain all existing uplink-downlink associations (according to earlier 3GPP releases, for example). The systems and methods disclosed herein extend the special subframe of the current specifications for temporary and/or partial downlink to uplink conversion. The special subframe extension or new special subframe disclosed herein may be referred to as a "special subframe type 2" or "S2." Additionally or alternatively, the new special subframe or special subframe type 2 may be referred to as a hybrid subframe, flexible subframe, extensible special subframe, etc.

The special subframe type 2 (S2) may allocate more resources for uplink transmission while maintaining all necessary downlink signaling (e.g., control information for PUSCH scheduling and PHICH feedback). A downlink subframe may be converted to a special subframe type 2 by maintaining only the PDCCH transmission and allocating the rest of the resources to PUSCH transmission.

Similar to a standard special subframe, a special subframe type 2 has three fields. In a standard special subframe, the three fields are a downlink pilot time slot (DwPTS), a guard period (GP) and an uplink pilot time slot (UpPTS). For convenience, the three fields in the special subframe type 2 may also be referred to as a DwPTS, a GP and a UpPTS. Although the three fields in the special subframe type 2 may be referred to using the same names as in a standard special subframe, it should be noted that the characteristics of the three fields in the special subframe type 2 may be different from, similar to and/or the same as those of the same-named fields in the standard special subframe. For instance, more data may be carried in a UpPTS in a special subframe type 2 than in a standard special subframe.

In PUSCH scheduling with PDCCH DCI format 0, a PUSCH allocation is a block of continuous resource blocks (RBs) represented by the index of the start RB and the number of RBs. The usable resource elements (REs) of each subcarrier in a PUSCH allocation for a special subframe type 2 may be the same as a number of symbols in an uplink pilot time slot (UpPTS) region. More detail regarding the structure of a special subframe type 2 is given below.

The special subframe type 2 (S2) aims to provide increased resources for uplink transmission while maintaining necessary downlink signaling. For example, a special subframe type 2 maintains the PDCCH region as needed, but has no PDSCH allocation. Most of the resources in a special subframe type 2 are assigned for PUSCH transmissions. Since all uplink control feedback is associated with existing uplink subframes, no PUCCH allocation and PUCCH transmission may be allowed in a special subframe type 2.

In the special subframe type 2, a DwPTS may be limited to provide only necessary downlink control signaling (e.g., PDCCH and PHICH). The PDCCH may be used to schedule PUSCH transmission in an uplink subframe. However, since a PDCCH in a special subframe type 2 may not schedule a PDSCH transmission, the size of the DwPTS in a special subframe type 2 may be smaller than a DwPTS in a regular downlink subframe. For example, the number of orthogonal frequency-division multiplexing (OFDM) symbols used for a PDCCH should be limited to one or two when the number of resource blocks in a special subframe type 2 is greater than 10. Furthermore, the number of OFDM symbols used for a PDCCH should be two when the number of resource blocks in a special subframe type 2 is smaller than or equal to 10.

A guard period (GP) allows a UE to adjust a time advance for uplink transmission. If the uplink and downlink have the same cyclic prefix (CP) configuration, the GP in a special subframe type 2 may have a length of one OFDM symbol. If the uplink and downlink have different cyclic prefix (CP) configurations, the GP may be less than or more than one OFDM symbol. However, to ensure the switch timing, if present, the GP of a special subframe type 2 may have a length of at least $1456 \cdot T_s$.

If a downlink subframe does not have an existing association with PUSCH scheduling, power control and PHICH feedback to any uplink transmissions in the current UL-DL configuration, the downlink subframe may be converted to a special subframe type 2 with no reserved PDCCH region (e.g., a DwPTS length of 0). If the downlink subframe is immediately after an uplink subframe (or possibly after a special subframe type 2 in some configurations), the downlink subframe can be fully converted to an uplink subframe with no GP. If no PDCCH region is needed, but the downlink subframe to be converted is after a downlink subframe, the first OFDM symbol length may be reserved as a GP, while all other OFDM symbols may be allocated for uplink transmission, for example.

In one configuration of the special subframe type 2, the length of the DwPTS field and the length of the UpPTS field are given by Table (3) subject to the total length of DwPTS, GP and UpPTS being equal to $30720 \cdot T_s = 1$ ms. More detail on the structure of a special subframe type 2 is given below.

TABLE (3)

| Number of OFDM symbols reserved for PDCCH | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0, no GP | 0 | $30720 \cdot T_s$ | $30720 \cdot T_s$ | 0 | $30720 \cdot T_s$ | $30720 \cdot T_s$ |
| 0, with GP | 0 | $28528 \cdot T_s$ | $28160 \cdot T_s$ | 0 | $28528 \cdot T_s$ | $28160 \cdot T_s$ |
| 1 | $2192 \cdot T_s$ | $26336 \cdot T_s$ | $25600 \cdot T_s$ | $2560 \cdot T_s$ | $26336 \cdot T_s$ | $25600 \cdot T_s$ |
| 2 | $4384 \cdot T_s$ | $24144 \cdot T_s$ | $23040 \cdot T_s$ | $5120 \cdot T_s$ | $24144 \cdot T_s$ | $23040 \cdot T_s$ |

Details regarding special subframe type 2 conversion rules and PHY layer signaling are given hereafter. According to current 3GPP specifications, no PUSCH transmission should be scheduled in a downlink subframe in TDD. The PUSCH assignment in an uplink subframe has a one-to-one association mapping to a downlink subframe. For example, for TDD UL/DL configurations one through six and normal HARQ operation, the UE may upon detection of a PDCCH with uplink DCI format 0 and/or a PHICH transmission in subframe n intended for the UE, adjust the corresponding PUSCH transmission in subframe n+k, with k given in Table 8-2 of 3GPP TS 36.213, according to the PDCCH and PHICH information. According to current specifications, there may be some downlink subframes that cannot carry DCI format 0 for PUSCH allocation or cannot have PHICH feedback.

In accordance with the systems and methods disclosed herein, a downlink subframe may be converted to a special subframe type 2 (using extended PHY layer signal, for example). This may occur, for example, when one or more DCI format 0 PUSCH transmissions are allocated in a downlink subframe (that is not allowed to have DCI format 0 for PUSCH assignment in current 3GPP Release 8, 9 and 10 specifications), or when PHICH feedback is required for a previously allocated special subframe type 2.

Associations for a special subframe type 2 (as extensions to current PHY layer associations, for example) may be specified as follows. A PDCCH with DCI format 0 in subframe n−4 may convert a downlink subframe n to a special subframe type 2. The ACK/NACK feedback for a special subframe type 2 with subframe number n may be reported in subframe n+6. In one configuration, the ACK/NACK for PUSCH transmission in a converted subframe n may be carried on a PHICH in subframe n+6. Additionally, the PDCCH in a subframe n+6 may override the PHICH and schedule a new data transmission or a retransmission in subframe n+10 by indicating whether this is new transmission or not.

In another configuration, there may be no PHICH feedback for PUSCH transmission in the converted subframe n. Instead, the PDCCH in subframe n+6 indicates an ACK or NACK by indicating whether a new transmission is scheduled. If new data is indicated, this implies an ACK of the PUSCH transmission in subframe n. Thus, new data is transmitted in subframe n+10.

If the PDCCH indicates old data, it implies a NACK of the PUSCH transmission in subframe n, thus the same data is re-transmitted in subframe n+10. If the UE does not detect any PDCCH, the UE may not transmit a PUSCH in subframe n+10. Since TDD may have a common interval of 10 for both 5 ms and 10 ms configurations, n+6=(n−4)+10, the PHICH and PDCCH allocation with DCI format 0 may always have the same downlink subframe index number.

In other words, the PUSCH of a special subframe type 2 with subframe number n may be scheduled in the PDCCH or a PHICH feedback of a downlink subframe that is four subframes before the special subframe type 2 (e.g., a downlink subframe with subframe number n−4). The ACK/NACK feedback of the PUSCH transmission in a special subframe type 2 with subframe number n may be reported on a PHICH or by explicit PDCCH scheduling in a downlink subframe with subframe number n+6.

The conversion to a special subframe type 2 from a downlink subframe may be temporary and dynamic. In some implementations, a downlink subframe may be converted to a special subframe type 2 only under the above conditions. Otherwise, the downlink subframe may function as a regular downlink subframe. Thus, the conversion and transition happen autonomously and no extra signaling is necessary.

Legacy UEs that do not expect a special subframe may treat it as a normal downlink subframe. When the PDCCH is present in a special subframe type 2, there is no change for legacy UEs. When the PDCCH is not present in a special subframe type 2, the legacy UEs may report a DTX for the subframe because they cannot detect a PDCCH successfully. Release-11 and beyond UEs may perform the required uplink-downlink association and data transmission in a special subframe type 2 in accordance with the systems and methods disclosed herein.

Some possible states with PHY layer signaling in accordance with the systems and methods herein are given hereafter. The downlink to uplink conversion with a special subframe type 2 may apply similar principles as current specifications and may extend current PHY layer uplink and downlink associations. The systems and methods disclosed herein may not break any existing uplink downlink associations. Furthermore, no PUCCH may be necessary (or allowed, for example) in a special subframe type 2. Furthermore, the conversion may be dynamic, autonomous and flexible. Any downlink subframe may be converted to a special subframe type 2 if an association rule can be satisfied. Thus, one or more downlink subframes may be converted to one or more special subframe type 2 subframes.

In accordance with the systems and methods disclosed herein, the downlink to uplink conversion may have a reduced or minimum cost to the system. The downlink subframes may be dynamically converted to special subframe type 2 subframes with PHY layer procedures as necessary if the current uplink allocation cannot handle the uplink traffic. Thus, the systems and methods disclosed herein may handle most traffic fluctuations of increased uplink transmission without a uplink-downlink (UL-DL) configuration change using the system information change procedure.

With data traffic quickly increasing over voice traffic, cellular network traffic may become more asymmetric with a higher traffic load on downlink than on uplink. The systems and methods disclosed herein may thus be configured in favor of downlink allocation. For instance, an eNB may be initialized with more subframes allocated to downlink traffic than to uplink traffic.

Temporary uplink traffic hikes may trigger problematic network reconfiguration. However, some of these issues may be mitigated with the enhancement of dynamic UL-DL allocation to support temporary subframe conversion by PHY layer signaling (e.g., dynamic subframe conversion from a downlink to uplink).

In one configuration, subframes 0 and 5 may be used for critical system information, such as a synchronization channel and a broadcast channel. In this case, subframe 0 and subframe 5 may be downlink subframes only as in the current uplink-downlink (UL-DL) configurations, and may not be converted to special subframe type 2 subframes. Based on these considerations above, possible PHY layer subframe conversions for each TDD configuration are provided below.

There are currently seven different UL-DL configurations defined in the 3GPP TS 36.211 specification. The PHY layer signaling according to the systems and methods disclosed herein may be applied to some of these configurations. Moreover, different configurations may have different PHY layer subframe conversion associations. Possible transitions for each TDD UL-DL configuration with dynamic PHY layer signaling are described hereafter.

Configuration zero (e.g., "0") is a 5 ms configuration with an allocation of six uplink (UL) subframes (which may be a current maximum allocation for UL subframes). Subframe 0 and subframe 5 may not be converted to a special subframe type 2. Thus, no dynamic subframe conversion from downlink to uplink with PHY layer signaling may be performed for configuration 0.

Configuration six (e.g., "6") is a 5 ms configuration with 5 UL subframes and 5 downlink (DL) subframes. All DL subframes may already be associated with UL PUSCH scheduling and ACK/NACK reporting. Accordingly, no DL subframe can satisfy the dynamic PHY layer signaling requirements. Thus, no dynamic subframe conversion with PHY layer signaling may be performed for configuration 6.

Configuration one (e.g., "1") is a 5 ms configuration with 4 UL subframes. PHY layer signaling can be applied on a DL pair of subframe 0 and subframe 4 and a downlink pair of subframe 5 and subframe 9 (resulting in configuration one-one A (e.g., "1-1a") and configuration one-one B (e.g., "1-1b"), for example).

Configuration two (e.g., "2") is a 5 ms configuration with 2 UL subframes. PHY layer signaling can be applied on DL pairs of subframe 9 and subframe 3, subframe 0 and subframe 4, subframe 4 and subframe 8 and subframe 5 and subframe 9 to convert the later downlink subframe to a special subframe type 2 (resulting in configurations two-one A (e.g., "2-1a"), two-one B (e.g., "2-1b"), two-one C (e.g., "2-1c") and two-one D (e.g., "2-1d"), for example).

Configuration 3 provides an UL allocation with 3 UL subframes (which may be the maximum number of uplink subframes for current 10 ms configurations). If the UL load goes above 30%, a UL-DL reconfiguration may be triggered. The allocation may be changed from a 10 ms to a 5 ms configuration, which is a more significant change than among configurations with the same periodicity. With a ripple effect, this may cause serious network disruption.

PHY layer signaling for subframe conversion may only be applied on a DL pair of subframe 5 and subframe 9 in configuration 3. In accordance with the systems and methods disclosed herein, scheduling a PUSCH transmission in subframe 5 may convert subframe 9 to a special subframe type 2 (resulting in configuration three-one (e.g., "3-1"), for example). This may provide a 40% (e.g., 4/10 subframes for) UL allocation. This may provide a middle state to mitigate a temporary uplink traffic hike with 10% channel resource, which reduces the probability of a massive configuration change between 5 ms and 10 ms configurations. This approach with a special subframe type 2 in subframe 9 may also provide a 5 ms uplink interval if it is used together with uplink subframe 4.

Configuration 4 is a 10 ms configuration with 2 UL subframes. PHY layer signaling for subframe conversion may be applied on DL pairs of subframe 0 and subframe 4, subframe 4 and subframe 8 and subframe 5 and subframe 9 (resulting in configurations four-one A (e.g., "4-1a"), four-one B (e.g., "4-1b") and four-one C (e.g., "4-1c"), for example).

Configuration 5 is a 10 ms configuration with 1 UL subframe. In accordance with the systems and methods disclosed herein, there are 5 possible PHY layer signaling transmission pairs: subframe 8 and subframe 3, subframe 9 and subframe 4, subframe 3 and subframe 7, subframe 4 and subframe 8 and subframe 5 and subframe 9 (resulting in configurations five-one A (e.g., "5-1a"), five-one B (e.g., "5-1b"), five-one C (e.g., "5-1c"), five-one D (e.g., "5-1d") and five-one E (e.g., "5-1e") for example).

In one approach that provides increased flexibility from PHY layer signaling for dynamic subframe conversion, all transition states that satisfy the condition may be allowed. In this case, TDD UL-DL Configuration 0 and 6 cannot have dynamic PHY layer signaling for subframe conversion. TDD UL-DL Configuration 3 has one possible state for subframe conversion from downlink to a special subframe type 2. TDD UL-DL Configuration 1, 2, 4 and 5 have multiple PHY layer signaling possibilities with 2, 4, 3 and 5 pairs for dynamic subframe conversion. The PHY layer signaling may dynamically convert multiple subframes. The multiple subframe pairs for PHY layer signaling conversion may lead to many combination states in this approach.

In one example with configuration five (e.g., "5"), there are five possible downlink subframe to special subframe type 2 conversion pairs with PHY layer signaling. If all PHY layer signaling for subframe conversion is allowed, multiple combinations exist that provide the same uplink to downlink allocation ratio. When only one subframe is converted to a special subframe type 2 subframes, there are five possible cases, all of which provide the same UL-DL ratio. When two subframes are converted to special subframe type 2 subframes, there are ten different combinations available. All 10 provide the same UL-DL ratio. Similarly, there are ten, five and one combinations if three, four or five subframes are converted to special subframe type 2 subframes.

The plurality of different combinations with the same UL-DL allocation ratios leads to higher system complexity and potential errors. Furthermore, the PDCCH may not be very reliable. Thus, a misdetection may occur at a UE. In Release-10, a UE will ignore a PDCCH signaling if it conflicts with the UL-DL configuration. For example, if a UE receives a PDCCH that schedules a PUSCH transmission in a downlink subframe, the UE may treat it as an error or misdetection and ignore the PDCCH scheduling. With the PHY layer signaling extension in accordance with the systems and methods disclosed herein, if a Release-11 UE receives a PDCCH that schedules a PUSCH transmission in a downlink subframe, the UE may not treat this as an error. Rather, the UE may follow a dynamic downlink to uplink conversion procedure with a special subframe type 2.

If all combinations are allowed, it may be difficult for a UE to differentiate a PDCCH misdetection from a PHY layer subframe conversion. Therefore, allowing arbitrary subframe conversion (although it provides flexibility) introduces extra complexity and more erroneous PDCCH misdetection. Therefore, it may be better to limit the subframes for downlink to uplink transition to reduce PDCCH misdetection and/or incorrect scheduling. If the subframes allowed for downlink to subframe transition are known at the UE, the UE can detect and discard a physical layer signaling that requires a downlink to uplink transition in a downlink subframe that is outside the allowed subframe list. Furthermore, to avoid a PDCCH misdetection, a more reliable PDCCH format may be used for downlink to uplink conversion with a special subframe type 2. For example, one or more information fields of downlink control information on PDCCH may be verified to determine whether the fields are set to a fixed value. This may be done in addition to using a cyclic redundancy check (CRC) field.

More detail on transitional states with PHY layer signaling is given hereafter. To simplify system design for subframe conversion from a base configuration, the systems and methods disclosed herein may allow only one configuration for each UL-DL ratio in one approach. Dynamic subframe conversion from a downlink subframe to a special subframe type 2 may not be applied on configuration 0 and configuration 6. Configuration 3 may have only one possible subframe conversion position. However, the subframe conversion states may need to be specified for TDD UL-DL configurations 1, 2, 4 and 5, where multiple PHY layer signaling possibilities exist. Several rules may be considered to define the transition states.

One rule may prefer a state with a similar allocation to standard UL-DL configurations. Another rule may specify that the same subframe position should be used for the subframe conversion for the same UL-DL allocation ratio.

Standard configuration one (e.g., "1") is a 5 ms configuration with 40% (e.g., 4/10 subframes for) UL allocation. The PHY layer signaling may dynamically change the uplink ratio between 40% and 60%.

When only one subframe is converted, configuration 1 may change to configuration one-one (e.g., "1-1") that is similar to configuration 6 by converting subframe 4 from a downlink subframe to a special subframe type 2 (resulting in configuration 1-1, for example). If two subframes are converted, configuration 1 may change to configuration one-two (e.g., "1-2") that is similar to configuration 0 by converting subframe 4 and subframe 9 from downlink subframes to special subframe type 2 subframes. Since subframe 4 and subframe 9 may also be used to schedule PUSCH transmissions in subframes 8 and 3 respectively, the special subframe type 2 may have a reserved PDCCH region. With specified transition states, subframe 9 may be converted to a special subframe type 2 only if subframe 4 is also converted to a special subframe type 2.

Standard configuration two (e.g., "2") is a 5 ms configuration with 20% (e.g., 2/10) of subframes allocated to UL. By applying PHY layer signaling in accordance with the systems and methods disclosed herein, an UL ratio of 30% to 60% may be achieved with a given order as described hereafter.

In configuration two-one (e.g., "2-1"), only one DL subframe is converted to a special subframe type 2 by PUSCH scheduling at subframe 9 to convert subframe 3. This results in a 30% UL allocation. Configuration 2-1 does not exist in current TDD UL-DL configurations and can be viewed as a middle state between configuration 2 and configuration 1.

In configuration two-two (e.g., "2-2"), two DL subframes are converted to special subframe type 2 subframes by PUSCH scheduling at subframe 9 and subframe 4 to convert subframe 3 and subframe 8, respectively (resulting in an extra conversion of subframe 8 over configuration 2-1, for example). This provides a similar allocation as configuration 1 with a 40% UL allocation.

In configuration two-three (e.g., "2-3"), three DL subframes are converted to special subframe type 2 subframes by PUSCH scheduling at subframe 9, subframe 0 and subframe 4 to convert subframe 3, subframe 4, and subframe 8, respectively (resulting in an extra conversion of subframe 4 over configuration 2-2, for example). This provides a similar allocation as Configuration 6 with a 50% UL allocation.

In configuration two-four (e.g., "2-4"), four DL subframes are converted to special subframe type 2 subframes by PUSCH scheduling at subframe 9, subframe 0, subframe 4 and subframe 5 to convert subframe 3, subframe 4, subframe 8 and subframe 9, respectively (resulting in an extra conversion of subframe 9 over configuration 2-3, for example). This provides a similar allocation as configuration 0 with a 60% UL allocation.

Standard configuration four (e.g., "4") is a 10 ms configuration with two UL subframes, thus providing a 20% uplink allocation. By applying PHY layer signaling in accordance with the systems and methods disclosed herein, an UL ratio of 30% to 50% can be achieved with a given order as described hereafter.

In configuration four-one (e.g., "4-1"), only one DL subframe is converted to a special subframe type 2 by PUSCH scheduling at subframe 0 to convert subframe 4. This results in a 30% UL allocation, similar to standard TDD UL-DL configuration 3.

In configuration four-two (e.g., "4-2"), two DL subframes are converted to special subframe type 2 subframes by PUSCH scheduling at subframe 0 and subframe 5 to convert subframe 4 and subframe 9, respectively (resulting in an extra conversion of subframe 9 over configuration 4-1, for example). This may provide a similar allocation as configuration 3-1 with a 40% UL allocation.

In configuration four-three (e.g., "4-3"), three DL subframes are converted to special subframe type 2 subframes by PUSCH scheduling at subframe 0, subframe 4 and subframe 5 to convert subframe 4, subframe 8, and subframe 9, respectively (resulting in an extra conversion of subframe 8 over configuration 4-2, for example). This provides a configuration with a 50% UL allocation.

Configuration 4-2 and configuration 4-3 may mitigate temporary uplink traffic hikes and avoid unnecessary allocation changes between 5 ms and 10 ms configurations. They also provide a 5 ms uplink interval by using subframe pairs (e.g., subframes 3 and 8 and subframes 4 and 9).

Standard configuration five (e.g., "5") is a 10 ms configuration with an uplink allocation of one UL subframe (or a 10% uplink allocation). By applying PHY layer signaling in accordance with the systems and methods disclosed herein, an UL ratio of 20% to 60% may be achieved with a given order as described hereafter.

In configuration five-one (e.g., "5-1"), only one DL subframe is converted to a special subframe type 2 by PUSCH scheduling at subframe 9 to convert subframe 3. This results in a 20% UL allocation, similar to standard TDD UL-DL configuration 4.

In configuration five-two (e.g., "5-2"), two DL subframes are converted to special subframe type 2 subframes by PUSCH scheduling at subframe 9 and subframe 0 to convert subframe 3 and subframe 4, respectively (resulting in an extra conversion of subframe 4 over configuration 5-1, for example). This provides a 30% UL allocation, similar to standard TDD UL-DL configuration 3.

In configuration five-three (e.g., "5-3"), three DL subframes are converted to special subframe type 2 subframes. In configuration 5-3a, PUSCH scheduling at subframe 9, subframe 0 and subframe 5 convert subframe 3, subframe 4, and subframe 9, respectively (resulting in an extra conversion of subframe 9 over configuration 5-2, for example). This provides a similar allocation as configuration 3-1 and configuration 4-2 with a 40% UL allocation. In configuration 5-3b, PUSCH scheduling at subframe 9, subframe 3 and subframe 4 convert subframe 3, subframe 7 and subframe 8, respectively. This provides a similar allocation as standard TDD UL-DL configuration 1 with a 40% UL allocation.

In configuration five-four (e.g., "5-4"), four DL subframes are converted to special subframe type 2 subframes. In configuration 5-4a, PUSCH scheduling at subframe 9, subframe 0, subframe 4 and subframe 5 convert subframe 3, subframe 4, subframe 8 and subframe 9, respectively (resulting in an extra conversion of subframe 8 over configuration 5-3a, for example). This provides a similar allocation as configuration 4-3 with a 50% UL allocation. In configuration 5-4b, PUSCH scheduling at subframe 9, subframe 0, subframe 3 and subframe 4 convert subframe 3, subframe 4, subframe 7 and subframe 8, respectively (resulting in an extra conversion of subframe 4 over configuration 5-3b, for example). This provides a similar allocation as standard TDD UL-DL configuration 6 with a 50% UL allocation.

In configuration five-five (e.g., "5-5"), five DL subframes are converted to special subframe type 2 subframes by PUSCH scheduling at subframe 9, subframe 0, subframe 3, subframe 4 and subframe 5 to convert subframe 3, subframe 4, subframe 7, subframe 8 and subframe 9, respectively. This provides a 60% UL allocation, similar to standard UL-DL configuration 0.

Configurations 5-3, 5-4 and 5-5 provide a 5 ms uplink interval without performing 10 ms to 5 ms TDD UL-DL configuration changes.

In some implementations, the systems and methods disclosed herein may operate according to transitional states. The transitional states of each UL-DL configuration are described in connection with FIG. 18 below. The system information change procedure may be used for any reconfiguration between standard UL-DL configurations. Since the differences between 5 ms and 10 ms configurations are more significant, switching between 5 ms and 10 ms periodicity may always be performed by radio resource control (RRC) signaling according to the system information change procedure.

With PHY layer signaling for dynamic conversion of a downlink subframe to a special subframe type 2, higher uplink allocation can be derived from lower uplink configurations dynamically, which may reduce reconfiguration (according to the system information change procedure) for more uplink resource. For configurations with a 5 ms periodicity, configuration 1 can be dynamically converted to configuration 1-1 that provides a 50% UL resource allocation and to configuration 1-2 that provides a 60% UL resource with PHY layer signaling. Similarly, configuration 2 can be dynamically adjusted with PHY layer signaling to a higher UL allocation to configuration 2-1, configuration 2-2, configuration 2-3 and configuration 2-4 with 30%, 40%, 50% and 60% UL allocations, respectively. Thus, system information change may not be required when the uplink traffic load is increased.

For configurations with a 10 ms periodicity, configuration 3 can dynamically allocate an extra 10% for UL allocation with PHY layer signaling. Configuration 4 can support UL ratios from 20% to 50%. Configuration 5 can support UL ratios from 10% to 60%. Thus, PHY layer signaling for subframe conversion may provide a large dynamic range of uplink allocation beyond the maximum 30% uplink allocation for standard 10 ms configurations. Furthermore, lower 5 ms periodicity can be supported in transitional states beyond 30% uplink allocations (in configurations 3-1, 4-2, 4-3, 5-3, 5-4 and 5-5, for example). This may avoid the costly 10 ms to 5 ms system reconfiguration caused by uplink traffic spikes.

Defining an order of subframe conversion by PHY layer signaling may decrease implementation complexity. Subframe conversion with PHY layer signaling may be supported by Release-11 and beyond UEs. Thus the converted special subframe type 2 may only be used for Release-11 and beyond UEs. A Release-11 (and beyond) UE may only receive PHY layer signaling for the PUSCH scheduling on one or more special subframe type 2 subframes. The UE may not (initially) have information regarding how many subframes are converted. Therefore, further limiting the number of transition states may help reduce the chance of PUCCH misdetection. If the allowed transition states are known at the UE, the UE can detect and discard a physical layer signaling that requires a downlink to uplink transition in a downlink subframe that is outside the allowed transition states.

More details concerning one configuration of state transitions for dynamic UL-DL reconfiguration are given hereafter. A traffic load ratio change may be typically small. Thus, the PHY layer signaling may handle most small and/or temporary load variations. Therefore, several constraints may be applied to further limit the transition states.

In one approach, the number of converted subframes can be limited. If the uplink traffic load is beyond a limit, a standard UL-DL reconfiguration may be performed using the system information change procedure to a standard UL-DL configuration with more UL allocations. This provides a buffer zone for uplink traffic load variation. The size of the buffer zone may be determined by the number of converted subframes.

For example, if the number of converted subframes is limited to one, the buffer zone is one special subframe type 2. For configurations 1, 2, 3, 4 and 5, if the uplink traffic increases more than one UL subframe, a UL-DL reconfiguration by system information change may be performed to a standard UL-DL configuration with a higher UL allocation.

In another example, if the number of converted subframes is limited to two, the buffer zone may be two special subframe type 2 subframes. For configurations 1, 2, 4 and 5, if the uplink traffic increases more than two UL subframes, a UL-DL reconfiguration by system information change may be performed to a standard UL-DL configuration with a higher UL allocation. For configuration 3, only one subframe conversion may be possible even if the number of special subframe type 2 subframes is limited to two.

One example of a state transition procedure with a limit of the maximum number of special subframe type 2 subframes is given hereafter. This procedure starts with an initial state with a standard UL-DL configuration. For the given configuration, the maximum number of special subframe type 2 subframes (denoted as N herein), may be obtained based on the analysis above. For configuration 0 and configuration 6, N=0. For configuration 1, N=2. For configuration 2, N=4. For configuration 3, N=1. For configuration 4, N=3. For configuration 5, N=5. The eNB can further limit the maximum allowed number of special subframe type 2 subframes, denoted as K, where K≤N.

A counter C may be used to indicate the number of special subframe type 2 subframes of the current state. The counter is initialized as 0 (which may be a standard UL-DL configuration with no special subframe type 2 subframes). Based on the network traffic load, the eNB may evaluate or determine whether more downlink subframes are needed.

If more downlink subframes are needed and PHY layer signaling cannot handle it, then the standard UL-DL configuration may be used. For example, a RRC reconfiguration with the system information change procedure may be used to transition to a suitable UL-DL configuration with more DL allocations if possible.

If the network is currently utilizing configuration 5, then no more DL subframes can be allocated and no system information change is needed. If the network is currently utilizing configuration 2, then no more DL subframes can be allocated with a 5 ms periodicity. However, if the periodicity can be changed from 5 ms to 10 ms, a system information change procedure may be used to transition to configuration 5 from configuration 2.

If more DL subframes are not needed, the eNB then evaluates or determines if more UL subframes are needed based on the current traffic load. If more UL subframes are not needed, the eNB checks if the counter C is greater than 0.

If C is not greater than 0, the standard UL-DL configuration is used and the eNB returns to evaluate or determine if more DL subframes are needed for the current traffic load. If C is greater than 0, a transition state with a special subframe type 2 is used and the eNB then evaluates or determines if the special subframe type 2 can be reduced based on the traffic load. If the special subframe type 2 can be reduced, the eNB may change to a previous state with less UL allocations. The eNB then reduces (e.g., decrements) the counter by 1, and returns to check or determine if the counter C is greater than 0.

If the number of special subframe type 2 subframes cannot be reduced, the eNB returns to check or determine if more UL subframes are needed for the traffic load. If more UL subframes are needed based on the traffic load, the eNB may evaluate or determine if the counter C is smaller than K, the maximum allowed number of special subframe type 2 subframes. If the counter C is not smaller than K, the eNB cannot increase the number of special subframe type 2 subframes by PHY layer signaling. Thus, the eNB may evaluate or determine if more UL resources can be allocated by a RRC reconfiguration.

If more UL resources can be allocated by a RRC reconfiguration, the eNB may perform a RRC reconfiguration with a system information change to a more suitable UL-DL configuration with more UL allocations. Or, if the network cannot allocate more UL resource, the eNB may go back to evaluate or determine if the counter C is greater than 0. If the network is utilizing configuration 0, no more UL resources can be allocated, and no system information change is needed.

If the counter C is smaller than K, the eNB can change to the next transition state by converting another DL subframe to a special subframe type 2 with PHY layer signaling. The eNB then increases (e.g., increments) the counter C by 1, and returns to check or determine if the counter C is greater than 0.

With the state transition procedure, a RRC reconfiguration with system information change procedure happens in two cases: when the system is in the initial standard UL-DL configuration and more DL subframes are needed and when the system reaches the maximum allowed number of special subframe type 2 subframes and more UL subframes are needed.

In another approach, timers can be used in transitional states to trigger the system information change procedure. If a transitional state is maintained for an extended period of time (e.g., the timer expires), a standard UL-DL reconfiguration may be performed by a system information change procedure to a more suitable standard UL-DL configuration. The timer mechanism reduces the unnecessary system information change caused by temporary traffic load variations. On the other hand, if the system traffic load change is consistent, the timer triggers a system information change procedure with a more suitable setting.

A counter C may be used to indicate the number of special subframe type 2 of the current state, known as state_C. Thus, the standard UL-DL configuration with no special subframe 2 subframes is state_0, and state_N is the state with N special subframe type 2 subframes, where N is the maximum number of special subframe type 2 in the given UL-DL configuration.

A timer may be configured for each transitional state. The value of the timer for different transitional states may be the same. Alternatively, the value of the timer for different transitional states may be different so that a timer for the state with lower number of special subframe type 2 subframes is longer than a timer with higher number of special subframe type 2 subframes. All timers may be initialized to 0.

An initial state may be the standard UL-DL configuration state_0. If more UL subframes are needed with higher UL traffic load, the eNB can move from state_0 to state_1 by PHY layer signaling. The timer_1 may start. If the UL traffic load reduces and the special subframe type 2 is not needed, the eNB can move from state_1 to state_0 and the timer_1 may be reset to 0. In general, the timer_C for state_C may start counting if the eNB moves from a lower state (e.g., state_(C−1)) to state_C. The timer for state_C may be reset to 0 if the eNB moves to a lower state (e.g., state_(C−1)). The timer mechanism can be implemented in according to different approaches.

In one approach, the timer_C for state_C only counts the continuous time in this state. Thus, timer_C may start when the system moves to state_C from a lower state state_(C−1) or from a higher state state_(C+1). Timer_C should reset to 0 when the system moves out of state_C to a lower state state_(C−1) or to a higher state state_(C+1).

In another approach, the timer_C for state_C may freeze. The timer_C for state_C should start counting if the eNB moves from a lower state (e.g., state_(C−1)) to state_C. The timer_C for state_C should freeze if the eNB moves to a higher state state_(C+1). The timer_C for state_C may resume when the system moves back from a higher state state_(C+1). The timer for state_C may be reset to 0 if the system moves to a lower state (e.g., state_(C−1)).

In yet another approach, the timer_C for state_C should count if the system has C or more special subframe type 2 subframes (e.g., in state_C or higher states). The timer_C for state_C may be reset to 0 if the eNB moves to a lower state state_(C−1). In this case, the timer value of a state with lower number of special subframe type 2 subframes should be longer than the timer value of a state with higher number of special subframe type 2 subframes.

The maximum number of special subframe type 2 subframes for a standard UL-DL configuration and the timer may be applied independently or jointly. It should be noted that the eNB may override the rules and perform a RRC layer configuration by a system information change procedure.

The systems and methods disclosed herein may determine whether physical (PHY) layer uplink-downlink (UL-DL) reconfiguration can be applied to a standard UL-DL configuration. Furthermore, the systems and methods disclosed herein may define transitional states for UL-DL configurations. Additionally, the systems and methods disclosed herein may perform dynamic UL-DL reconfiguration based on a traffic load.

Additionally or alternatively, the systems and methods disclosed herein may limit the number of special subframe type 2 subframes in transitional states and provide procedures for state transitions with the standard system information change and PHY layer signaling. Also, the systems and methods disclosed herein may trigger a standard system information change procedure with timers. The systems and methods disclosed herein may initialize the eNB in favor of downlink allocation to allow flexible and dynamic UL-DL reconfiguration without triggering costly system information changes.

Some benefits of the systems and methods disclosed herein are given hereafter. One benefit is to provide fast and dynamic UL-DL reconfiguration by PHY layer signaling. Another benefit is to avoid and minimize costly radio resource control (RRC) level system information changes. Yet another benefit is to use well-defined transitional states to reduce system complexity and misdetection. Another benefit is to provide soft configuration states that are more adaptive to traffic changes.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an evolved Node B (eNB) 160 and one or more User Equipments (UEs) 102 in which systems and methods for reconfiguring a subframe allocation may be implemented. The one or more UEs 102 communicate with an evolved Node B (eNB) 160 using one or more antennas 122*a-n*. For example, a UE 102 transmits electromagnetic signals to the eNB 160 and receives electromagnetic signals from the eNB 160 using the one or more antennas 122*a-n*. The eNB 160 communicates with the UE 102 using one or more antennas 180*a-n*. It should be noted that the eNB 160 may be a Node B, home evolved Node B (HeNB) or other kind of base station in some implementations.

The UE 102 and the eNB 160 may use one or more channels 119, 121 to communicate with each other. For example, a UE 102 may transmit information or data to the eNB 160 using one or more uplink channels 121. Examples of uplink channels 121 include a physical uplink control channel (PUCCH) and a physical uplink shared channel (PUSCH), etc. The eNB 160 may also transmit information or data to the one or more UEs 102 using one or more downlink channels 119, for instance. Examples of downlink channels 119 include a physical downlink control channel (PDCCH), a physical downlink shared channel (PDSCH), etc. Other kinds of channels may be used.

Each of the one or more UEs 102 may include one or more transceivers 118, one or more demodulators 114, one or more decoders 108, one or more encoders 150, one or more modulators 154 and an UE operations module 124. For example, one or more reception and/or transmission paths may be used in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be used depending on the configuration.

The transceiver 118 may include one or more receivers 120 and one or more transmitters 158. The one or more receivers 120 may receive signals from the eNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the eNB 160. The UE operations module 124 may include a UE UL-DL reconfiguration module 132. The UE UL-DL reconfiguration module 132 may include communication configurations 107 and a special subframe type 2 structure 134.

The UE UL-DL reconfiguration module 132 may reconfigure an UL-DL allocation (for the UE 102). For example, the eNB 160 may communicate with the UE 102 using a frame structure that includes subframes. The configurations 107 may specify a number and type of subframes (e.g., uplink subframes, downlink subframes, standard special subframes, special subframe type 2 subframes, etc.) used. For example, the configurations 107 may include standard subframe configurations 0-6 as illustrated in Table (1) above in accordance with 3GPP Releases 8-10. The configurations 107 may additionally include other configurations (e.g., transitional states or configurations) in accordance with the systems and methods disclosed herein. The configurations 107 included in the UE 102 may correspond to configurations 148 included in the eNB 160. More detail on the configurations 107, 148 is given below.

In some implementations, the configurations 107 may include information (e.g., a list) regarding a designated set of convertible downlink subframes (e.g., downlink subframes that are allowed to be converted to special subframe type 2 subframes). If the UE 102 receives PHY layer signaling (e.g., an UL grant) that specifies a downlink subframe for conversion that is not included in the set, the UE 102 may detect an error.

In some implementations, the configurations 107 may include information regarding a set of allowed transitional states (e.g., transitional configurations). If the UE 102 receives PHY layer signaling that specifies a downlink subframe for conversion that is outside of the allowed transitional states, the UE 102 may detect an error.

In some implementations, the configurations 107 may be structured according to a definition. For example, the UE 102 may reconfigure a subframe allocation based on the definition. The definition may include or define a set of allowed downlink subframes for conversion (e.g., convertible subframes). The definition may also include or define orders for subframe conversion (e.g., which subframes may be converted in a sequence based on the number of subframes converted). Furthermore, the definition may also include or define a configuration of transitional states (that specifies which state may be transitioned to from a current state, for example) and a set of allowed transitional states (that specifies which transitional states may be used, for example). Limiting allowed convertible subframes, orders for subframe conversion, a configuration for transitional states and/or limiting a set of allowed transitional states may enable the UE 102 to detect subframe allocation errors, which may improve performance. In some implementations, the definition may be specified in accordance with FIG. 18 and its accompanying description below.

In some cases, the UE UL-DL reconfiguration module 132 may convert one or more downlink subframes into one or more special subframe type 2 subframes. For example, one or more of the subframes denoted as downlink subframes in Table (1) may be converted to special subframe type 2 subframes. For instance, the one or more UEs 102 and the eNB 160 may be operating according to a particular standard configuration 107 where certain subframes in a radio frame are designated as downlink subframes as illustrated in Table (1).

However, using the systems and methods disclosed herein, the UE 102 may convert one or more downlink subframes into special subframe type 2 subframes.

As described above, the special subframe type 2 may allow the eNB 160 to dynamically and temporarily allocate more communication resources to uplink transmissions. This may allow the one or more UEs 102 to transmit more uplink data to the eNB 160 (when needed or beneficial, for example).

The UE UL-DL reconfiguration module 132 may use a special subframe type 2 structure 134 to convert a downlink subframe into a special subframe type 2. For example, the special subframe type 2 structure 134 may specify the structure of the special subframe type 2 in certain circumstances. For instance, the structure of the special subframe type 2 may vary depending on whether an association corresponds to a target downlink subframe (e.g., the downlink subframe to be converted), depending on whether an uplink or downlink subframe immediately precedes the target downlink subframe and/or depending on a length of a PDCCH that may (or may not) be included in the special subframe type 2.

The UE operations module 124 may provide information 184 to the one or more receivers 120. For example, the UE operations module 124 may inform the receiver(s) 120 when or when not to receive transmissions based on a current configuration 107.

The UE operations module 124 may provide information 138 to the demodulator 114. For example, the UE operations module 124 may inform the demodulator 114 of a modulation pattern anticipated for transmissions from the eNB 160. In some implementations, this may be based on a current configuration 107.

The UE operations module 124 may provide information 136 to the decoder 108. For example, the UE operations module 124 may inform the decoder 108 of an anticipated encoding for transmissions from the eNB 160. In some implementations, this may be based on a current configuration 107.

The UE operations module 124 may provide information 142 to the encoder 150. The information 142 may include data to be encoded and/or instructions for encoding. For example, the UE operations module 124 may instruct the encoder 150 to encode transmission data 146 and/or control information 142 based on a current configuration 107.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. In some implementations, this may be based on a current configuration 107. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. In some implementations, this may be based on a current configuration 107. For instance, the one or more transmitters 158 may transmit during a downlink subframe that has been converted to a special subframe type 2. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113 and an eNB operations module 182. For example, one or more reception and/or transmission paths may be used in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be used depending on the configuration.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data 162. A second eNB-decoded signal 168 may comprise overhead data and/or control data. For example, the second UE-decoded signal 168 may provide data that may be used by the eNB operations module 182 to perform one or more operations.

The eNB operations module 182 may include an eNB UL-DL reconfiguration module 128. The eNB UL-DL reconfiguration module 128 may reconfigure subframe allocations. For example, the eNB UL-DL reconfiguration module 128 may switch between configurations 148 and/or may allocate or de-allocate (e.g., add or remove) certain subframes for communication. The eNB UL-DL reconfiguration module 128 may include one or more configurations 148, a signaling module 194, a (network) traffic monitoring module 126, a state controller 196 and a special subframe type 2 structure 130. The configurations 148 may specify a number and type of subframes (e.g., uplink subframes, downlink subframes, standard special subframes, special subframe type 2 subframes, etc.) used. For example, the configurations 148 may include standard subframe configurations 0-6 as illustrated in Table (1) above in accordance with 3GPP Releases 8-10. The configurations 148 may additionally include other configurations in accordance with the systems and methods disclosed herein. The configurations 148 included in the eNB 148 may correspond to configurations 107 included in the UE 102. More detail on the configurations 107, 148 is given below.

In some implementations, the configurations 148 may be structured according to a definition. For example, the eNB 160 may reconfigure a subframe allocation based on the definition. The definition may include or define a set of allowed downlink subframes for conversion (e.g., convertible subframes). The definition may also include or define orders for subframe conversion (e.g., which subframes may be converted in a sequence based on the number of subframes converted). Furthermore, the definition may also include or define a configuration of transitional states (that specifies which state may be transitioned to from a current state, for example) and a set of allowed transitional states (that specifies which transitional states may be used, for example). Limiting allowed convertible subframes, orders for subframe conversion, a configuration for transitional states and/or limiting a set of allowed transitional states may enable a UE 102 to detect subframe allocation errors, which may improve performance. In some implementations, the definition may be specified in accordance with FIG. 18 and its accompanying description below.

The signaling module 194 may generate signaling used to control which configuration 148 is used for communication between the eNB 160 and the UE 102. For example, the signaling module 194 may generate radio resource control (RRC) signaling (e.g., a system information change indicator) in order to transition to a standard configuration 148 for communications between the eNB 160 and the one or more UEs 102. In another example, the signaling module 194 may generate physical (PHY) layer signaling in order to transition to a configuration 148 in accordance with the systems and methods disclosed herein. In this case, the signaling module 194 may generate a signal indicating that the UE 102 should convert a downlink subframe to a special subframe type 2.

The traffic monitoring module 126 may monitor the amount of uplink and downlink traffic (e.g., communications) occurring between the eNB 160 and the one or more UEs 102. For example, the traffic monitoring module 126 may determine whether current uplink and/or downlink allocations are sufficient for current traffic loads. In other words, the traffic monitoring module 126 may determine whether the current configuration 148 should be changed to better suit current uplink and/or downlink traffic.

The state controller 196 may control configuration 148 states. For example, the state controller 196 may transition operation of the eNB 160 to another configuration 148. In some implementations, transitioning between states may be based on current uplink and/or downlink traffic, one or more counters and/or one or more timers.

For example, the traffic monitoring module 126 may indicate that the current configuration 148 cannot accommodate current or anticipated uplink and/or downlink traffic. Based on this indication, the state controller 196 may transition the eNB 160 to a configuration 148 that better accommodates the traffic load. For instance, if the current configuration 148 is insufficient to accommodate current uplink traffic, the state controller 196 may transition to a configuration 148 that is sufficient to accommodate the current uplink traffic. This may be done by converting downlink subframes to special subframe type 2 subframes using PHY layer signaling, for example. In this case, the signaling module 194 may generate physical (PHY) layer signaling that is used to inform the one or more UEs 102 to convert a downlink subframe to an uplink subframe.

The special subframe type 2 structure 130 may specify the structure of the special subframe type 2 in certain circumstances. For instance, the structure of the special subframe type 2 may vary depending on whether an association corresponds to a target downlink subframe (e.g., the downlink subframe to be converted), depending on whether an uplink or downlink subframe precedes the target downlink subframe and/or depending on a length of a PDCCH that may (or may not) be included in the special subframe type 2.

The eNB operations module 182 may provide information 190 to the one or more receivers 178. For example, the eNB operations module 182 may inform the receiver(s) 178 when or when not to receive transmissions based on a current configuration 148.

The eNB operations module 182 may provide information 188 to the demodulator 172. For example, the eNB operations module 182 may inform the demodulator 172 of a modulation pattern anticipated for transmissions from the UE(s) 102. In some implementations, this may be based on a current configuration 148.

The eNB operations module 182 may provide information 186 to the decoder 166. For example, the eNB operations module 182 may inform the decoder 166 of an anticipated encoding for transmissions from the UE(s) 102. In some implementations, this may be based on a current configuration 148.

The eNB operations module 182 may provide information 101 to the encoder 109. The information 101 may include data to be encoded and/or instructions for encoding. For example, the eNB operations module 182 may instruct the encoder 109 to encode transmission data 105 and/or control information 101 based on a current configuration 148 (e.g., whether a downlink subframe is converted to a special subframe type 2). Additionally or alternatively, the information 101 may include data to be encoded, such as PHY layer signaling (e.g., a PDCCH, a PHICH, etc.) and/or RRC signaling indicating scheduling information, HARQ data, channel allocations and/or other control information.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. In some implementations, this may be based on a current configuration 148. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. In some implementations, this may be based on a current configuration 148. For instance, the one or more transmitters 117 may not transmit during portions or all of a downlink subframe that has been converted to a special subframe type 2. The one or more transmitters 117 may upconvert and transmit the modulated signal(s) 115 to one or more UEs 102.

It should be noted that a downlink subframe may be transmitted from the eNB 160 to one or more UEs 102 and that an uplink subframe may be transmitted from one or more UEs 102 to the eNB 160. Furthermore, both the eNB 160 and the one or more UEs 102 may transmit data in a standard special subframe. In a special subframe type 2, one or more UEs 102 may transmit data. However, in a special subframe type 2, the eNB 160 may or may not transmit data.

Figure 2:
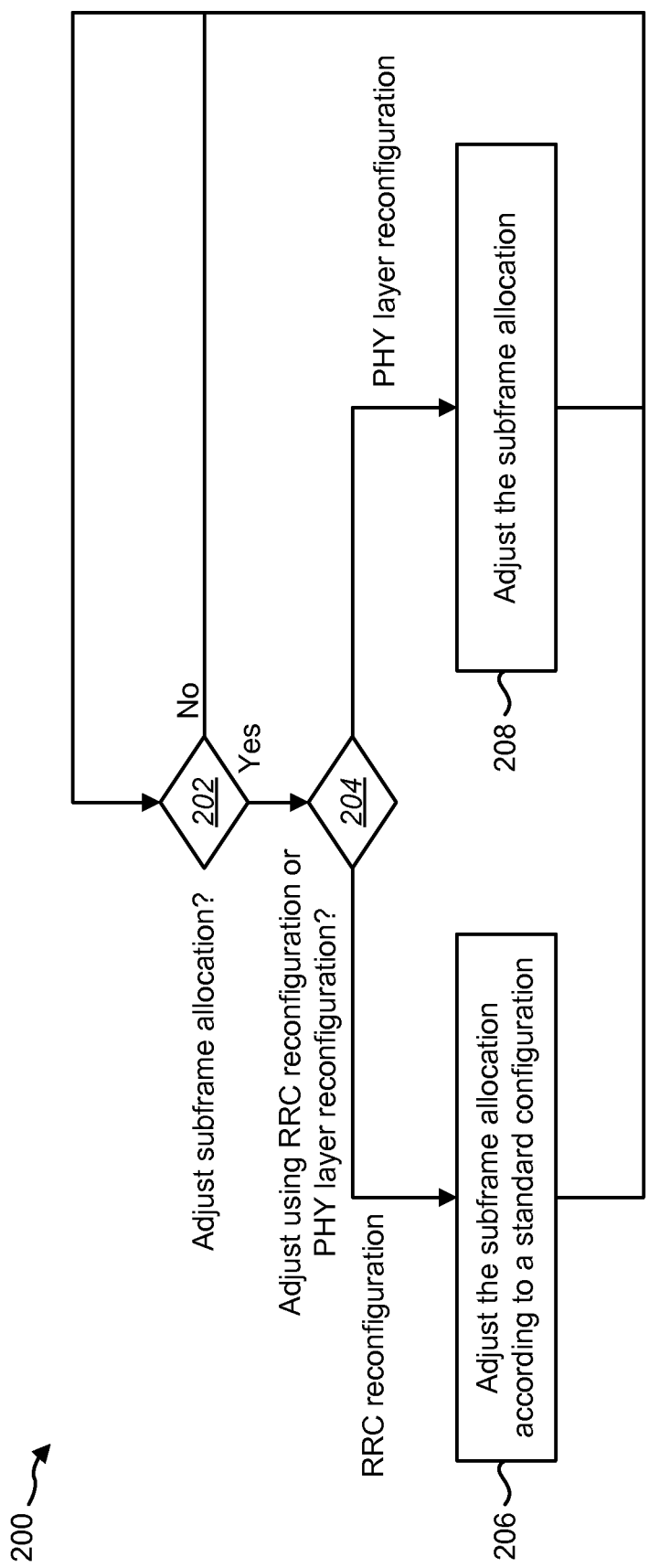
FIG. 2 is a flow diagram illustrating one configuration of a method for reconfiguring a subframe allocation on an eNB.

FIG. 2 is a flow diagram illustrating one configuration of a method 200 for reconfiguring a subframe allocation on an eNB 160. An eNB 160 may determine 202 whether to adjust a subframe allocation. For example, the eNB 160 may make this determination 202 based on an uplink and/or downlink traffic load, one or more counters and/or one or more timers. In one implementation, the eNB 160 may determine that a current subframe configuration is insufficient to communicate uplink and/or downlink traffic (within a certain amount of time or at a certain speed, for example). Additionally or alternatively, the eNB 160 may determine 202 to adjust a subframe allocation (e.g., a configuration) based on the expiration of one or more timers. Additionally or alternatively, the eNB 160 may determine 202 to adjust a subframe allocation (e.g., a configuration 148) based on a counter value.

The eNB 160 may determine 204 whether to adjust (the subframe allocation or UL-DL configuration) using RRC reconfiguration or PHY layer reconfiguration. This determination 204 may be based on a current subframe allocation (e.g., a configuration 148 or current state), uplink and/or downlink traffic, one or more timers and/or one or more counters.

If the eNB 160 determines 204 to adjust using RRC reconfiguration, then the eNB 160 may adjust 206 the subframe allocation according to a standard configuration 148. For example, the eNB 160 may perform a system information change procedure to transition to a standard configuration with a different subframe allocation. For example, standard configurations 148 may include UL-DL configurations 0-6 as illustrated in Table (1) above according to 3GPP Releases 8-10). The eNB 160 may then return to determine 202 whether to adjust a subframe allocation.

If the eNB 160 determines 204 to adjust using PHY layer reconfiguration, the eNB 160 may adjust 208 the subframe allocation (using the PHY layer reconfiguration). In some implementations, adjusting 208 the subframe allocation may be accomplished using a dynamic switch for subframe allocation. For example, the eNB 160 may transition to a configuration 148 that has more or fewer special subframe type 2 subframes. For instance, the eNB 160 may transition to a state and/or UL-DL configuration 148 (that may or may not be a standard UL-DL configuration) by allocating or de-allocating one or more special subframe type 2 subframes. The eNB 160 may send PHY layer signaling to one or more UEs 102 indicating the adjustment 208. The eNB 160 may then return to determine 202 whether to adjust a subframe allocation.

Figure 3:
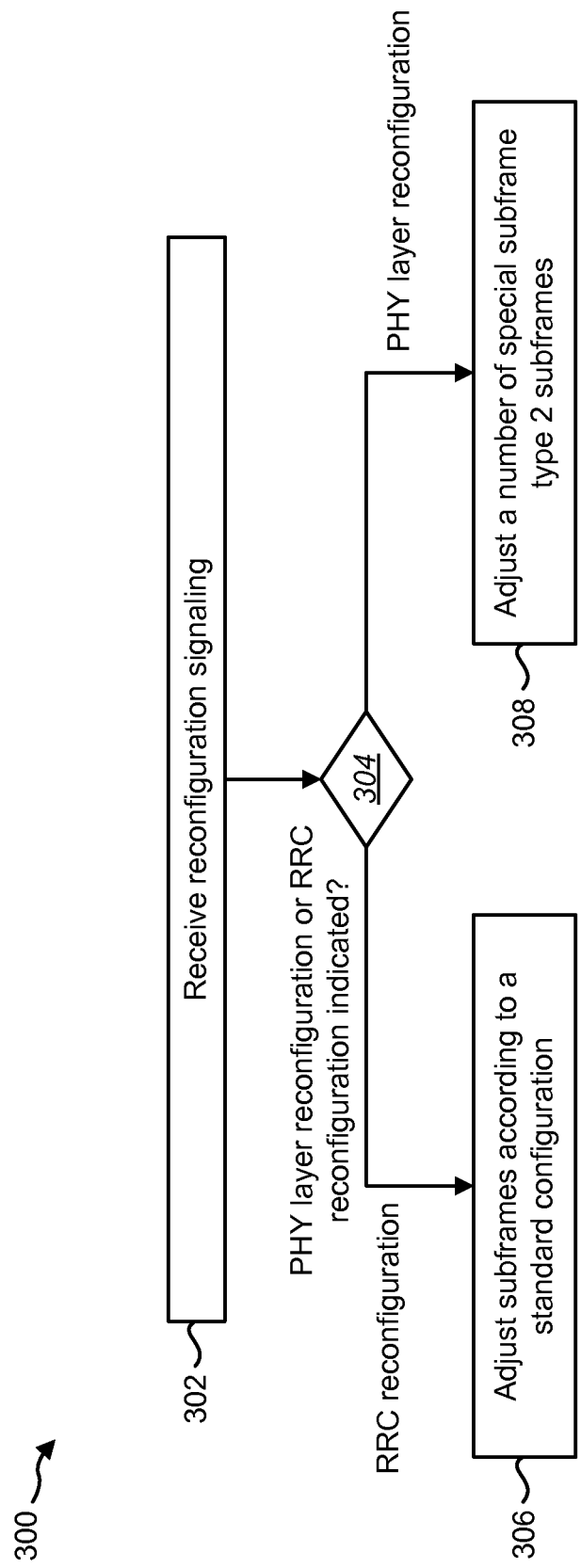
FIG. 3 is a flow diagram illustrating one configuration of a method for reconfiguring a subframe allocation on a UE.

FIG. 3 is a flow diagram illustrating one configuration of a method 300 for reconfiguring a subframe allocation on a UE 102. A UE 102 may receive 302 reconfiguration signaling. For example, the UE 102 may receive a signal that indicates a change in subframe allocation or UL-DL configuration. For example, the UE 102 may receive PHY layer signaling (for PHY layer configuration) or system information change signaling (for RRC reconfiguration).

The UE 102 may determine 304 whether PHY layer reconfiguration or RRC reconfiguration is indicated. For example, the UE 102 may determine whether the received 302 configuration signaling indicates an adjustment in a number of special subframe type 2 subframes or indicates a system information change procedure.

If RRC reconfiguration is indicated, the UE 102 may adjust 306 subframes according to a standard configuration 107. For example, the UE 102 may transition to one of the standard UL-DL configurations 107 as illustrated in Table (1) above.

If PHY layer reconfiguration is indicated, the UE 102 may adjust 308 a number of special subframe type 2 subframes. For example, the UE 102 may transition to a configuration that includes more or fewer special subframe type 2 subframes. In some implementations, adjusting 308 a number of special subframe type 2 subframes may be indicated by a receiving an uplink scheduling indicator corresponding to a downlink subframe. In the case, the UE 102 may convert a downlink subframe to a special subframe type 2.

Figure 4:
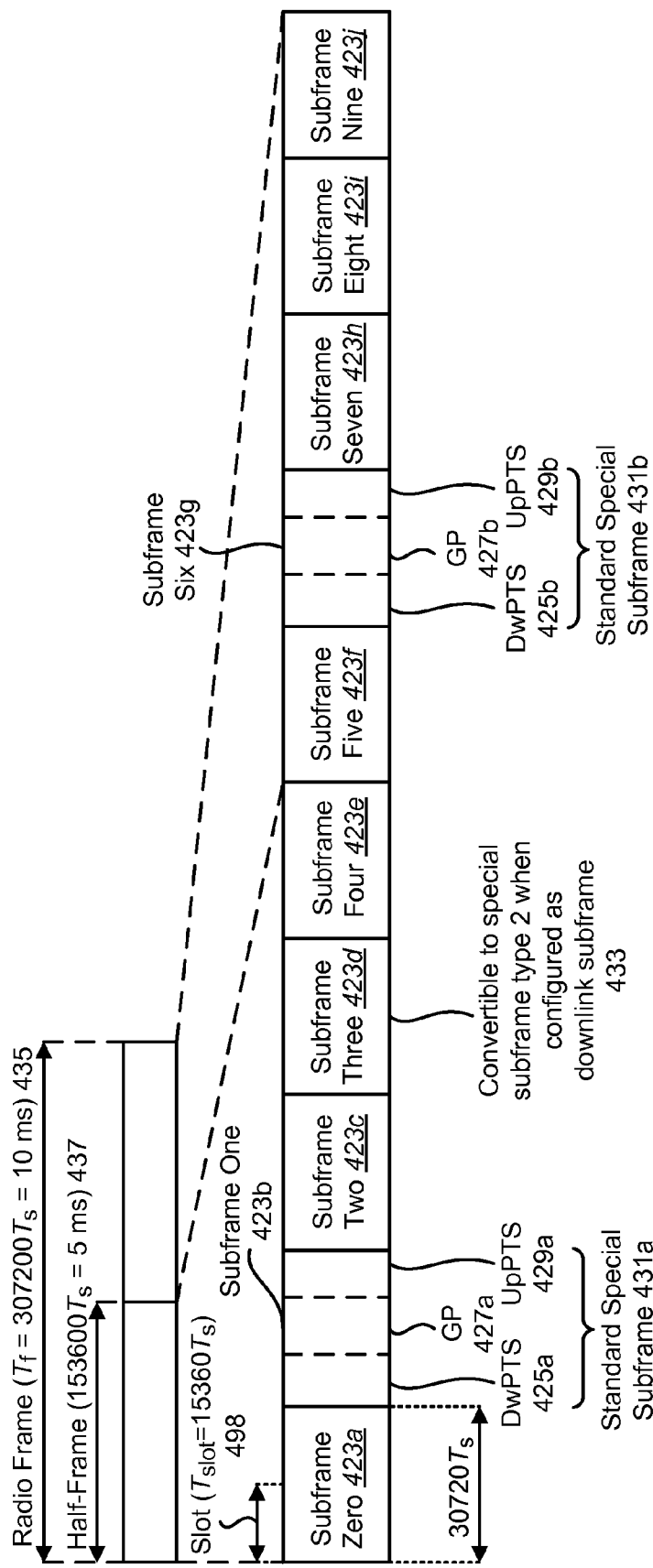
FIG. 4 is a diagram illustrating one example of a radio frame that may be used in accordance with the systems and methods disclosed herein.

FIG. 4 is a diagram illustrating one example of a radio frame 435 that may be used in accordance with the systems and methods disclosed herein. This radio frame 435 structure may be applicable in time-division duplexing (TDD) approaches. Each radio frame 435 may have a length of $T_f=307200 \cdot T_s=10$ milliseconds (ms), where $T_f$ is a radio frame 435 duration and $T_s$ is a time unit equal to $$\frac{1}{(15000 \times 2048)}$$

seconds. The radio frame 435 may include two half-frames 437, each having a length of $153600 \cdot T_s=5$ ms. Each half-frame 437 may include five subframes 423a-e, 423f-j each having a length of $30720 \cdot T_s=1$ ms.

In accordance with the systems and methods disclosed herein, some types of subframes 423 that may be used include a downlink subframe, an uplink subframe, a standard special subframe 431 and a special subframe type 2. In the example illustrated in FIG. 4, two standard special subframes 431a-b are included the radio frame 435.

The first standard special subframe 431a includes a downlink pilot time slot (DwPTS) 425a, a guard period (GP) 427a and an uplink pilot time slot (UpPTS) 429a. In this example, the first standard special subframe 431a is included in sub-frame one 423b. The second standard special subframe 431b includes a downlink pilot time slot (DwPTS) 425b, a guard period (GP) 427b and an uplink pilot time slot (UpPTS) 429b. In this example, the second standard special subframe 431b is included in subframe six 423g. The length of the DwPTS 425a-b and UpPTS 429a-b may be given by Table 4.2-1 of 3GPP TS 36.211 (illustrated in Table (2) above) subject to the total length of each set of DwPTS 425, GP 427 and UpPTS 429 being equal to $30720 \cdot T_s=1$ ms.

Each subframe i 423a-j (where i denotes a subframe ranging from subframe zero 423a (e.g., 0) to subframe nine 423j (e.g., 9) in this example) is defined as two slots, 2i and 2i+1 of length $T_{slot}=15360 \cdot T_s=0.5$ ms in each subframe 423. For example, subframe zero (e.g., 0) 423a may include two slots, including a first slot 498.

UL-DL configurations with both 5 ms and 10 ms downlink-to-uplink switch-point periodicity may be used in accordance with the systems and methods disclosed herein. FIG. 4 illustrates one example of a radio frame 435 with 5 ms switch-point periodicity. In the case of 5 ms downlink-to-uplink switch-point periodicity, each half-frame 437 includes a standard special subframe 431 a-b. In the case of 10 ms downlink-to-uplink switch-point periodicity, a special subframe may exist in the first half-frame 437 only.

Subframe zero (e.g., 0) 423a and subframe five (e.g., 5) 423f and DwPTS 425a-b may be reserved for downlink transmission. The UpPTS 429a-b and the subframe(s) immediately following the standard special subframe(s) 431a-b (e.g., subframe two 423c and subframe seven 423h) may be reserved for uplink transmission. In a case where multiple cells are aggregated, a UE 102 may assume the same UL-DL configuration across all the cells and that the guard period (GP) of the special subframe(s) in the different cells have an overlap of at least $1456 \cdot T_s$.

One or more of the subframes 423 illustrated in FIG. 4 may be converted to uplink subframes, depending on the UL-DL configuration used. Assuming UL-DL configuration 5 as given in Table (1) above, for example, subframe three (e.g., 3)

423d may be convertible to a special subframe type 2 when configured as a downlink subframe 433.

Figure 5:
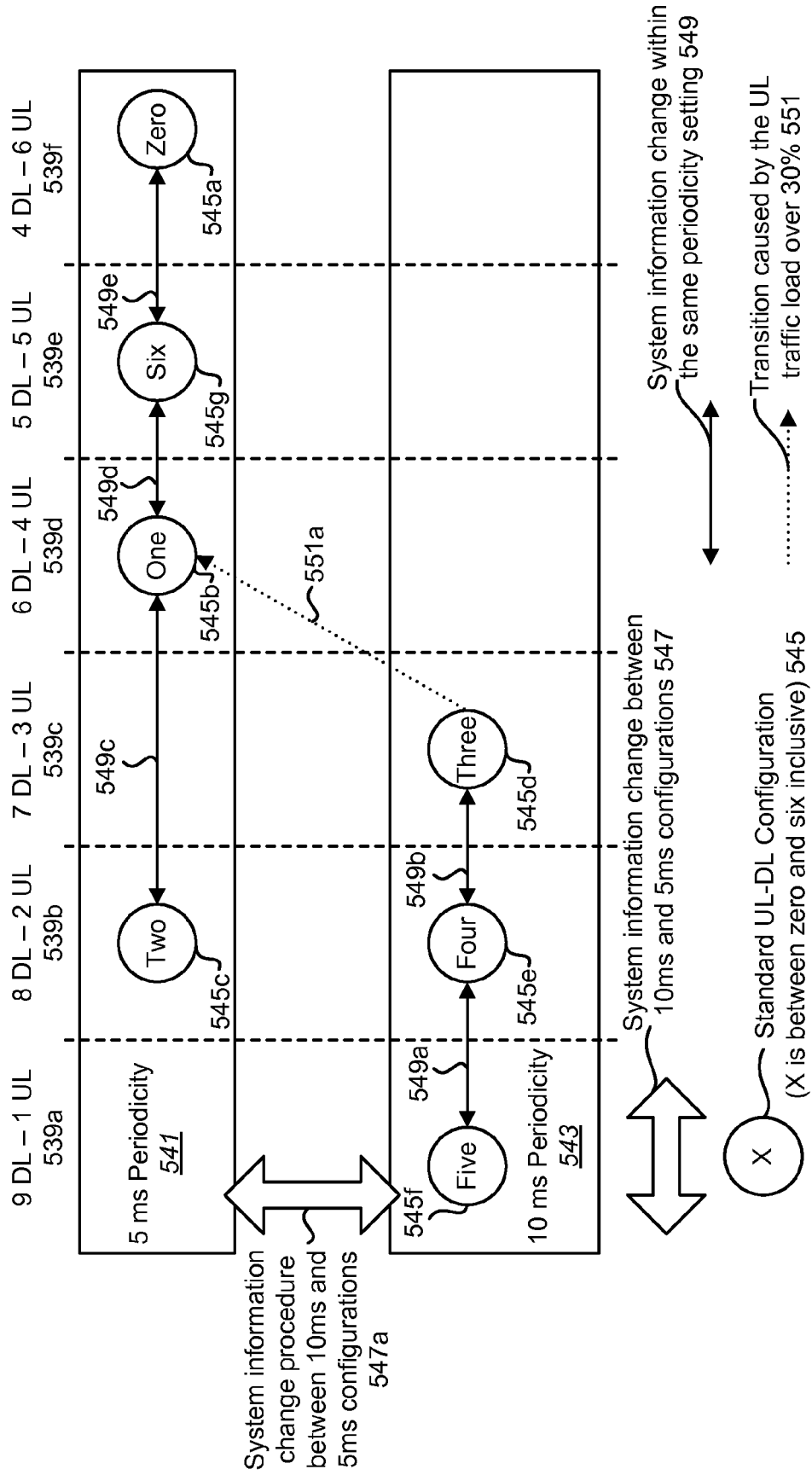
FIG. 5 is a state diagram illustrating one example of standard uplink-downlink (UL-DL) configurations and reconfiguration between the configurations.

FIG. 5 is a state diagram illustrating one example of standard uplink-downlink (UL-DL) configurations and reconfiguration between the configurations. In particular, FIG. 5 illustrates standard UL-DL configurations zero to six (e.g., 0-6) 545a-g. For example, the standard UL-DL configurations 545 may be illustrated in Table (1) above. In LTE-TDD, uplink-downlink configurations with both 5 millisecond (ms) downlink-to-uplink switch-point periodicity 541 and 10 ms downlink-to-uplink switch-point periodicity 543 are supported. As illustrated, UL-DL configurations zero 545a, one 545b, two 545c and six 545g have a 5 ms periodicity 541, while UL-DL configurations three 545d, four 545e and five 545f have 10 ms periodicity 543.

The UL-DL configurations 545a-g may support several UL-DL ratios 539a-f. For example, UL-DL configuration five 545f has a ratio of nine DL subframes to one UL subframe, two 545c and four 545e have a ratio of eight DL subframe to two UL subframes 539b, three 545d has a ratio of seven DL subframes to three UL subframes 539c, one 545b has a ratio of six DL subframes to four UL subframes 539d, six 545g has a ratio of five DL subframes to five UL subframes 539e and zero 545a has a ratio of four DL subframes to six UL subframes.

The reconfiguration between a 5 ms configuration and a 10 ms configuration requires more changes than a reconfiguration with the same periodicity. For example, a system information change between 10 ms and 5 ms configurations 547, 547a may require more changes than a system information change within the same periodicity setting 549, 549a-e. With a given periodicity setting, the reconfiguration may change to a better uplink-downlink configuration with the same periodicity. However, with 10 ms periodicity 543, the maximum uplink allocation provides three UL subframes 539c. If the uplink traffic load is higher than three UL subframes 539c, the subframe allocation may be reconfigured to a 5 ms configuration with more UL resources. For example, a transition 551, 551a may be caused by an UL traffic load over 30%.

Figure 6:
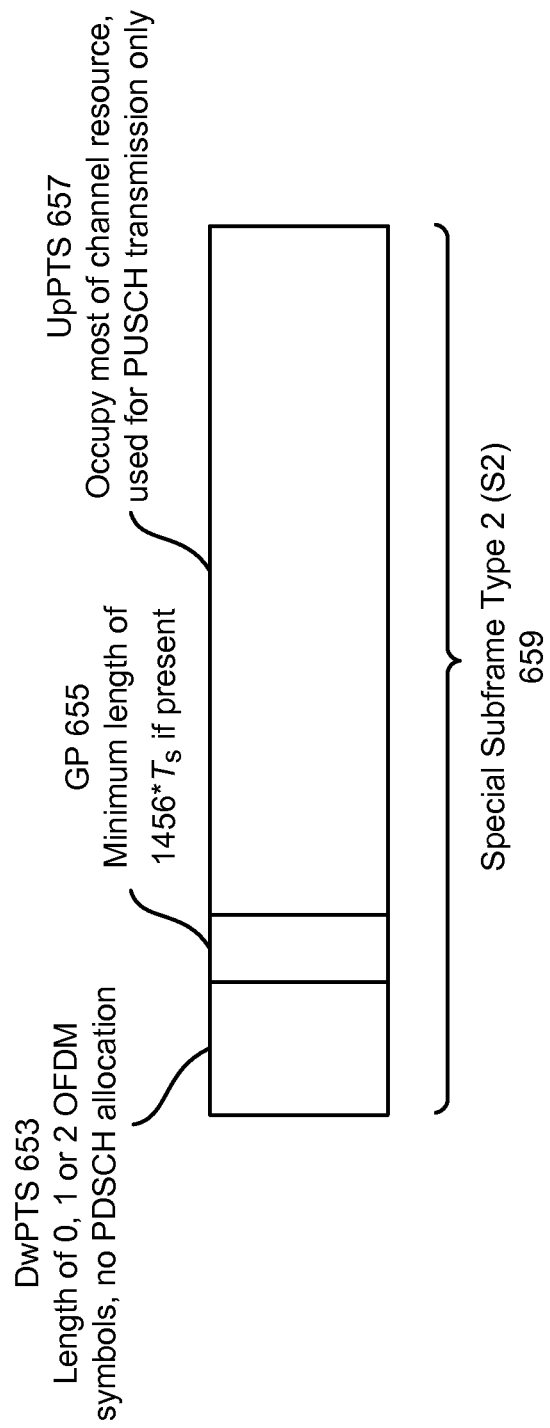
FIG. 6 is a diagram illustrating the structure of a special subframe type 2 (S2)

FIG. 6 is a diagram illustrating the structure of a special subframe type 2 (S2) 659. A standard special subframe (not to be confused with the special subframe type 2 (S2) 659) is used for downlink to uplink switching. In the standard special subframe, a short time may be allocated for uplink (e.g., one or two symbols), while most of the channel resource may be allocated for downlink transmission. However, the special subframe type 2 (S2) 659 may provide more resources for uplink transmission while maintaining all necessary downlink signaling (e.g., control information for PUSCH scheduling and PHICH feedback). A downlink subframe may be converted to a special subframe type 2 (S2) 659 by maintaining only the PDCCH transmission (if any) and allocating the rest of the resources to PUSCH transmission (with a possible guard period 655, for example).

In PUSCH scheduling with a PDCCH DCI format 0, a PUSCH allocation is a block of continuous resource blocks (RBs) represented by the index of the start RB and the number of RBs. The usable resource elements (REs) for each subcarrier in a PUSCH allocation for a special subframe type 2 (S2) 659 may be the same as a number of symbols in an uplink pilot time slot (UpPTS) 657 region.

Similar to a standard special subframe, a special subframe type 2 (S2) 659 may have three fields 653, 655, 657. In a standard special subframe, the three fields are a downlink pilot time slot (DwPTS), a guard period (GP) and an uplink pilot time slot (UpPTS). For convenience, the three fields 653, 655, 657 in the special subframe type 2 (S2) 659 may also be referred to as a DwPTS 653, a GP 655 and a UpPTS 657. Although the three fields 653, 655, 657 in the special subframe type 2 (S2) 659 may be referred to using the same names as in a standard special subframe, it should be noted that the characteristics of the three fields 653, 655, 657 in the special subframe type 2 (S2) 659 may be different from, similar to and/or the same as those of the same-named fields in the standard special subframe.

It should be noted that a special subframe type 2 (S2) 659 may differ from a standard special subframe in that the special subframe type 2 (S2) 659 may replace a downlink subframe (while the standard special subframe may not). The special subframe type 2 (S2) 659 may also carry more data in the UpPTS 657 than a standard special subframe may carry in its UpPTS.

The special subframe type 2 (S2) 659 may provide increased resources for uplink transmission while maintaining necessary downlink signaling. For example, a special subframe type 2 (S2) 659 maintains the PDCCH region as needed, but has no PDSCH allocation. Most of the resources in a special subframe type 2 (S2) 659 are assigned for PUSCH transmissions. Since all uplink control feedback is associated with existing uplink subframes, no PUCCH allocation and PUCCH transmission may be allowed in a special subframe type 2 (S2) 659.

In the special subframe type 2 (S2) 659, a DwPTS 653 may be limited to provide only necessary downlink control signaling (e.g., PDCCH and PHICH). The PDCCH may be used to schedule a PUSCH transmission in an uplink subframe. However, since a PDCCH in a special subframe type 2 (S2) 659 may not schedule a PDSCH transmission, the size of the DwPTS 653 in a special subframe type 2 (S2) 659 may be smaller than a DwPTS in a regular downlink subframe. For example, the number of orthogonal frequency-division multiplexing (OFDM) symbols used for a PDCCH may be limited to one or two when the number of resource blocks in a special subframe type 2 (S2) 659 is greater than 10. Furthermore, the number of OFDM symbols used for a PDCCH may be two when the number of resource blocks in a special subframe type 2 (S2) 659 is smaller than or equal to 10.

A guard period (GP) 655 allows a UE 102 to adjust a time advance for uplink transmission. If the uplink and downlink have the same cyclic prefix (CP) configuration, the GP 655 in a special subframe type 2 (S2) 659 may have a length of one OFDM symbol. If the uplink and downlink have different cyclic prefix (CP) configurations, the GP may be less than or more than one OFDM symbol. However, to ensure the switch timing, the GP 655 (if present) of a special subframe type 2 (S2) 659 (if used) should have a length of at least $1456 \cdot T_s$.

If a downlink subframe does not have an association with PUSCH scheduling, power control and PHICH feedback to any uplink transmissions in the current UL-DL configuration, the downlink subframe may be converted to a special subframe type 2 (S2) 659 with no reserved PDCCH region (e.g., a DwPTS 653 length of 0). If the downlink subframe is immediately after an uplink subframe (or possibly after a special subframe type 2 (S2) 659 in some configurations), the downlink subframe can be fully converted to an uplink subframe with no GP 655. If no PDCCH region is needed, but the downlink subframe to be converted is after a downlink subframe, the first OFDM symbol length may be reserved as a GP 655, while all other OFDM symbols may be allocated for uplink transmission, for example.

In one configuration of the special subframe type 2 (S2) 659, the length of the DwPTS 653 and the length of the UpPTS 657 are given by Table (3) above, subject to the total length of DwPTS 653, GP 655 and UpPTS 657 being equal to $30720 \cdot T_s = 1$ ms.

Figure 7:
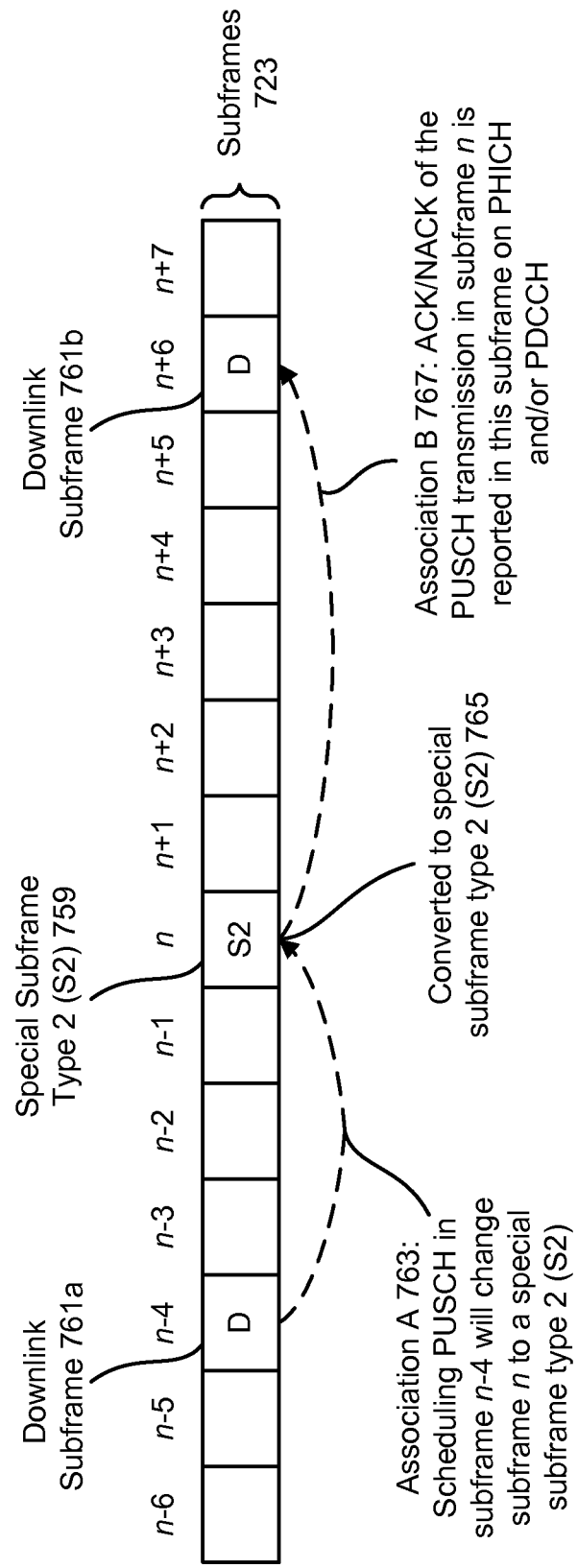
FIG. 7 is a diagram illustrating one example of downlink subframe conversion in accordance with the systems and methods disclosed herein.

FIG. 7 is a diagram illustrating one example of downlink subframe conversion in accordance with the systems and methods disclosed herein. More specifically, FIG. 7 illustrates several subframes 723 in which a subframe n (that was previously a downlink subframe) may be converted to a special subframe type 2 (S2) 765. Additionally, FIG. 7 illustrates special subframe type 2 (S2) conversion rules and PHY layer signaling.

According to current 3GPP specifications, no PUSCH transmission should be scheduled in a downlink subframe in TDD. The PUSCH assignment in an uplink subframe has a one-to-one association mapping to a downlink subframe. For example, for TDD UL/DL configurations 1-6 and normal HARQ operation, the UE may upon detection of a PDCCH with uplink DCI format 0 and/or a PHICH transmission in subframe n intended for the UE, adjust the corresponding PUSCH transmission in subframe n+k, with k given in Table 8-2 of 3GPP TS 36.213, according to the PDCCH and PHICH information. According to current specifications, there may be some downlink subframes that cannot carry DCI format 0 for PUSCH allocation or cannot have PHICH feedback.

In accordance with the systems and methods disclosed herein, a downlink subframe may be converted to a special subframe type 2 (S2) 765 (using extended PHY layer signal, for example). This may occur, for example, when one or more DCI format 0 PUSCH transmissions are allocated in a downlink subframe (that is not allowed to have DCI format 0 for PUSCH assignment in current 3GPP Release 8, 9 and 10 specifications) or when PHICH feedback is required for a previously allocated special subframe type 2.

Associations for a special subframe type 2 (S2) 759 (as extensions to current PHY layer associations, for example) may be specified as follows. If there are no existing associations in subframe n−4 for PUSCH scheduling and/or ACK/NACK feedback for PUSCH transmission on a PHICH and/or a PDCCH, a PDCCH with DCI format 0 in subframe n−4 (e.g., a downlink subframe 761a including a PDCCH with DCI format 0) may convert a downlink subframe n 765 (that was previously a downlink subframe, for example) to a special subframe type 2 (S2) 759. For instance, association A 763 specifies that scheduling a PUSCH in a subframe n−4 (e.g., downlink subframe 761a) may convert subframe n to a special subframe type 2 (S2) 759. Subframe n may be converted to a special subframe type 2 (S2) 759 following control information in subframe n−4. One or more UEs 102 with a PUSCH allocation may transmit in subframe n.

The ACK/NACK feedback for a special subframe type 2 with subframe number n may be reported in subframe n+6 (e.g., downlink subframe 761b). For instance, association B 767 specifies that ACK/NACK for a special subframe type 2 (S2) 759 may be reported in subframe n+6. It should be noted that these associations 763, 767 may apply over radio frame boundaries.

In one configuration, the ACK/NACK for PUSCH transmission in a converted subframe n may be carried on a PHICH in downlink subframe n+6. Optionally, the PDCCH in a subframe n+6 may override the PHICH and schedule a new data transmission or a retransmission in a subframe n+10 by indicating whether this is new transmission or not.

In another configuration, there may be no PHICH for PUSCH transmission in the converted subframe n. Instead, the PDCCH in subframe n+6 indicates an ACK or NACK by indicating whether a new transmission is scheduled. If new data is indicated, this implies an ACK of the PUSCH transmission in subframe n. Thus, new data is transmitted in subframe n+10.

If the PDCCH indicates old data, it implies a NACK of the PUSCH transmission in subframe n, thus the same data is re-transmitted in subframe n+10. If the UE 102 does not detect any PDCCH, the UE 102 may not transmit a PUSCH in subframe n+10. Since TDD may have a common interval of 10 for both 5 ms and 10 ms configurations, n+6=(n−4)+10, the PHICH and PDCCH allocation with DCI format 0 may always have the same downlink subframe index number.

In other words, the PUSCH of a special subframe type 2 (S2) 759 with subframe number n may be scheduled in the PDCCH or a PHICH feedback of a downlink subframe that is four subframes before the special subframe type 2 (S2) 759 (e.g., a downlink subframe 761a with subframe number n−4). The ACK/NACK feedback of the PUSCH transmission in a special subframe type 2 (S2) 759 with subframe number n may be reported on a PHICH or by explicit PDCCH scheduling in a downlink subframe 761b with subframe number n+6.

In some implementations, n may denote a current subframe in a cycling set of subframe numbers or indices i. The subframe numbers or indices i may range from 0 to 9, where each cycle corresponds to a radio frame. Thus, if a number k is added to or subtracted from n that is beyond the range of a cycle of i (e.g., $0 \leq i \leq 9$), the result may specify a subframe in a different radio frame. For instance, n+k=i, where n=9 and k=4, may specify a subframe i =3 in a radio frame following the current radio frame. In other words, the index can be represented by a modular function, mod(n+k)=i, where if (n+k)=i, they are in the same radio frame. If $(n+k) \geq 10$, i=mod (n+k)=n+k−10, where subframe index i is in the radio frame following the current radio frame.

In accordance with the example illustrated in FIG. 7, the eNB 160 may transmit and the UE(s) 102 may receive PHY layer signaling in the downlink subframe 761a that is four subframes before the target downlink subframe that is converted to the special subframe type 2 (S2) 759. One or more UEs 102 and optionally the eNB 160 may transmit (and/or receive) data in the special subframe type 2 (S2) 759. The eNB 160 may transmit and the UE(s) 102 may receive ACK/NACK data in the downlink subframe 761b that is six subframes after the target downlink subframe that is converted to the special subframe type 2 (S2) 759. The ACK/NACK data may correspond to data transmitted from the UE(s) 102 to the eNB 160 in the special subframe type 2 (S2) 759.

Figure 8:
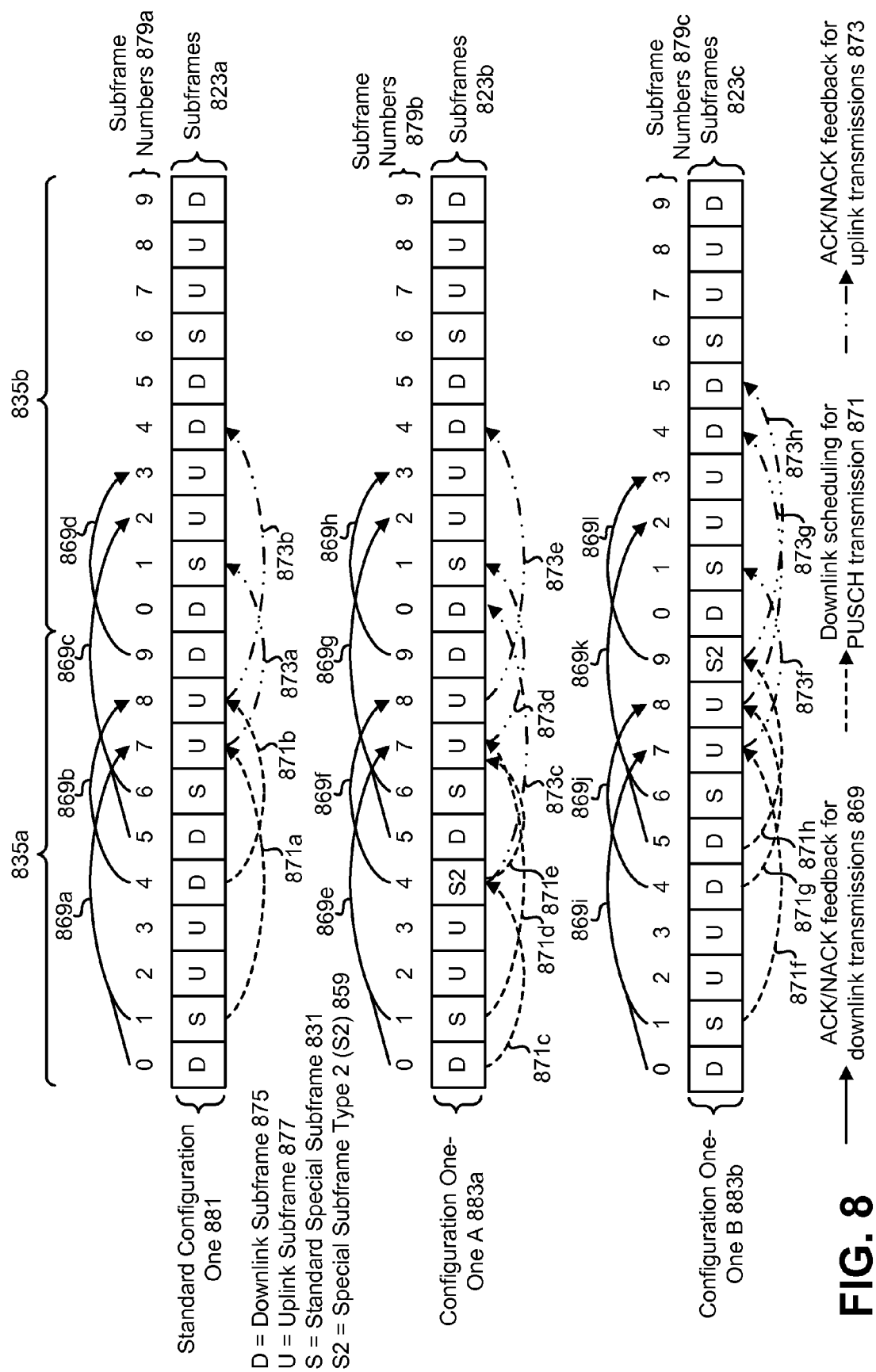
FIG. 8 is a diagram illustrating some possible configurations related to standard configuration one that may be used in accordance with the systems and methods disclosed herein.

FIG. 8 is a diagram illustrating some possible configurations related to standard configuration one that may be used in accordance with the systems and methods disclosed herein. For example, some possible configurations with PHY layer signaling are given hereafter. It should be noted that the terms "state," "configuration" and "subframe allocation" may be used interchangeably herein, depending on context. It should also be noted that, in some cases, Arabic numerals may be spelled out in text for convenience.

It should be noted that "D" denotes a downlink subframe 875, "U" denotes an uplink subframe 877, "S" denotes a standard special subframe 831 and "S2" denotes a special subframe type 2 859 in FIG. 8. Furthermore, ACK/NACK feedback for downlink transmissions associations 869, 869a-l, downlink scheduling for PUSCH transmission associations 871, 871a-h and ACK/NACK feedback for uplink transmissions associations 873, 873a-h are illustrated.

FIG. 8 illustrates standard configuration one 881 (e.g., "configuration 1") with subframes 823a and subframe numbers 879a. FIG. 8 also illustrates configuration one-one A 883a with subframes 823b and subframe numbers 879b. FIG. 8 further illustrates configuration one-one B 883b with subframes 823c and subframe numbers 879c.

Standard configuration one 881 is a 5 ms configuration with four UL subframes 877 (per radio frame 835). In accordance with the systems and methods disclosed herein, when PHY layer signaling is applied to a DL pair of subframes 823 (for "PHY layer reconfiguration," for example), one of the DL subframes 875 in the pair is converted to a special subframe type 2 (S2) 859. PHY layer signaling may be applied on a DL pair of subframe 0 and subframe 4 (according to subframe numbers 879b) to produce configuration one-one A 883a (e.g., "configuration 1-1a"). PHY layer signaling may additionally or alternatively be applied on a DL pair of subframe 5 and subframe 9 (according to subframe numbers 879c) to produce configuration one-one B 883b (e.g., "configuration 1-1b").

Figure 9:
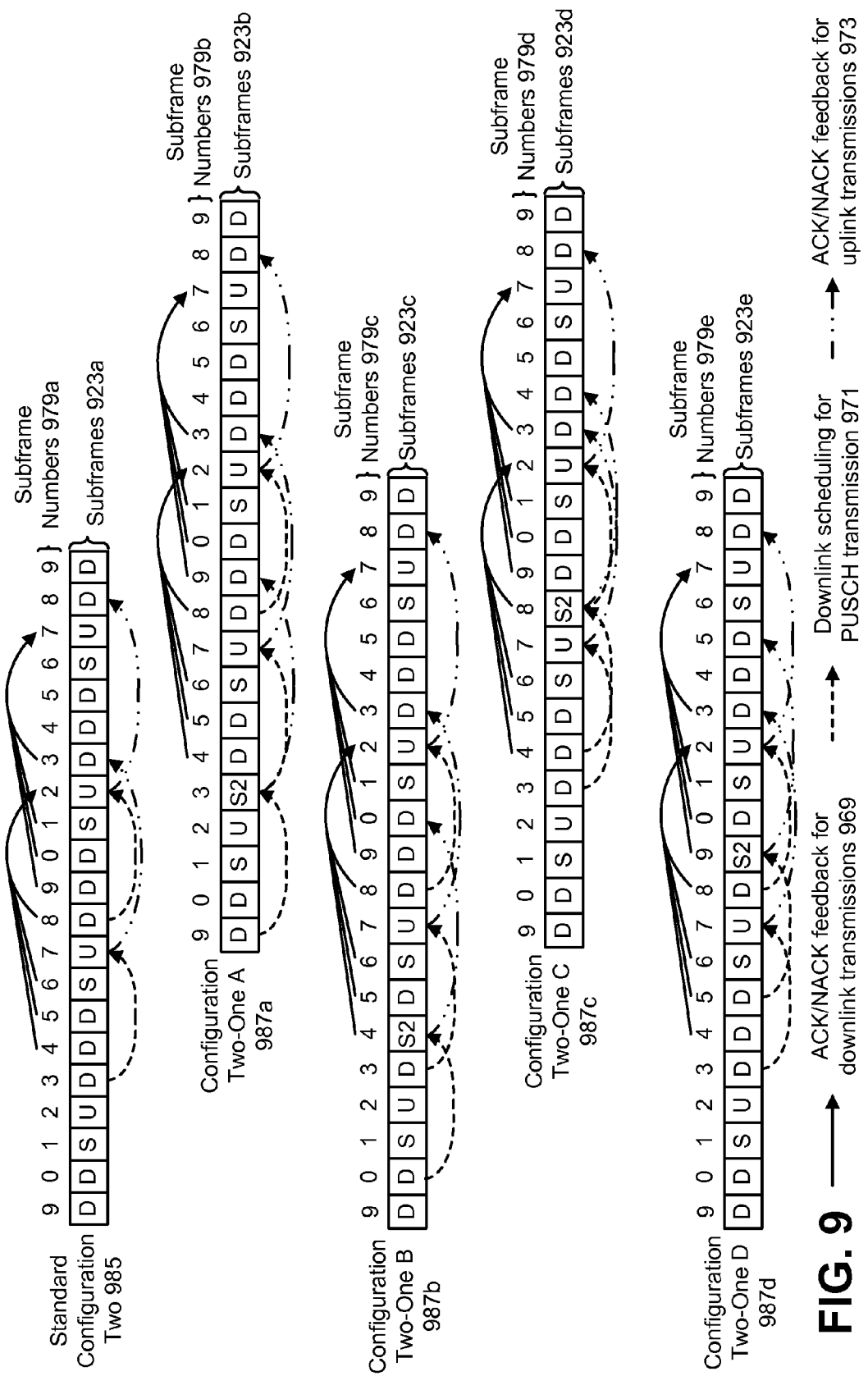
FIG. 9 is a diagram illustrating some possible configurations related to standard configuration two that may be used in accordance with the systems and methods disclosed herein.

FIG. 9 is a diagram illustrating some possible configurations related to standard configuration two that may be used in accordance with the systems and methods disclosed herein. For example, some possible configurations with PHY layer signaling are given hereafter.

It should be noted that "D" denotes a downlink subframe, "U" denotes an uplink subframe, "S" denotes a standard special subframe and "S2" denotes a special subframe type 2 in FIG. 9. Furthermore, ACK/NACK feedback for downlink transmissions associations 969 downlink scheduling for PUSCH transmission associations 971 and ACK/NACK feedback for uplink transmissions associations 973 are illustrated.

FIG. 9 illustrates standard configuration two 985 (e.g., "configuration 2") with subframes 923a and subframe numbers 979a. Configurations two-one A 987a with subframes 923b and subframe numbers 979b, two-one B 987b with subframes 923c and subframe numbers 979c, two-one C 987c with subframes 923d and subframe numbers 979d and two-one D 987d with subframes 923e and subframe numbers 979e are also illustrated in FIG. 9.

Standard configuration two 985 is a 5 ms configuration with two UL subframes (per radio frame). In accordance with the systems and methods disclosed herein, when PHY layer signaling is applied to a DL pair of subframes 923 (for "PHY layer reconfiguration," for example), one of the DL subframes (e.g., the latter) in the pair is converted to a special subframe type 2 (S2). PHY layer signaling may be applied on a DL pair of subframe 9 and subframe 3 (according to subframe numbers 979b) to produce configuration two-one A 987a (e.g., "configuration 2-1a"). PHY layer signaling may additionally or alternatively be applied on a DL pair of subframe 0 and subframe 4 (according to subframe numbers 979c) to produce configuration two-one B 987b (e.g., "configuration 2-1b"). PHY layer signaling may additionally or alternatively be applied on a DL pair of subframe 4 and subframe 8 (according to subframe numbers 979d) to produce configuration two-one C 987c (e.g., "configuration 2-1c"). PHY layer signaling may additionally or alternatively be applied on a DL pair of subframe 5 and subframe 9 (according to subframe numbers 979e) to produce configuration two-one D 987d (e.g., "configuration 2-1d").

Figure 10:
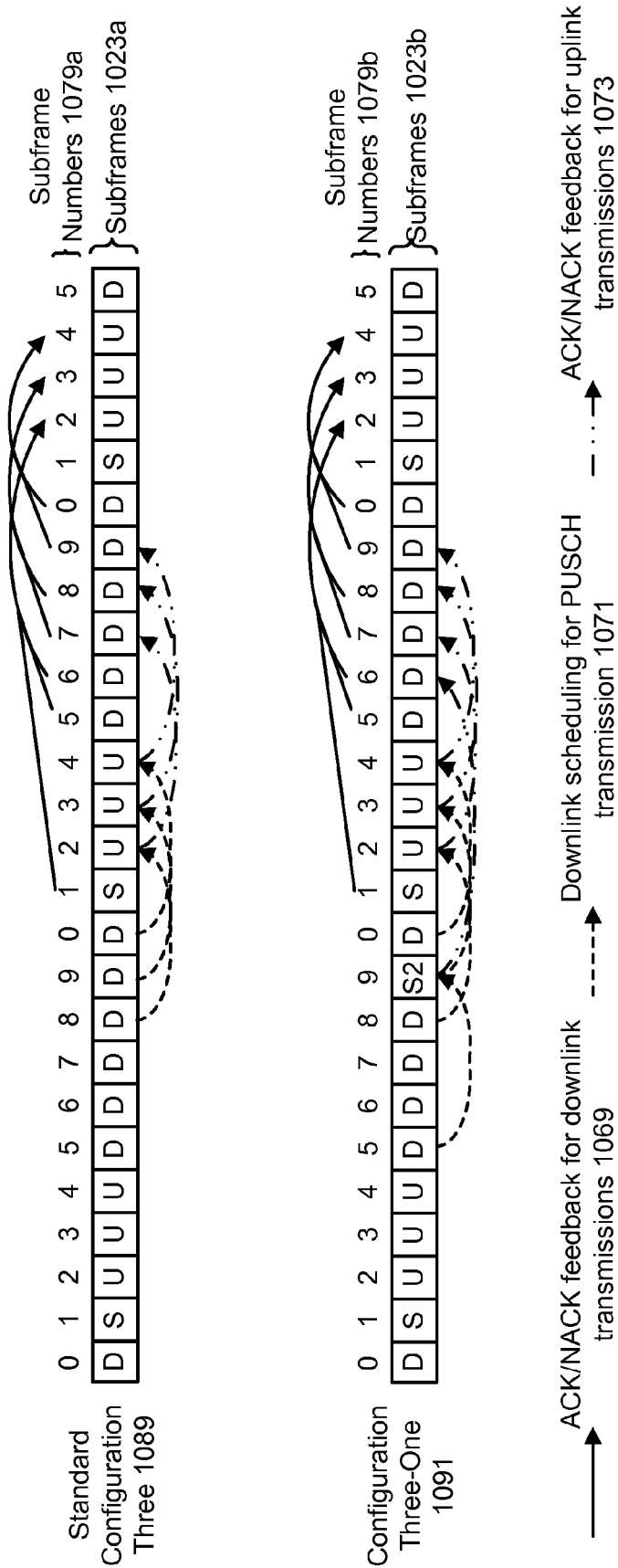
FIG. 10 is a diagram illustrating a possible configuration related to standard configuration three that may be used in accordance with the systems and methods disclosed herein.

FIG. 10 is a diagram illustrating a possible configuration related to standard configuration three that may be used in accordance with the systems and methods disclosed herein. For example, some possible configurations with PHY layer signaling are given hereafter.

It should be noted that "D" denotes a downlink subframe, "U" denotes an uplink subframe, "S" denotes a standard special subframe and "S2" denotes a special subframe type 2 in FIG. 10. Furthermore, ACK/NACK feedback for downlink transmissions associations 1069 downlink scheduling for PUSCH transmission associations 1071 and ACK/NACK feedback for uplink transmissions associations 1073 are illustrated.

FIG. 10 illustrates standard configuration three 1089 (e.g., "configuration 3") with subframes 1023a and subframe numbers 1079a. Configuration three-one 1091 with subframes 1023b and subframe numbers 1079b are also illustrated in FIG. 10.

Standard configuration three 1089 provides an UL allocation of three UL subframes (per radio frame, which may be the maximum number of uplink subframes for current 10 ms configurations). If the UL load goes above 30%, a UL-DL reconfiguration (e.g., RRC reconfiguration) may be triggered. The allocation may be changed from a 10 ms to a 5 ms configuration, which is a more significant change than among configurations with the same periodicity. With a ripple effect, this may cause serious network disruption.

In accordance with the systems and methods disclosed herein, when PHY layer signaling is applied to a DL pair of subframes 1023 (for "PHY layer reconfiguration," for example), one of the DL subframes (e.g., the latter) in the pair is converted to a special subframe type 2 (S2). PHY layer signaling may be applied on a DL pair of subframe 5 and subframe 9 (according to subframe numbers 1079b) to produce configuration three-one 1091 (e.g., "configuration 3-1").

In accordance with the systems and methods disclosed herein, scheduling a PUSCH transmission in subframe 5 may convert subframe 9 to a special subframe type 2. This may provide a 40% (e.g., 4/10 subframes for) UL allocation in configuration three-one 1091. This may provide a middle state to mitigate a temporary uplink traffic hike with 10% channel resource, which reduces the probability of a massive configuration change (e.g., RRC reconfiguration) between 5 ms and 10 ms configurations. This approach with a special subframe type 2 in subframe 9 may also provide a 5 ms uplink interval if it is used together with uplink subframe 4.

Figure 11:
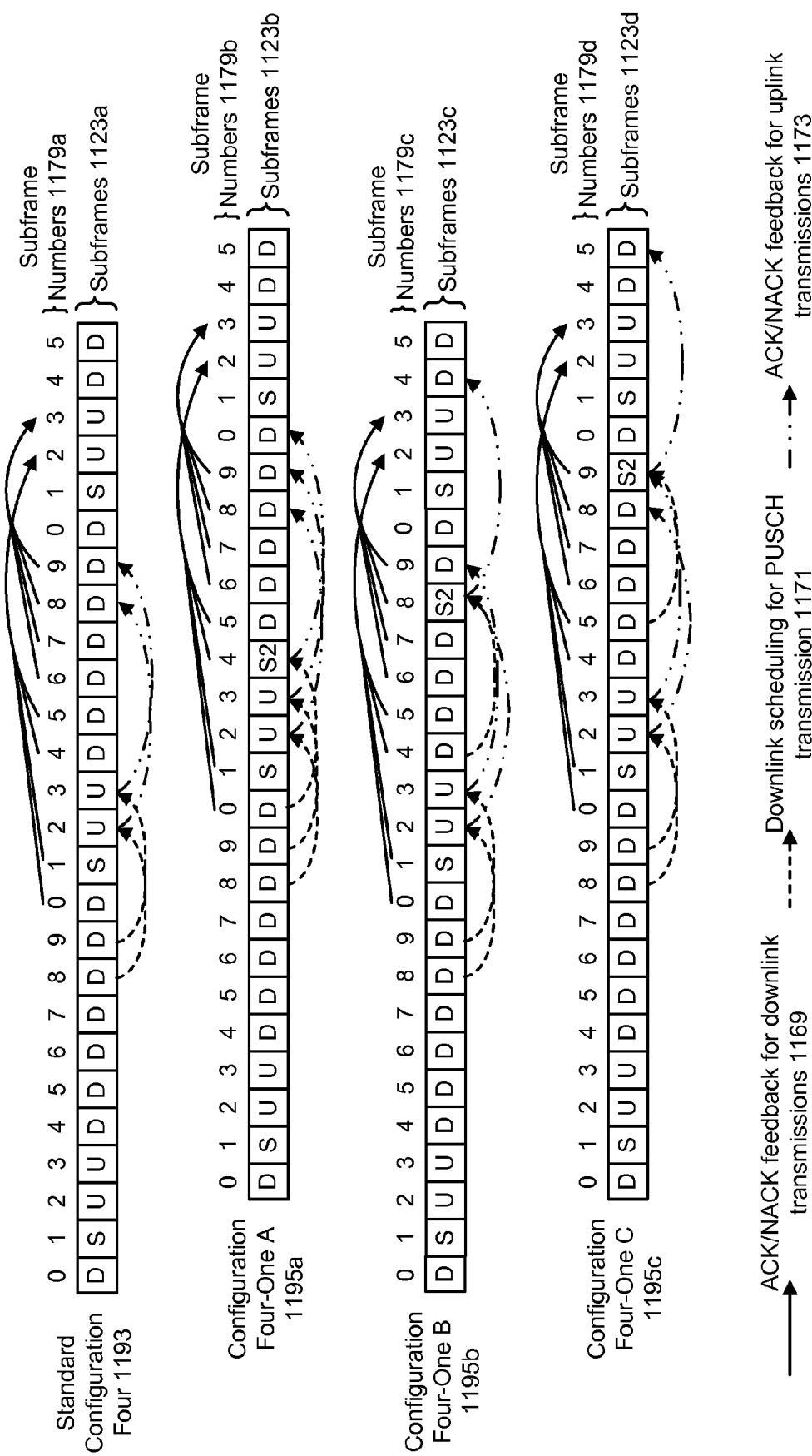
FIG. 11 is a diagram illustrating some possible configurations related to standard configuration four that may be used in accordance with the systems and methods disclosed herein.

FIG. 11 is a diagram illustrating some possible configurations related to standard configuration four that may be used in accordance with the systems and methods disclosed herein. For example, some possible configurations with PHY layer signaling are given hereafter.

It should be noted that "D" denotes a downlink subframe, "U" denotes an uplink subframe, "S" denotes a standard special subframe and "S2" denotes a special subframe type 2 in FIG. 11. Furthermore, ACK/NACK feedback for downlink transmissions associations 1169 downlink scheduling for PUSCH transmission associations 1171 and ACK/NACK feedback for uplink transmissions associations 1173 are illustrated.

FIG. 11 illustrates standard configuration four 1193 (e.g., "configuration 4") with subframes 1123a and subframe numbers 1179a. Configurations four-one A 1195a with subframes 1123b and subframe numbers 1179b, four-one B 1195b with subframes 1123c and subframe numbers 1179c and four-one C 1195c with subframes 1123d and subframe numbers 1179d are also illustrated in FIG. 11.

Standard configuration four 1193 is a 10 ms configuration with two UL subframes (per radio frame). In accordance with the systems and methods disclosed herein, when PHY layer signaling is applied to a DL pair of subframes 1123 (for "PHY layer reconfiguration," for example), one of the DL subframes (e.g., the latter) in the pair is converted to a special subframe type 2 (S2). PHY layer signaling may be applied on a DL pair of subframe 0 and subframe 4 (according to subframe numbers 1179*b*) to produce configuration four-one A 1195*a* (e.g., "configuration 4-1a"). PHY layer signaling may additionally or alternatively be applied on a DL pair of subframe 4 and subframe 8 (according to subframe numbers 1179*c*) to produce configuration four-one B 1195*b* (e.g., "configuration 4-1 b"). PHY layer signaling may additionally or alternatively be applied on a DL pair of subframe 5 and subframe 9 (according to subframe numbers 1179*d*) to produce configuration four-one C 1195*c* (e.g., "configuration 4-1c").

Figure 12:
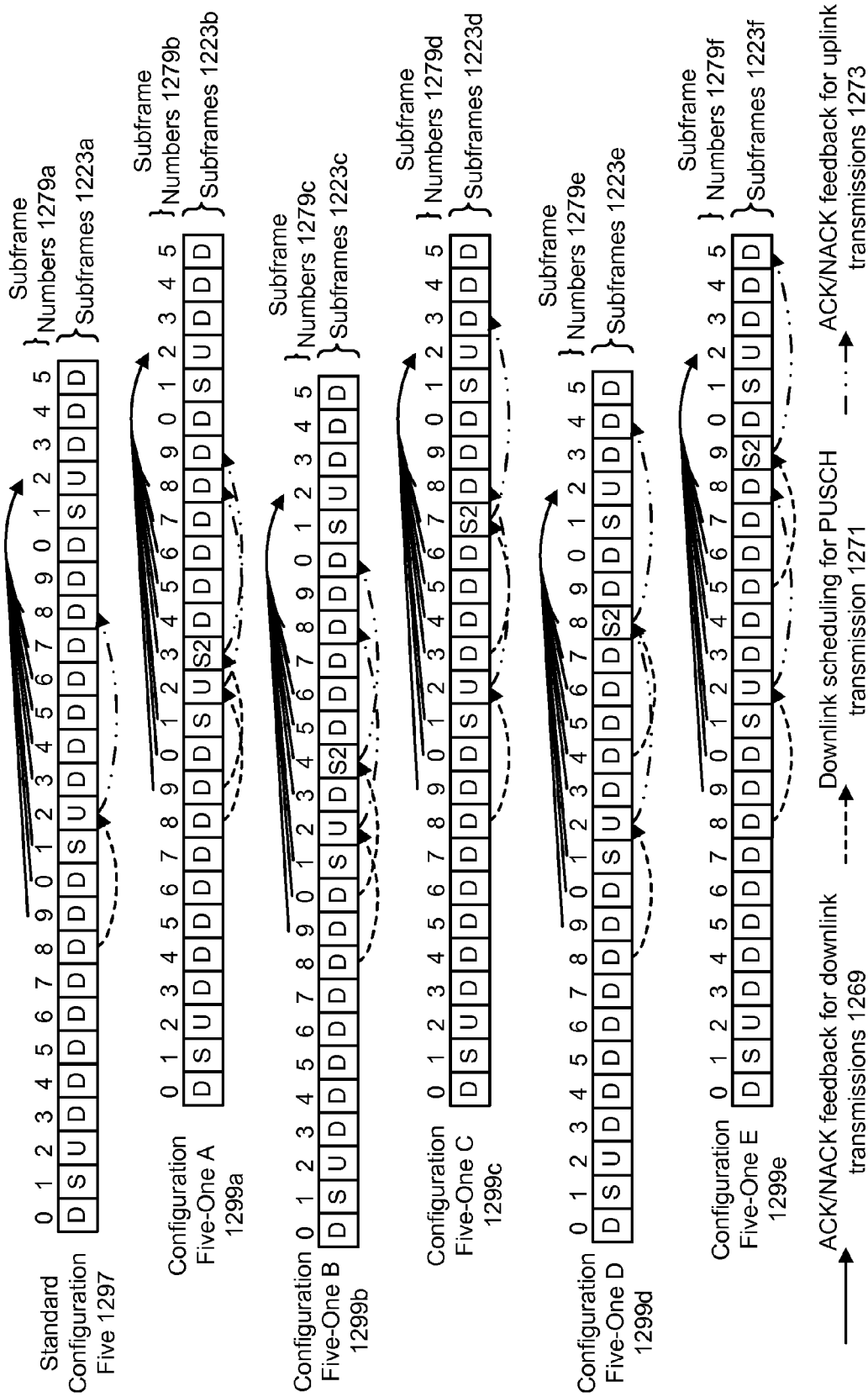
FIG. 12 is a diagram illustrating some possible configurations related to standard configuration five that may be used in accordance with the systems and methods disclosed herein.

FIG. 12 is a diagram illustrating some possible configurations related to standard configuration five that may be used in accordance with the systems and methods disclosed herein. For example, some possible configurations with PHY layer signaling are given hereafter.

It should be noted that "D" denotes a downlink subframe, "U" denotes an uplink subframe, "S" denotes a standard special subframe and "S2" denotes a special subframe type 2 in FIG. 12. Furthermore, ACK/NACK feedback for downlink transmissions associations 1269 downlink scheduling for PUSCH transmission associations 1271 and ACK/NACK feedback for uplink transmissions associations 1273 are illustrated.

FIG. 12 illustrates standard configuration five 1297 (e.g., "configuration 5") with subframes 1223*a* and subframe numbers 1279*a*. Configurations five-one A 1299*a* with subframes 1223*b* and subframe numbers 1279*b*, five-one B 1299*b* with subframes 1223*c* and subframe numbers 1279*c*, five-one C 1299*c* with subframes 1223*d* and subframe numbers 1279*d*, five-one D 1299*d* with subframes 1223*e* and subframe numbers 1279*e* and five-one E 1299*e* with subframes 1223*f* and subframe numbers 1279*f* are also illustrated in FIG. 12.

Standard configuration five 1297 is a 10 ms configuration with one UL subframe (per radio frame). In accordance with the systems and methods disclosed herein, when PHY layer signaling is applied to a DL pair of subframes 1223 (for "PHY layer reconfiguration," for example), one of the DL subframes (e.g., the latter) in the pair is converted to a special subframe type 2 (S2). In accordance with the systems and methods disclosed herein, there are five possible PHY layer signaling transmission pairs in this case. PHY layer signaling may be applied on a DL pair of subframe 9 and subframe 3 (according to subframe numbers 1279*b*) to produce configuration five-one A 1299*a* (e.g., "configuration 5-1a"). PHY layer signaling may additionally or alternatively be applied on a DL pair of subframe 0 and subframe 4 (according to subframe numbers 1279*c*) to produce configuration five-one B 1299*b* (e.g., "configuration 5-1b").

PHY layer signaling may additionally or alternatively be applied on a DL pair of subframe 3 and subframe 7 (according to subframe numbers 1279*d*) to produce configuration five-one C 1299*c* (e.g., "configuration 5-1c"). PHY layer signaling may additionally or alternatively be applied on a DL pair of subframe 4 and subframe 8 (according to subframe numbers 1279*e*) to produce configuration five-one D 1299*d* (e.g., "configuration 5-1d"). PHY layer signaling may additionally or alternatively be applied on a DL pair of subframe 5 and subframe 9 (according to subframe numbers 1279*f*) to produce configuration five-one E 1299*e* (e.g., "configuration 5-1e").

In one approach that provides increased flexibility from PHY layer signaling for dynamic subframe conversion, all transition states (e.g., states, configurations or subframe allocations) that satisfy the condition may be allowed. In this case, TDD UL-DL Configurations zero (e.g., 0) and six (e.g., 6) cannot have dynamic PHY layer signaling for subframe conversion. TDD UL-DL configuration three has one possible state for subframe conversion from downlink to a special subframe type 2. TDD UL-DL Configurations one, two, four and five (e.g., 1, 2, 4 and 5) have multiple PHY layer signaling possibilities with two, four, three and five pairs for dynamic subframe conversion, respectively. The PHY layer signaling may dynamically convert multiple subframes. The multiple subframe pairs for PHY layer signaling conversion may lead to many combination states in this approach.

In one example with configuration five (e.g., "5"), there are five possible downlink subframes to special subframe type 2 conversion pairs with PHY layer signaling. If all PHY layer signaling for subframe conversion is allowed, multiple combinations exist that provide the same uplink to downlink allocation ratio. When only one subframe is converted to a special subframe type 2, there are five possible cases, all of which provide the same UL-DL ratio. When two subframes are converted to special subframe type 2 subframes, there are ten different combinations available. All ten provide the same UL-DL ratio. Similarly, there are ten, five and one combinations if three, four or five subframes are converted to special subframe type 2 subframes.

The plurality of different combinations with the same UL-DL allocation ratios leads to higher system complexity and potential errors. Furthermore, the PDCCH may not be very reliable. Thus, a misdetection may occur at a UE 102. In Release-10, a UE will ignore a PDCCH signaling if it conflicts with the UL-DL configuration. For example, if a UE receives a PDCCH that schedules a PUSCH transmission in a downlink subframe, the UE may treat it as an error or misdetection and ignore the PDCCH scheduling. With the PHY layer signaling extension in accordance with the systems and methods disclosed herein, if a Release-11 UE (e.g., UE 102) receives a PDCCH that schedules a PUSCH transmission in a downlink subframe, the UE may not treat this as an error. Rather, the UE may follow a dynamic downlink to uplink conversion procedure with a special subframe type 2.

If all combinations are allowed, it may be difficult for a UE 102 to differentiate a PDCCH misdetection from a PHY layer subframe conversion. Therefore, allowing arbitrary subframe conversion (although it provides flexibility) introduces extra complexity and more erroneous PDCCH misdetection. Therefore, it may be better to limit the subframes for downlink to uplink transition to reduce PDCCH misdetection and/or incorrect scheduling. If the subframes allowed for downlink to subframe transition are known at the UE 102, the UE 102 can detect and discard a physical layer signaling that requires a downlink to uplink transition in a downlink subframe that is outside the allowed subframe list. Furthermore, to avoid a PDCCH misdetection, a more reliable PDCCH format may be used for downlink to uplink conversion with a special subframe type 2. For example, one or more information fields of downlink control information on PDCCH may be verified to determine whether the fields are set to a fixed value. This may be done in addition to using a cyclic redundancy check (CRC) field.

Figure 13:
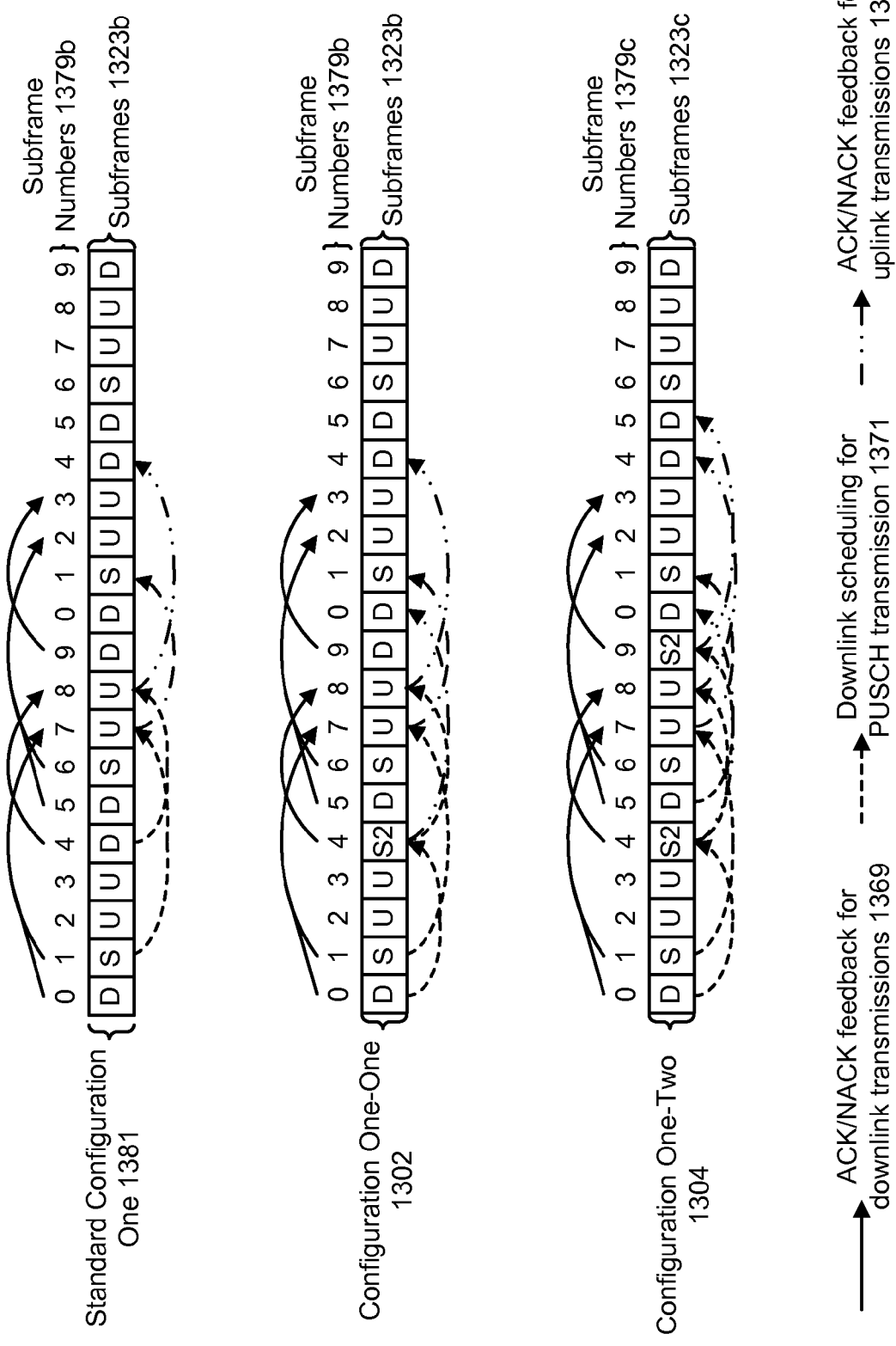
FIG. 13 is a diagram illustrating some possible configurations related to standard configuration one that may be used in accordance with the systems and methods disclosed herein.

FIG. 13 is a diagram illustrating some possible configurations related to standard configuration one that may be used in accordance with the systems and methods disclosed herein. For example, some possible configurations with PHY layer signaling are given hereafter.

More detail on transitional states with PHY layer signaling is given hereafter. To simplify system design for subframe conversion from a base configuration (e.g., a standard configuration), the systems and methods disclosed herein may allow only one configuration for each UL-DL ratio in one approach. Dynamic subframe conversion from a downlink subframe to a special subframe type 2 may not be applied on configuration zero (e.g., 0) and configuration six (e.g., 6).

Configuration three (e.g., 3) may have only one possible subframe conversion position. However, the subframe conversion states may need to be specified for TDD UL-DL configurations one, two, four and five (e.g., 1, 2, 4 and 5), where multiple PHY layer signaling possibilities exist. Several rules may be considered to define the transition states.

One rule may prefer a state with a similar allocation to standard UL-DL configurations. Another rule may specify that the same subframe position should be used for the subframe conversion for the same UL-DL allocation ratio.

It should be noted that "D" denotes a downlink subframe, "U" denotes an uplink subframe, "S" denotes a standard special subframe and "S2" denotes a special subframe type 2 in FIG. 13. Furthermore, ACK/NACK feedback for downlink transmissions associations 1369 downlink scheduling for PUSCH transmission associations 1371 and ACK/NACK feedback for uplink transmissions associations 1373 are illustrated.

FIG. 13 illustrates standard configuration one 1381 (e.g., "configuration 1") with subframes 1323a and subframe numbers 1379a. Configurations one-one 1302 (e.g., "1-1") with subframes 1323b and subframe numbers 1379b and one-two 1304 (e.g., "1-2") with subframes 1323c and subframe numbers 1379c are also illustrated in FIG. 13.

Standard configuration one 1381 is a 5 ms configuration with 40% (e.g., 4/10 subframes for) UL allocation. In accordance with the systems and methods disclosed herein, PHY layer signaling may be used to dynamically change the uplink ratio between 40% and 60%. This may be done with a given order as described hereafter.

When only one subframe 1323 is converted, standard configuration one 1381 may change to configuration one-one 1302 that is similar to configuration six (e.g., "6") by converting subframe 4 (according to subframe numbers 1379b) from a downlink subframe to a special subframe type 2.

If two subframes are converted, standard configuration one 1381 may change to configuration one-two 1304 (e.g., "1-2") that is similar to configuration zero by converting subframe 4 and subframe 9 (according to subframe numbers 1379c) from downlink subframes to special subframe type 2 subframes. Since subframe 4 and subframe 9 may also be used to schedule PUSCH transmissions in subframes 8 and 3 respectively, the special subframe type 2 may have a reserved PDCCH region. With specified transition states, subframe 9 may be converted to a special subframe type 2 only if subframe 4 is also converted to a special subframe type 2.

Figure 14:
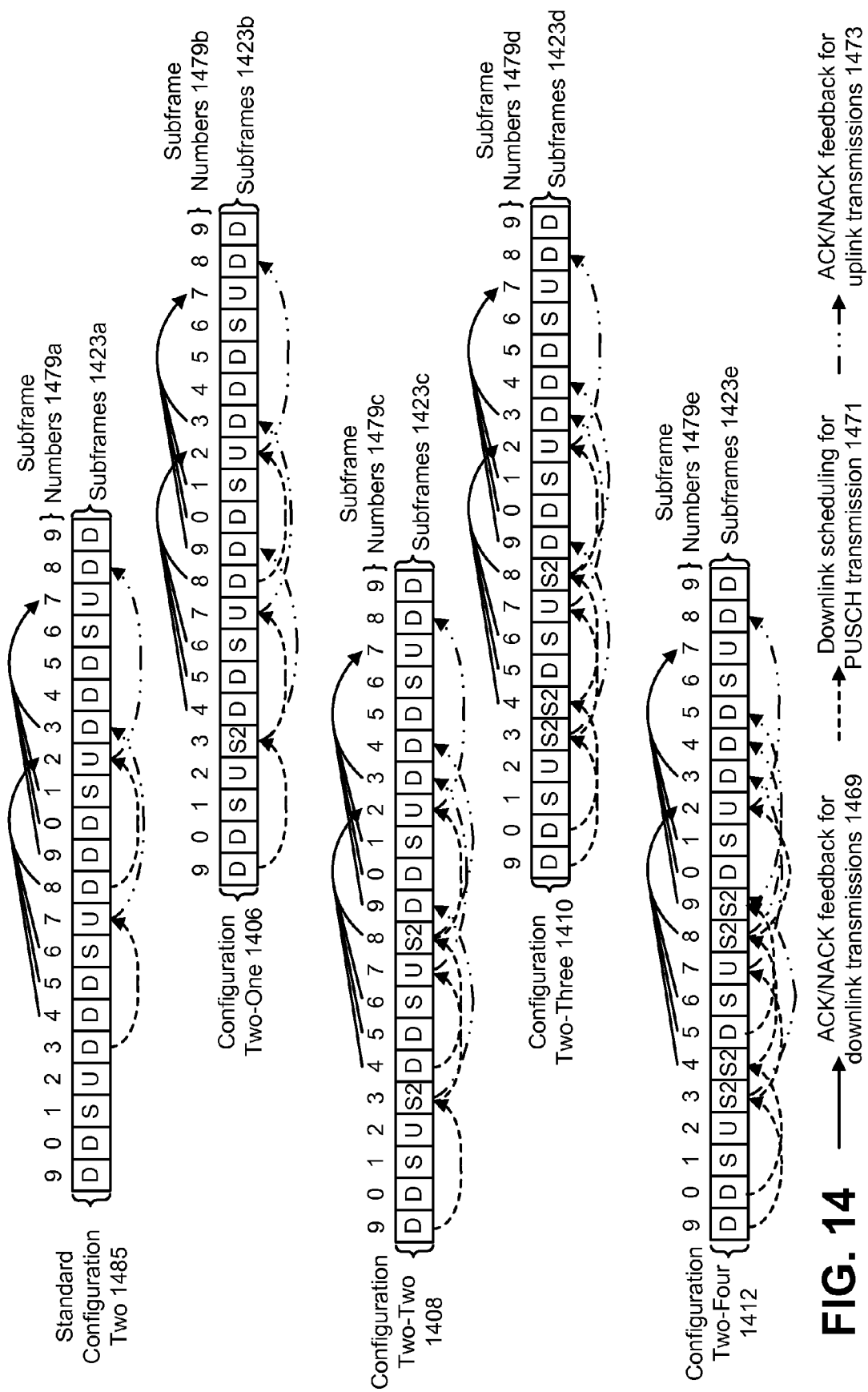
FIG. 14 is a diagram illustrating some possible configurations related to standard configuration two that may be used in accordance with the systems and methods disclosed herein.

FIG. 14 is a diagram illustrating some possible configurations related to standard configuration two that may be used in accordance with the systems and methods disclosed herein. For example, some possible configurations with PHY layer signaling are given hereafter.

It should be noted that "D" denotes a downlink subframe, "U" denotes an uplink subframe, "S" denotes a standard special subframe and "S2" denotes a special subframe type 2 in FIG. 14. Furthermore, ACK/NACK feedback for downlink transmissions associations 1469 downlink scheduling for PUSCH transmission associations 1471 and ACK/NACK feedback for uplink transmissions associations 1473 are illustrated.

FIG. 14 illustrates standard configuration two 1485 (e.g., "configuration 2") with subframes 1423a and subframe numbers 1479a. Configurations two-one 1406 (e.g., "2-1") with subframes 1423b and subframe numbers 1479b, two-two 1408 (e.g., "2-2") with subframes 1423c and subframe numbers 1479c, two-three 1410 (e.g., "2-3") with subframes 1423d and subframe numbers 1479d and two-four 1412 (e.g., "2-4") with subframes 1423e and subframe numbers 1479e are also illustrated in FIG. 14.

Standard configuration two 1485 is a 5 ms configuration with a 20% (e.g., 2/10 subframes for) UL allocation. In accordance with the systems and methods disclosed herein, PHY layer signaling may be used to dynamically change the uplink ratio between 30% and 60%. This may be done with a given order as described hereafter.

In configuration two-one 1406 (e.g., "2-1"), only one DL subframe 1423 may be converted to a special subframe type 2 by PUSCH scheduling at subframe 9 to convert subframe 3 (in accordance with subframe numbers 1479b). This results in a 30% UL allocation. Configuration two-one 1406 does not exist in current (standard) TDD UL-DL configurations and can be viewed as a middle state between standard configuration two 1485 (e.g., "2") and standard configuration one (e.g., 1).

In configuration two-two 1408 (e.g., "2-2"), two DL subframes 1423 may be converted to special subframe type 2 subframes by PUSCH scheduling at subframe 9 and subframe 4 to convert subframe 3 and subframe 8, respectively (according to subframe numbers 1479c). This may result in an extra conversion of subframe 8 over configuration two-one 1406, for example. This provides a similar allocation as standard configuration one with a 40% UL allocation.

In configuration two-three 1410, (e.g., "2-3"), three DL subframes may be converted to special subframe type 2 subframes by PUSCH scheduling at subframe 9, subframe 0 and subframe 4 to convert subframe 3, subframe 4, and subframe 8, respectively (according to subframe numbers 1479d). This may result in an extra conversion of subframe 4 over configuration two-two 1408, for example. This provides a similar allocation as standard configuration six with a 50% UL allocation.

In configuration two-four 1412 (e.g., "2-4"), four DL subframes are converted to special subframe type 2 subframes by PUSCH scheduling at subframe 9, subframe 0, subframe 4 and subframe 5 to convert subframe 3, subframe 4, subframe 8 and subframe 9, respectively (according to subframe numbers 1479e). This may result in an extra conversion of subframe 9 over configuration two-three 1410, for example. This provides a similar allocation as configuration 0 with a 60% UL allocation.

Figure 15:
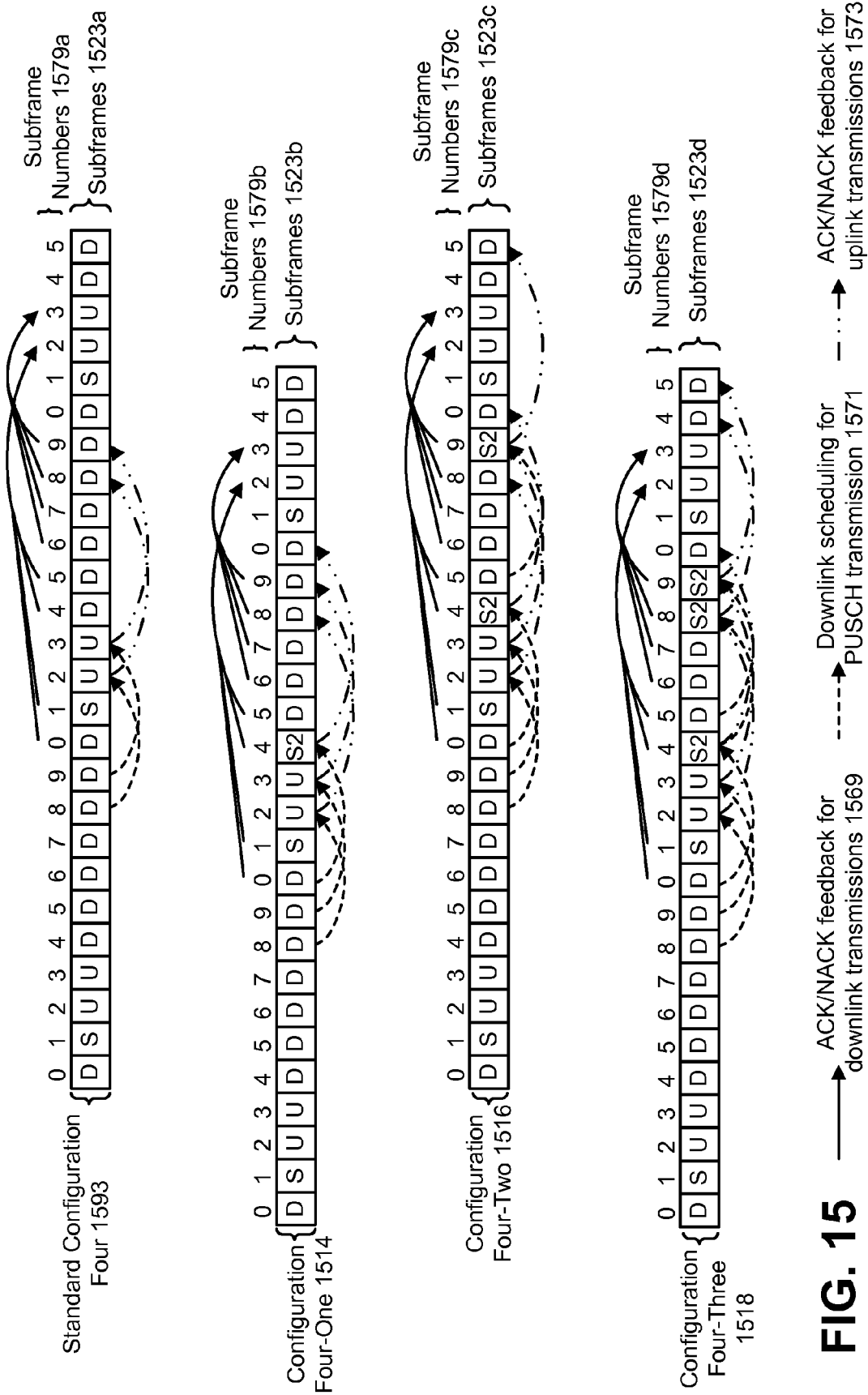
FIG. 15 is a diagram illustrating some possible configurations related to standard configuration four that may be used in accordance with the systems and methods disclosed herein.

FIG. 15 is a diagram illustrating some possible configurations related to standard configuration four that may be used in accordance with the systems and methods disclosed herein. For example, some possible configurations with PHY layer signaling are given hereafter.

It should be noted that "D" denotes a downlink subframe, "U" denotes an uplink subframe, "S" denotes a standard special subframe and "S2" denotes a special subframe type 2 in FIG. 15. Furthermore, ACK/NACK feedback for downlink transmissions associations 1569 downlink scheduling for PUSCH transmission associations 1571 and ACK/NACK feedback for uplink transmissions associations 1573 are illustrated.

FIG. 15 illustrates standard configuration four 1593 (e.g., "configuration 4") with subframes 1523a and subframe numbers 1579a. Configurations four-one 1514 (e.g., "4-1") with subframes 1523b and subframe numbers 1579b, four-two 1516 (e.g., "4-2") with subframes 1523c and subframe numbers 1579c and four-three 1518 (e.g., "4-3") with subframes 1523d and subframe numbers 1579d are also illustrated in FIG. 15.

Standard configuration four 1593 is a 10 ms configuration with two UL subframes or a 20% (e.g., 2/10 subframes for)

UL allocation. In accordance with the systems and methods disclosed herein, PHY layer signaling may be used to dynamically change the uplink ratio between 30% and 50%. This may be done with a given order as described hereafter.

In configuration four-one 1514 (e.g., "4-1"), only one DL subframe 1523 may be converted to a special subframe type 2 by PUSCH scheduling at subframe 0 to convert subframe 4 (in accordance with subframe numbers 1579b). This results in a 30% UL allocation, similar to standard TDD UL-DL configuration three.

In configuration four-two 1516 (e.g., "4-2"), two DL subframes 1523 may be converted to special subframe type 2 subframes by PUSCH scheduling at subframe 0 and subframe 5 to convert subframe 4 and subframe 9, respectively (according to subframe numbers 1579c). This may result in an extra conversion of subframe 9 over configuration four-one 1514, for example. This provides a similar allocation as configuration three-one with a 40% UL allocation.

In configuration four-three 1518, (e.g., "4-3"), three DL subframes may be converted to special subframe type 2 subframes by PUSCH scheduling at subframe 0, subframe 4 and subframe 5 to convert subframe 4, subframe 8, and subframe 9, respectively (according to subframe numbers 1579d). This may result in an extra conversion of subframe 8 over configuration four-two 1516, for example. This provides a configuration with a 50% UL allocation.

Configuration four-two 1516 and configuration four-three 1518 may mitigate temporary uplink traffic hikes and avoid unnecessary allocation changes between 5 ms and 10 ms configurations. They also provide a 5 ms uplink interval by using subframe pairs (e.g., subframes 3 and 8 and subframes 4 and 9).

Figure 16:
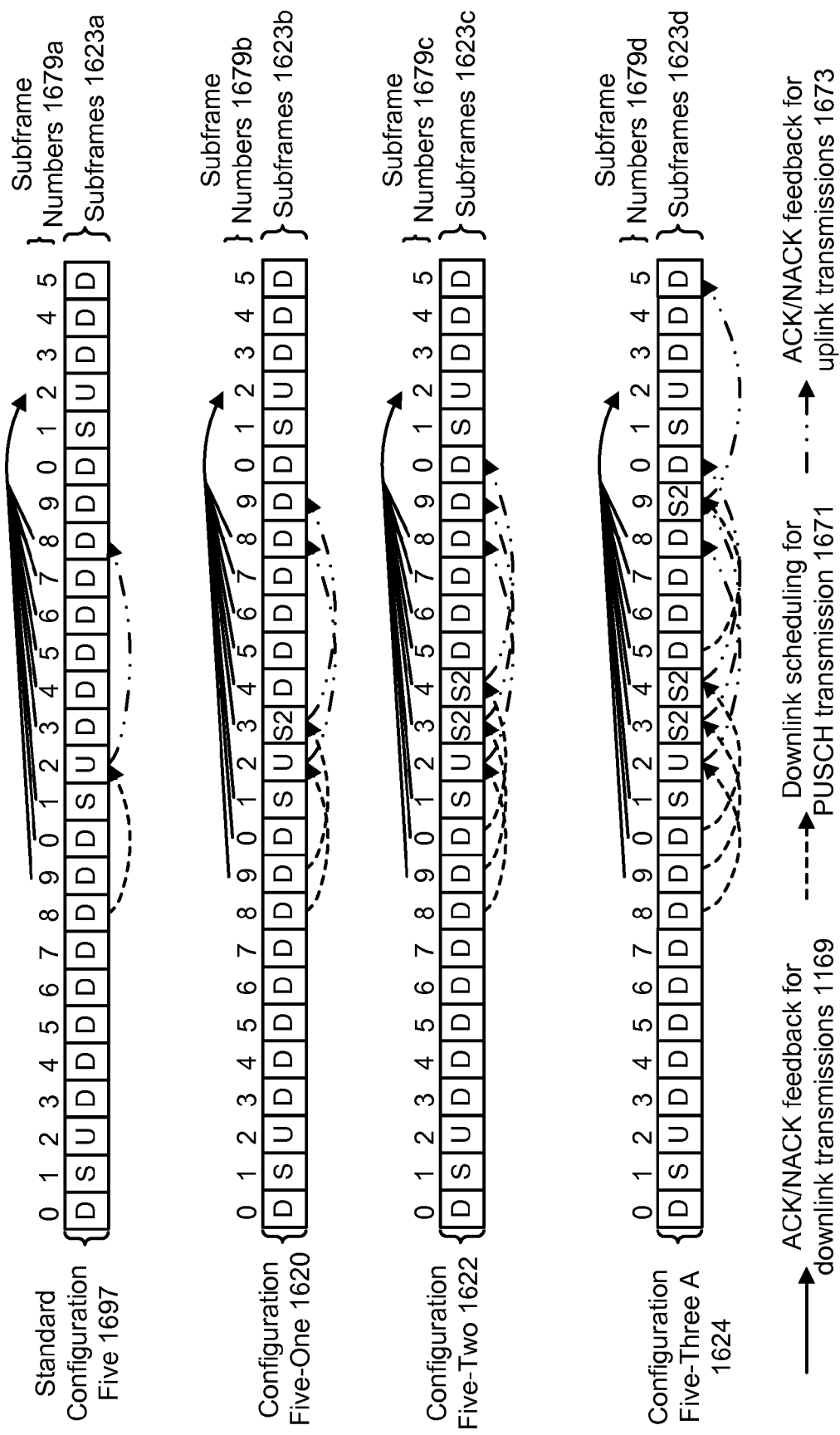
FIG. 16 is a diagram illustrating some possible configurations related to standard configuration five that may be used in accordance with the systems and methods disclosed herein.

FIG. 16 is a diagram illustrating some possible configurations related to standard configuration five that may be used in accordance with the systems and methods disclosed herein. For example, some possible configurations with PHY layer signaling are given hereafter.

It should be noted that "D" denotes a downlink subframe, "U" denotes an uplink subframe, "S" denotes a standard special subframe and "S2" denotes a special subframe type 2 in FIG. 16. Furthermore, ACK/NACK feedback for downlink transmissions associations 1669 downlink scheduling for PUSCH transmission associations 1671 and ACK/NACK feedback for uplink transmissions associations 1673 are illustrated.

FIG. 16 illustrates standard configuration five 1697 (e.g., "configuration 5") with subframes 1623a and subframe numbers 1679a. Configurations five-one 1620 (e.g., "5-1") with subframes 1623b and subframe numbers 1679b, five-two 1622 (e.g., "5-2") with subframes 1623c and subframe numbers 1679c and five-three A 1624 (e.g., "5-3a") with subframes 1623d and subframe numbers 1679d are also illustrated in FIG. 16.

Standard configuration five 1697 is a 10 ms configuration with one UL subframe or a 10% (e.g., ¹⁄₁₀ subframes for) UL allocation. In accordance with the systems and methods disclosed herein, PHY layer signaling may be used to dynamically change the uplink ratio between 20% and 60%. This may be done with a given order as described hereafter.

In configuration five-one 1620 (e.g., "5-1"), only one DL subframe 1623 may be converted to a special subframe type 2 by PUSCH scheduling at subframe 9 to convert subframe 3 (in accordance with subframe numbers 1679b). This results in a 20% UL allocation, similar to standard TDD UL-DL configuration four.

In configuration five-two 1622 (e.g., "5-2"), two DL subframes 1623 may be converted to special subframe type 2 subframes by PUSCH scheduling at subframe 9 and subframe 0 to convert subframe 3 and subframe 4, respectively (according to subframe numbers 1679c). This may result in an extra conversion of subframe 4 over configuration five-one 1620, for example. This provides a 30% UL allocation, similar to standard TDD UL-DL configuration three.

In configuration five-three A 1624, (e.g., "5-3a"), three DL subframes may be converted to special subframe type 2 subframes by PUSCH scheduling at subframe 9, subframe 0 and subframe 5 to convert subframe 3, subframe 4, and subframe 9, respectively (according to subframe numbers 1679d). This may result in an extra conversion of subframe 9 over configuration five-two 1622, for example. This provides a configuration similar allocation as in configuration three-one and as in configuration four-two with a 40% UL allocation.

Figure 17:
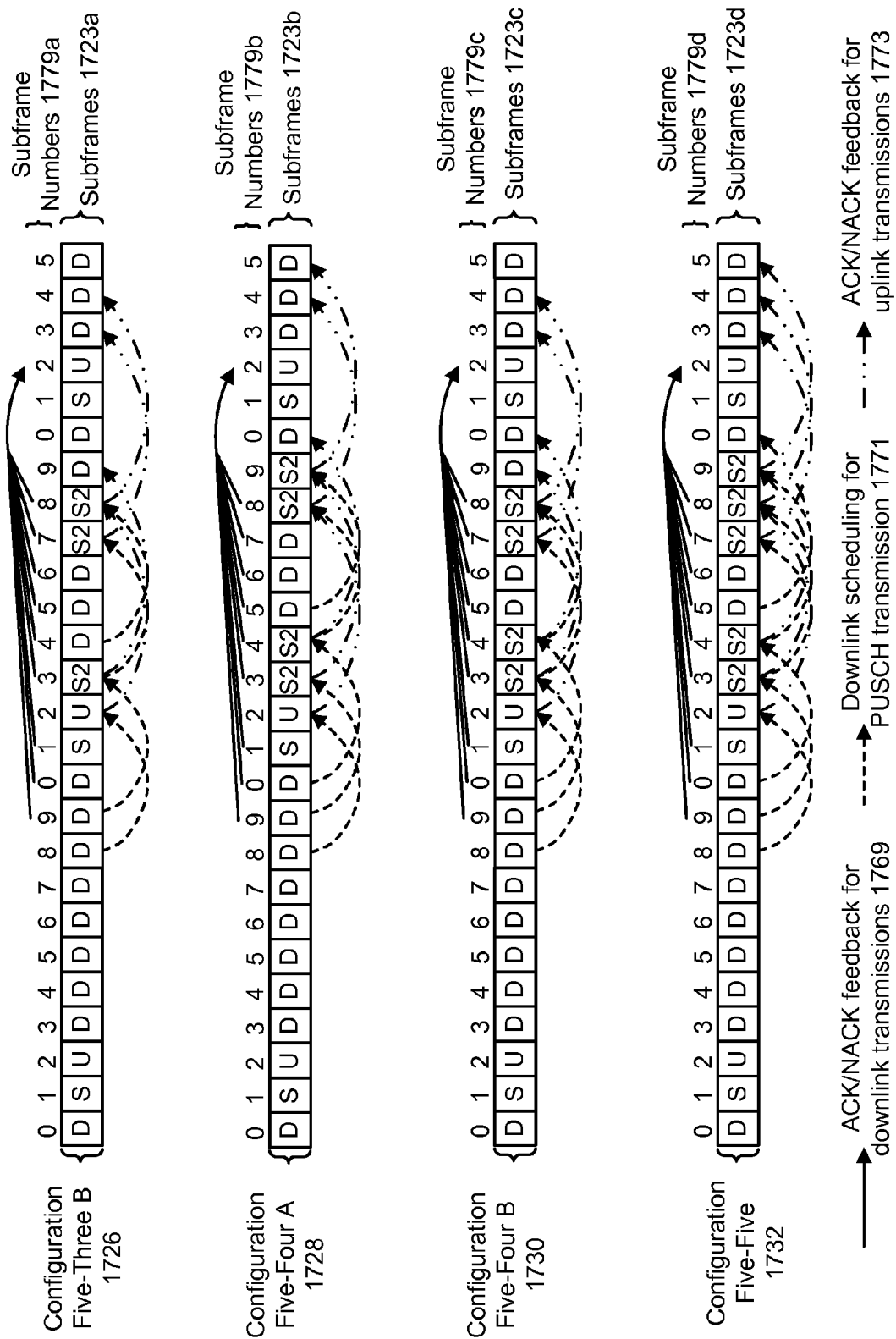
FIG. 17 is a diagram illustrating more possible configurations related to standard configuration five that may be used in accordance with the systems and methods disclosed herein.

FIG. 17 is a diagram illustrating more possible configurations related to standard configuration five that may be used in accordance with the systems and methods disclosed herein. For example, some possible configurations with PHY layer signaling are given hereafter.

It should be noted that "D" denotes a downlink subframe, "U" denotes an uplink subframe, "S" denotes a standard special subframe and "S2" denotes a special subframe type 2 in FIG. 17. Furthermore, ACK/NACK feedback for downlink transmissions associations 1769 downlink scheduling for PUSCH transmission associations 1771 and ACK/NACK feedback for uplink transmissions associations 1773 are illustrated.

FIG. 17 illustrates configurations five-three B 1726 (e.g., "5-3b") with subframes 1723a and subframe numbers 1779a, five-four A 1728 (e.g., "5-4a") with subframes 1723b and subframe numbers 1779b. Configurations five-four B 1730 (e.g., "5-4b") with subframes 1723c and subframe numbers 1779c and five-five 1732 (e.g., "5-5") with subframes 1723d and subframe numbers 1779d are also illustrated in FIG. 17.

In configuration five-three B 1726 (e.g., "5-3b"), three DL subframes 1723 may be converted to a special subframe type 2 by PUSCH scheduling at subframe 9, subframe 3 and subframe 4 may convert subframe 3, subframe 7 and subframe 8, respectively (in accordance with subframe numbers 1779a). This provides a similar allocation as standard TDD UL-DL configuration one with a 40% UL allocation.

In a configuration 5-4, four DL subframes may be converted to special subframe type 2 subframes. In configuration five-four A 1728 (e.g., "5-4a"), four DL subframes 1723 may be converted to special subframe type 2 subframes by PUSCH scheduling at subframe 9, subframe 0, subframe 4 and subframe 5 to convert subframe 3, subframe 4, subframe 8 and subframe 9, respectively (according to subframe numbers 1779b). This may result in an extra conversion of subframe 8 over configuration five-three, for example. This provides a similar allocation as configuration four-three with a 50% UL allocation.

In configuration five-four B 1730, (e.g., "5-4b"), four DL subframes may be converted to special subframe type 2 subframes by PUSCH scheduling at subframe 9, subframe 0, subframe 3 and subframe 4 to convert subframe 3, subframe 4, subframe 7 and subframe 8, respectively (according to subframe numbers 1779c). This may result in an extra conversion of subframe 4 over configuration five-three A, for example. This provides a similar allocation as standard TDD UL-DL configuration six with a 50% UL allocation.

In configuration five-five 1732, (e.g., "5-5"), five DL subframes may be converted to special subframe type 2 subframes by PUSCH scheduling at subframe 9, subframe 0, subframe 3, subframe 4 and subframe 5 to convert subframe 3, subframe 4, subframe 7, subframe 8 and subframe 9, respectively (according to subframe numbers 1779d). This provides a 60% UL allocation, similar to standard UL-DL configuration zero (e.g., "0"). Configurations five-three, five-four and five-five provide a 5 ms uplink interval without performing 10 ms to 5 ms TDD UL-DL configuration changes.

Figure 18:
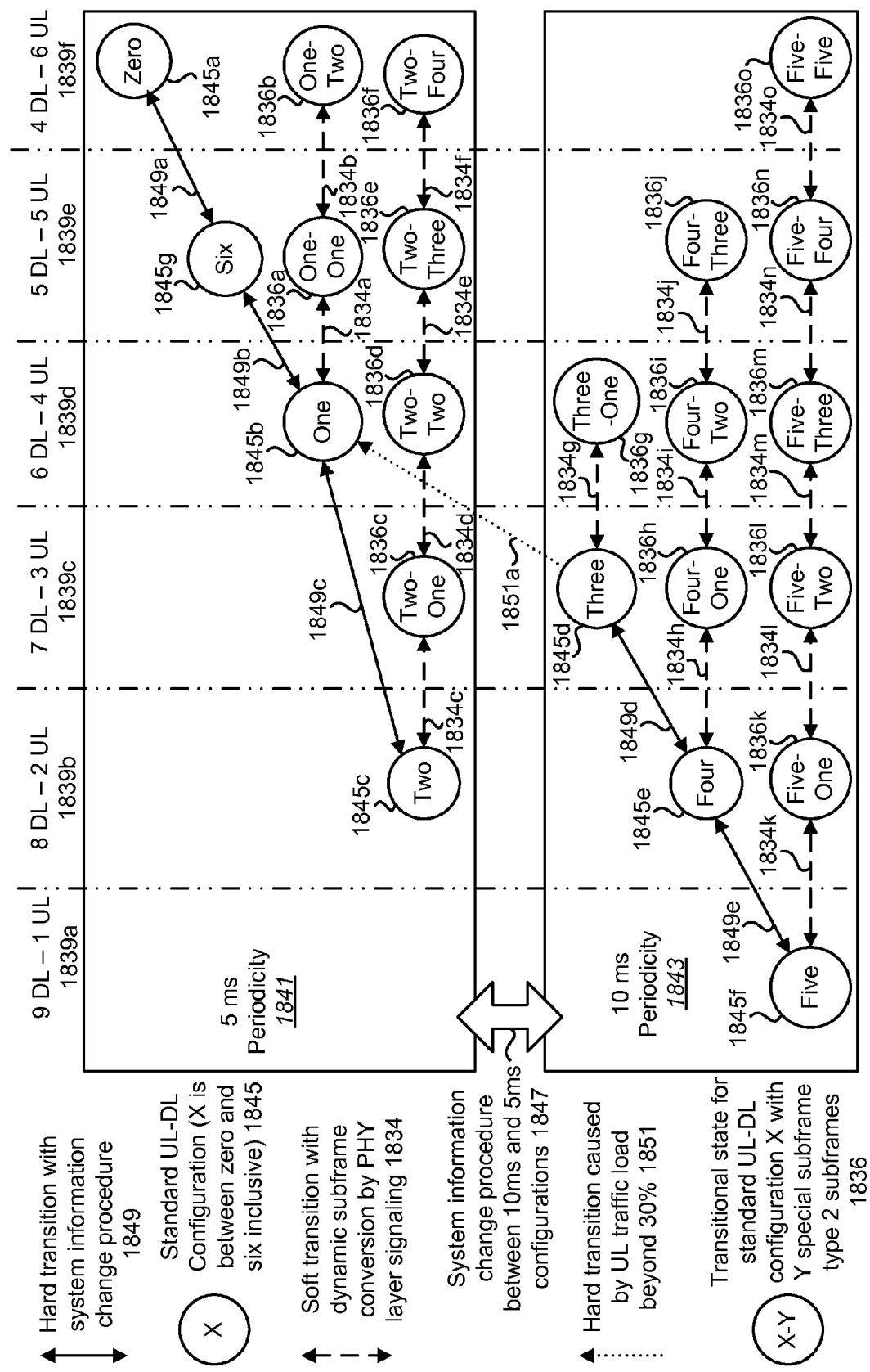
FIG. 18 is a state diagram illustrating several states or configurations in accordance with the systems and methods disclosed herein.

FIG. 18 is a state diagram illustrating several states or configurations 1845a-g, 1836a-o in accordance with the systems and methods disclosed herein. In some implementations, the systems and methods disclosed herein may operate according to transitional states or configurations 1836a-o. The transitional states or configurations 1836a-o related to each standard UL-DL configuration 1845a-g are illustrated in FIG. 18. A system information change procedure (e.g., system information change procedure between 10 ms and 5 ms configurations 1847, hard transition with the system information change procedure 1849, 1849a-e and/or hard transition caused by UL traffic load beyond 30% 1851, 1851a) may be used for any reconfiguration between standard UL-DL configurations 1845, 1845a-g. Since the differences between 5 ms and 10 ms configurations are more significant, switching between 5 ms periodicity 1841 and 10 ms periodicity 1843 may always be performed by radio resource control (RRC) signaling according to the system information change procedure 1847.

With PHY layer signaling for dynamic conversion of a downlink subframe to a special subframe type 2, higher uplink allocations can be derived from lower uplink configurations dynamically, which may reduce reconfiguration (according to the system information change procedure) for more uplink resource.

For configurations with a 5 ms periodicity 1841, standard configuration one 1845b (e.g., "1") can be dynamically converted to configuration one-one 1836a (e.g., "1-1") that provides a 50% UL resource allocation and to configuration one-two 1836b (e.g., "1-2") that provides a 60% UL resource allocation with PHY layer signaling. In other words, soft transitions 1834a-b with dynamic subframe conversion by PHY layer signaling may be performed to transition between standard configuration one 1845b, configuration one-one 1836a and configuration one-two 1836b.

Similarly, standard configuration two 1845c (e.g., "2") can be dynamically adjusted with PHY layer signaling to a higher UL allocations to configuration two-one 1836c (e.g., "2-1"), configuration two-two 1836d (e.g., "2-2"), configuration two-three 1836e (e.g., "2-3") and configuration two-four 1836f (e.g., "2-4") with 30% 1839c, 40% 1839d, 50% 1839e and 60% 1839f UL allocations, respectively. In other words, soft transitions 1834c-f with dynamic subframe conversion by PHY layer signaling may be performed to transition between standard configuration two 1845c, configuration two-one 1836c, configuration two-two 1836d, configuration two-three 1836e, and configuration two-four 1836f. Thus, a system information change may be avoided in some cases when the uplink traffic load is increased.

For configurations with a 10 ms periodicity 1843, standard configuration three 1845d (e.g., "3") can dynamically allocate an extra 10% for UL allocation with PHY layer signaling by using a soft transition 1834g to configuration three-one 1836g (e.g., "3-1"). In other words, a soft transition 1834g with dynamic subframe conversion by PHY layer signaling may be performed to transition between standard configuration three 1845d and configuration three-one 1836g.

Standard configuration four 1845e (e.g., "4") and configurations four-one 1836h (e.g., "4-1"), four-two 1836i (e.g., "4-2") and four-three 1836j (e.g., "4-3") may be used to support UL ratios from 20% 1839b to 50% 1839f. In other words, soft transitions 1834h-j with dynamic subframe conversion by PHY layer signaling may be performed to transition between standard configuration four 1845e, configuration four-one 1836h, configuration four-two 1836i and configuration four-three 1836j.

Standard configuration five 1845f (e.g., "5") and configurations five-one 1836k (e.g., "5-1"), five-two 1836l (e.g., "5-2"), five-three 1836m (e.g., "5-3"), five-four 1836n (e.g., "5-4") and five-five 1836o (e.g., "5-5") can support UL ratios from 10% 1839a to 60% 1839f. In other words, soft transitions 1834k-o with dynamic subframe conversion by PHY layer signaling may be performed to transition between standard configuration five 1845f, configuration five-one 1836k, configuration five-two 1836l, configuration five-three 1836m, configuration five-four 1836n, and configuration five-five 1836o.

Thus, PHY layer signaling for subframe conversion may provide a large dynamic range of uplink allocation beyond the maximum 30% uplink allocation for standard 10 ms configurations. Furthermore, lower 5 ms periodicity can be supported in transitional states beyond 30% uplink allocations (in configurations three-one 1836g, four-two 1836i, four-three 1836j, five-three 1836m, five-four 1836n and five-five 1836o, for example). This may avoid the costly 10 ms to 5 ms system reconfiguration (by system information change procedure 1847) caused by uplink traffic spikes.

Figure 19:
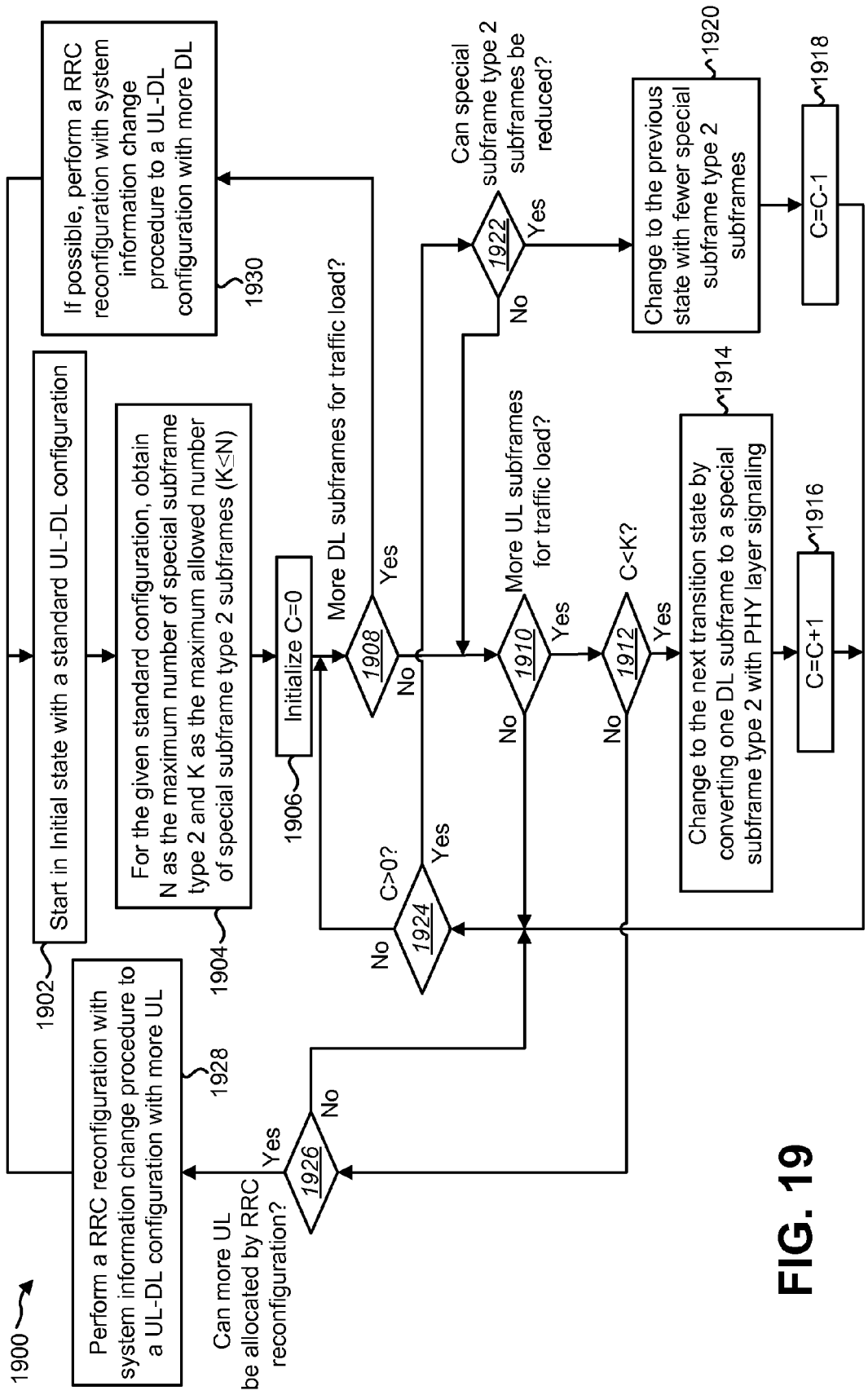
FIG. 19 is a flow diagram illustrating a more specific example of a method for reconfiguring a subframe allocation on an eNB.

FIG. 19 is a flow diagram illustrating a more specific example of a method 1900 for reconfiguring a subframe allocation on an eNB 160. In one implementation, the method 1900 may define the behavior of an eNB 160 scheduler. FIG. 19 illustrates one example of a state transition procedure with a limit to the maximum number of special subframe type 2 subframes. The eNB 160 may start 1902 in an initial state with a standard UL-DL configuration. For the given configuration, the maximum number of special subframe type 2 subframes (denoted as N herein), may be obtained 1904. The maximum number of subframes N may be determined based on the analysis above. Examples of N for standard configurations follow. N=0 for standard configuration zero (e.g., "0") and standard configuration six (e.g., "6"). For standard configuration one (e.g., "1"), N=2. For standard configuration two (e.g., "2"), N=4. For standard configuration three (e.g., "3"), N=1. For standard configuration four (e.g., "4"), N=3. For standard configuration five (e.g., "5"), N=5. The eNB 160 may further place a limit K on the maximum allowed number of special subframe type 2 subframes, where K≤N.

A counter C may be used to indicate the number of special subframe type 2 subframes of the current state. The eNB 160 initializes 1906 the counter C as 0 (which may indicate standard UL-DL configuration zero with no special subframe type 2 subframes). Based on the network traffic load, the eNB 160 may determine 1908 whether more downlink subframes are needed. For example, if there is more data to be transmitted to the UE(s) 102 than the current configuration can support, the eNB 160 may determine 1908 that more DL subframes are needed for the traffic load.

If more downlink subframes are needed (and PHY layer signaling cannot handle it), then standard UL-DL reconfiguration (according to 3GPP Releases 8-10, for example) may be used. For instance, the eNB 160 may perform 1930 an RRC reconfiguration with the system information change procedure to transition to an UL-DL configuration with more DL allocations, if possible. For example, if the eNB 160 (e.g., network) is currently utilizing configuration five (e.g., "5"), then no more DL subframes can be allocated and no RRC reconfiguration with system information change may be performed.

If the eNB 160 (e.g., network) is currently utilizing configuration two (e.g., "2"), then no more DL subframes can be allocated with a 5 ms periodicity. However, if the periodicity can be changed from 5 ms to 10 ms, a system information change procedure may be used to transition to configuration five from configuration two (e.g., "2").

If more DL subframes are not needed, the eNB 160 may determine 1910 whether more UL subframes are needed based on the current traffic load. For example, if there is more uplink data (to be transmitted from the UE(s) 102) than can be supported by the current configuration, the eNB 160 may determine 1910 that more UL subframes are needed for the traffic load. If more UL subframes are not needed, the eNB 160 determines 1924 whether the counter C is greater than 0.

If C is not greater than 0, the standard UL-DL configuration is used and the eNB 160 returns determine 1908 whether more DL subframes are needed for the current traffic load. If C is greater than 0, a transition state with a special subframe type 2 is used and the eNB 160 then determines 1922 if the number of special subframe type 2 subframes can be reduced based on the traffic load. For example, the eNB 160 may determine whether fewer special subframe type 2 subframes may be sufficient to support the current uplink traffic load. If the special subframe type 2 can be reduced, the eNB 160 may change 1920 to a previous state with fewer special subframe type 2 subframes. The eNB 160 then reduces 1918 the counter C by 1, and returns to determine 1924 whether the counter C is greater than 0.

If the number of special subframe type 2 subframes cannot be reduced, the eNB 160 returns to determine 1924 if more UL subframes are needed for the traffic load. If more UL subframes are needed based on the traffic load, the eNB 160 may evaluate or determine if the counter C is smaller than K (e.g., the maximum allowed number of special subframe type 2 subframes). If the counter C is not smaller than K, the eNB 160 cannot increase the number of special subframe type 2 subframes by PHY layer signaling. In this case (where C is not less than K), the eNB 160 may determine 1926 whether more UL resources can be allocated by a RRC reconfiguration.

If more UL resources can be allocated by a RRC reconfiguration, the eNB 160 may perform 1928 a RRC reconfiguration with a system information change procedure to an UL-DL configuration with more UL resources (e.g., subframes). If the eNB 160 cannot allocate more UL resources, the eNB 160 may return to determine 1924 if the counter C is greater than 0. If the eNB 160 is utilizing configuration zero, no more UL resources can be allocated, and no system information change is performed.

If the eNB 160 determines 1912 that the counter C is smaller than K, the eNB 160 may change 1914 to the next transition state by converting a DL subframe (or an additional downlink subframe, for example) to a special subframe type 2 with PHY layer signaling. The eNB 160 then increases 1916 the counter C by 1, and returns to determine 1924 whether the counter C is greater than 0.

According to the method 1900 (with the state transition procedure), a RRC reconfiguration with system information change procedure may occur in two cases. First, when the eNB 160 is in an initial standard UL-DL configuration and more DL subframes are needed. Second, when the eNB 160 reaches the maximum allowed number of special subframe type 2 subframes and more UL subframes are needed.

Figure 20:
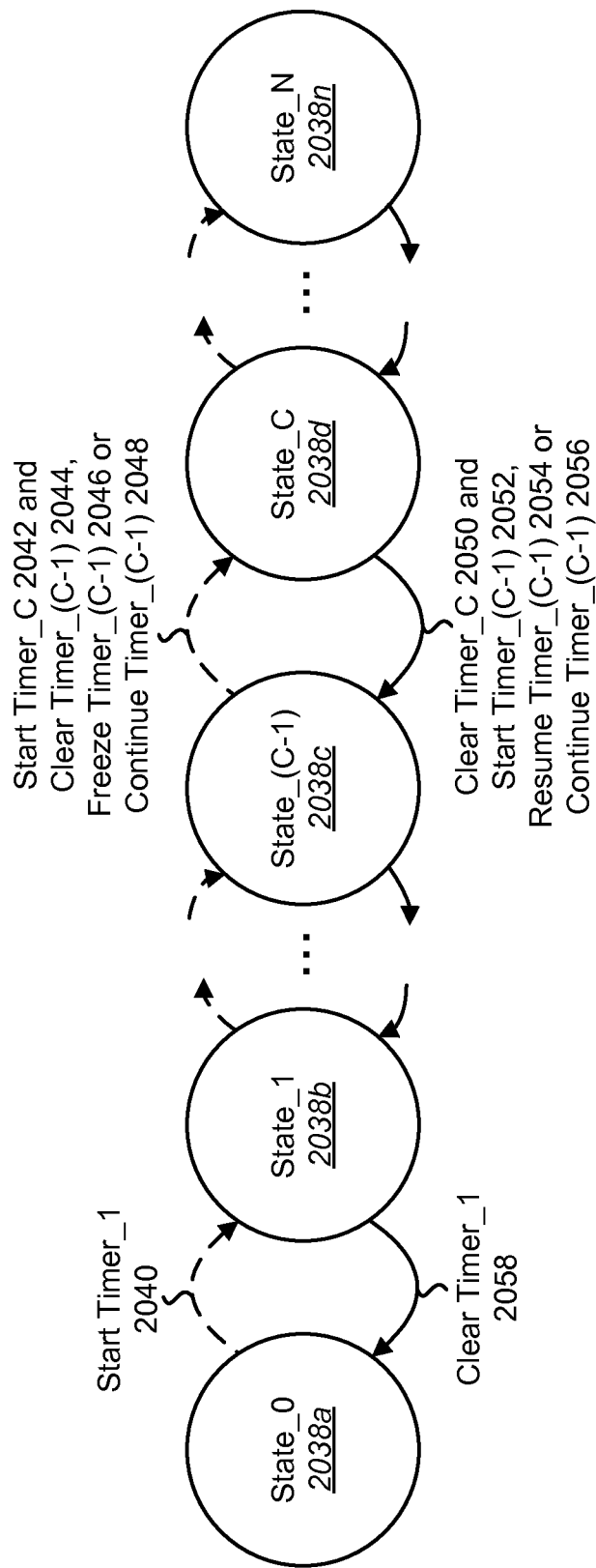
FIG. 20 is a state diagram illustrating one procedure for reconfiguring a subframe allocation using timers.

FIG. 20 is a state diagram illustrating one procedure for reconfiguring a subframe allocation using timers. For example, timers can be used in transitional states to trigger the system information change procedure. If a transitional state is maintained for an extended period of time (e.g., the timer expires), a standard UL-DL reconfiguration may be performed by a system information change procedure to a more suitable standard UL-DL configuration. The timer mechanism reduces the unnecessary system information change procedures caused by temporary traffic load variations. On the other hand, if the system traffic load change is consistent, the timer triggers a system information change procedure with a more suitable setting.

A counter C may be used to indicate the number of special subframe type 2 subframes of the current state, known as state_C 2038*d*. Thus, a given standard UL-DL configuration with no special subframe 2 subframes is state_0 2038*a*, and state_N 2038*n* is the state with N special subframe type 2 subframes, where N is the maximum number of special subframe type 2 subframes allowed corresponding to the given standard UL-DL configuration.

In some implementations, state_0 2038*a* may represent a standard configuration. Multiple timers corresponding to state_0 2038*a* may be used in some implementations. For example, timer_0A may be used to count the times when more downlink subframes are needed based on the traffic load and timer_0B may be used to count the times when more uplink subframes are needed based on the traffic load. Both timers may be reset to zero if the traffic load conditions returns to the current allocation or the opposite direction. Therefore, timer_0A may be reset to 0 when the traffic load returns to the standard allocation or more uplink resource is required; timer_0B may be reset to 0 when the traffic load returns to the standard allocation or more downlink resource is required.

Transitioning to another standard configuration (e.g., another state_0 corresponding to another standard configuration) may be triggered by the expiration of timer_0A. In other words, a system information change procedure may be triggered by the timer_0A in some implementations. For instance, if fewer uplink frames are needed for an uplink traffic load for the duration of timer_0A, then the eNB 160 may transition to another standard configuration with fewer uplink subframes allocated, if available.

On the other hand, transitioning to a transitional state or another standard configuration (e.g., another state_0 corresponding to another standard configuration) if no transitional states exists may be triggered by the expiration of timer_0B. In other words, a transitional state change or system information change procedure may be triggered by the timer_0B in some implementations. For instance, if more uplink frames are needed for an uplink traffic load for the duration of timer_0B, then the eNB 160 may transition to a transitional state with more uplink subframes allocated, if available. If there is no transitional state for the given state_0 (with standard configuration six (e.g., "6"), for example), the eNB 160 may transition to another standard configuration with more uplink subframes allocated.

Additionally or alternatively, one of more of the timers (e.g., timer_C) may trigger a state transition using a system information change. For example, if more uplink subframes are needed than can be provided by the current configuration in state_N 2038*n*, the eNB 160 may use a standard system information change procedure to transition to another standard configuration that allocates more uplink subframes if the timer_N expires and more uplink subframes are still needed.

A timer may be configured for each transitional state 2038*b-n*. For example, timer_C may be configured as the timer at transitional state C with C special subframe type 2 subframes (where C is smaller or equal to N, where N is the maximum number of special subframe type 2 subframes for the given configuration). The value of each timer for different transitional states 2038b-n may be the same. Alternatively, the value of each timer for different transitional states 2038b-n may be different so that a timer for a state 2038 with a lower number of special subframe type 2 subframes is longer than a timer for a state 2038 with a higher number of special subframe type 2 subframes. All timers may be initialized to 0.

An initial state may be the standard UL-DL configuration state_0 2038a. If more UL subframes are needed with higher UL traffic load for an extended period (e.g., when the timer_0B expires), the eNB 160 can change or transition from state_0 2038a to state_1 2038b by PHY layer signaling. For example, the eNB 160 may determine to add a special subframe type 2. The eNB 160 may add the special subframe type 2 by scheduling it (e.g., sending signaling to a UE 102 indicating to convert a downlink subframe to a special subframe type 2). The eNB 160 may start 2040 timer_1. If the UL traffic load reduces and the special subframe type 2 is not needed, the eNB 160 can change or transition from state_1 2038b to state_0 2038a and the timer _1 may be cleared 2058 (e.g., reset) to 0. For example, the eNB 160 may determine to remove a special subframe type 2. The eNB 160 may remove the special subframe type 2 by not scheduling it. Transitioning to a higher state (e.g., state_(C+1)) may comprise adding a special subframe type 2. Transitioning to a lower state (e.g., state_(C-1)) may comprise removing a special subframe type 2.

In general, the timer_C for state_C 2038d may start 2042 counting if the eNB 160 moves from a lower state (e.g., state_(C-1) 2038c) to state_C 2038d. The timer for state_C 2038d may be reset or cleared 2050 to 0 if the eNB 160 moves to a lower state (e.g., state_(C-1) 2038c). The timer mechanism can be implemented in according to other approaches as described hereafter.

In another approach, the timer_C for state_C 2038d only counts the continuous time in the current state. Thus, timer_C may start 2042 when the eNB 160 moves to state_C 2038d from a lower state state_(C-1) 2038c or may start when moving from a higher state state_(C+1). For example, timer (C-1) may start 2052 when transitioning from state_C 2038d to state_(C-1) 2038c. Timer_C may be cleared 2050 (e.g., reset to 0) when the eNB 160 moves out of state_C 2038d to a lower state_(C-1) 2038c or cleared when moving to a higher state state_(C+1). For example, timer_(C-1) may be cleared 2044 (e.g., reset) when transitioning from state_(C-1) 2038c to state_C 2038d.

In another approach, the timer_C for state_C 2038d may freeze. The timer_C for state_C 2038d should start 2042 counting if the eNB 160 moves from a lower state (e.g., state_(C-1) 2038c) to state_C 2038d. The timer_C for state_C 2038d should freeze if the eNB moves to a higher state state_(C+1). For example, the timer_(C-1) may freeze 2046 when the eNB 160 transitions from state_(C-1) 2038c to state_C 2038d. The timer_C for state_C 2038d may resume when the eNB 160 moves back from a higher state state_(C+1). For example, the timer_(C-1) may resume 2054 when transitioning from state_C 2038d to state_(C-1) 2038c. The timer for state_C 2038d may be cleared 2050 (e.g., reset) to 0 if the eNB 160 moves to a lower state (e.g., state_(C-1) 2038c).

In yet another approach, the timer_C for state_C 2038d should count if the eNB 160 has C or more special subframe type 2 subframes (in state_C 2038d or higher states, for example). In other words, a continuous timer may be applied in states 2038b-n with fewer special subframe type 2 subframes. For example, the timer_(C-1) may continue 2048 and the timer_C may start 2042 if the eNB 160 transitions to state_C 2038d from state_(C-1) 2038c. The timer_(C-1) may continue 2056 if the eNB 160 transitions to state_(C-1) 2038c from state_C 2038d. The timer_C for state_C 2038d may be cleared 2050 (e.g., reset) to 0 if the eNB 160 moves to a lower state state_(C-1) 2038c. In this case, the timer value of a state 2038b-n with a lower number of special subframe type 2 subframes should be longer than the timer value of a state 2038 with a higher number of special subframe type 2 subframes.

The maximum number of special subframe type 2 subframes for a standard UL-DL configuration and the timer may be applied independently or jointly. It should be noted that the eNB 160 may override the rules and perform a RRC layer configuration by a system information change procedure.

Figure 21:
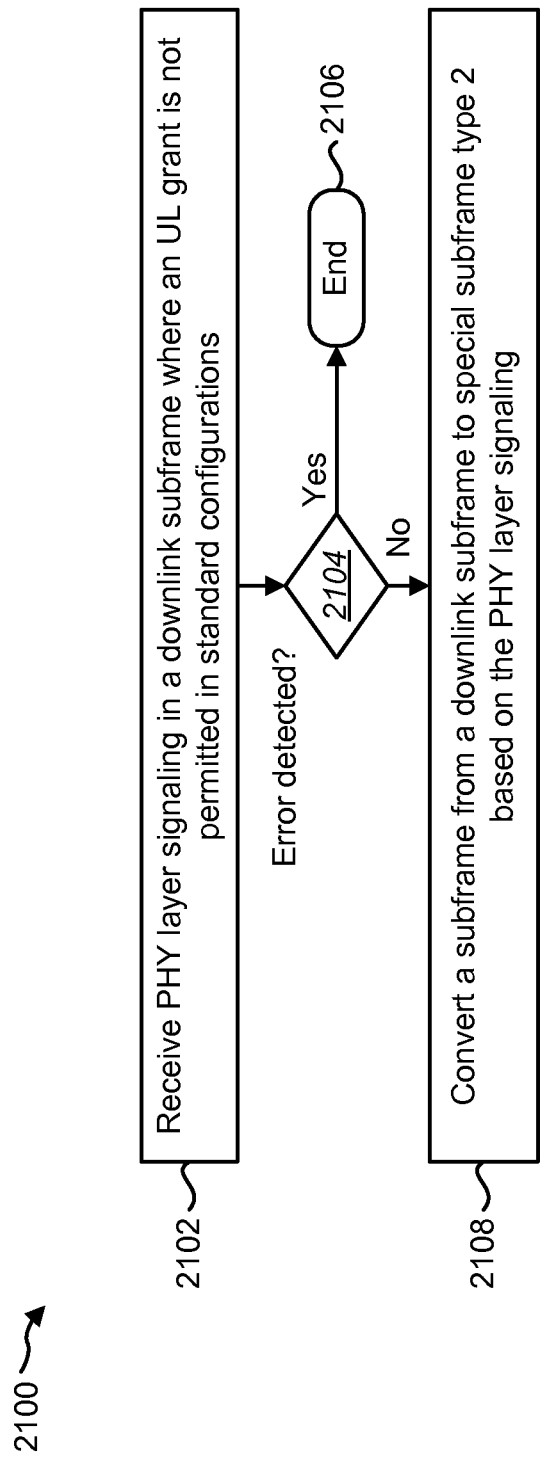
FIG. 21 illustrates one configuration of a method for reconfiguring a subframe allocation on a User Equipment.

FIG. 21 illustrates one configuration of a method 2100 for reconfiguring a subframe allocation on a User Equipment (UE) 102. A UE 102 may receive 2102 PHY layer signaling in a downlink subframe where an UL grant is not permitted in (current) standard configurations. For example, the standard UL-DL configurations in Release-10 may not permit an UL grant in particular subframes. For instance, if an UL grant is received in a subframe where it is currently not permitted, a UE according to current configurations may consider the UL grant an error. In accordance with current specifications (e.g., Release-10), for example, standard uplink configurations one through six (e.g., "1" through "6") may not allow an UL grant in a subframe that does not have an downlink scheduling for PUSCH transmission association with an uplink subframe "U" as illustrated in standard configurations shown in FIGS. 8 through 16 (and in other standard configurations not illustrated).

The UE 102 may determine 2104 whether one or more errors are detected. In some implementations, for example, the UE 102 may include information (e.g., a list) regarding a designated set of convertible downlink subframes (e.g., downlink subframes that are allowed to be converted to special subframe type 2 subframes). If the UE 102 receives 2102 PHY layer signaling (e.g., an UL grant) that specifies a downlink subframe for conversion that is not included in the set, the UE 102 may detect an error and operation may end 2106.

In some implementations, the UE 102 may include information regarding a set of allowed transitional states (e.g., transitional configurations). If the UE 102 receives 2102 PHY layer signaling that specifies a downlink subframe for conversion that is outside of the allowed transitional states, the UE 102 may detect an error and operation may end 2106.

If the UE 102 does not detect any errors, the UE may convert 2108 a subframe from a downlink subframe to a special subframe type 2 based on the PHY layer signaling. It should be noted that the UE 102 may optionally detect a single type of error or multiple types of errors.

Figure 22:
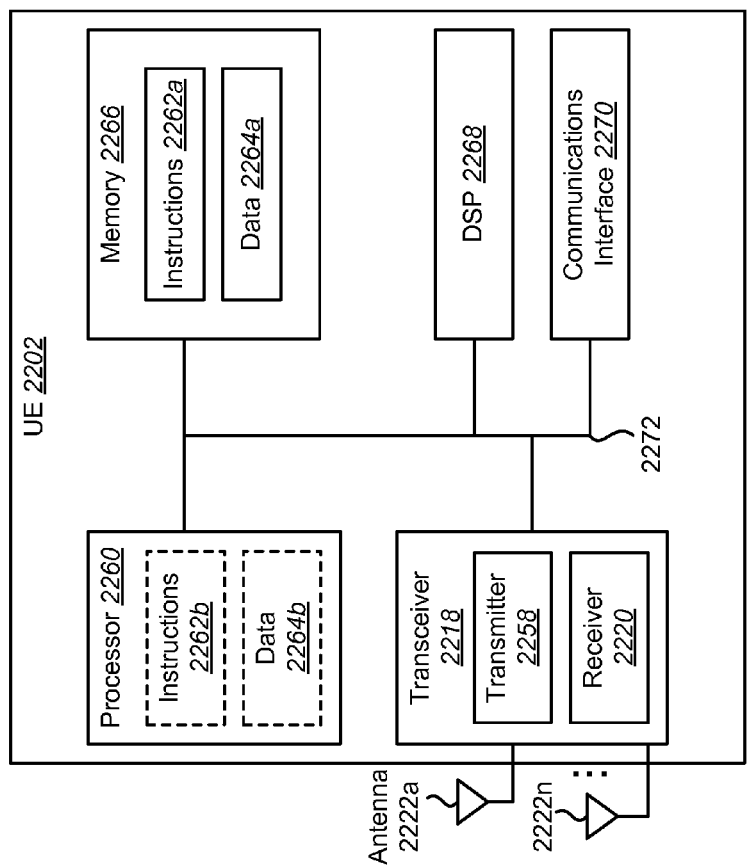
FIG. 22 illustrates various components that may be utilized in a User Equipment.

FIG. 22 illustrates various components that may be utilized in a User Equipment (UE) 2202. The UE 2202 may be utilized as the UE 102 described above. The UE 2202 includes a processor 2260 that controls operation of the UE 2202. The processor 2260 may also be referred to as a CPU. Memory 2266, which may include read-only memory (ROM), random access memory (RAM), a combination of the two or any type of device that may store information, provides instructions 2262a and data 2264a to the processor 2260. A portion of the memory 2266 may also include non-volatile random access memory (NVRAM). Instructions 2262b and data 2264b may also reside in the processor 2260. Instructions 2262b and/or data 2264b loaded into the processor 2260 may also include instructions 2262a and/or data 2264a from memory 2266 that were loaded for execution or processing by the processor 2260. The instructions 2262b may be executed by the processor 2260 to implement one or more of the methods 300, 2100 described above.

The UE 2202 may also include a housing that contains one or more transmitters 2258 and one or more receivers 2220 to allow transmission and reception of data. The transmitter(s)

2258 and receiver(s) 2220 may be combined into one or more transceivers 2218. One or more antennas 2222a-n are attached to the housing and electrically coupled to the transceiver 2218.

The various components of the UE 2202 are coupled together by a bus system 2272, which may include a power bus, a control signal bus and a status signal bus, in addition to a data bus. However, for the sake of clarity, the various buses are illustrated in FIG. 22 as the bus system 2272. The UE 2202 may also include a digital signal processor (DSP) 2268 for use in processing signals. The UE 2202 may also include a communications interface 2270 that provides user access to the functions of the UE 2202. The UE 2202 illustrated in FIG. 22 is a functional block diagram rather than a listing of specific components.

Figure 23:
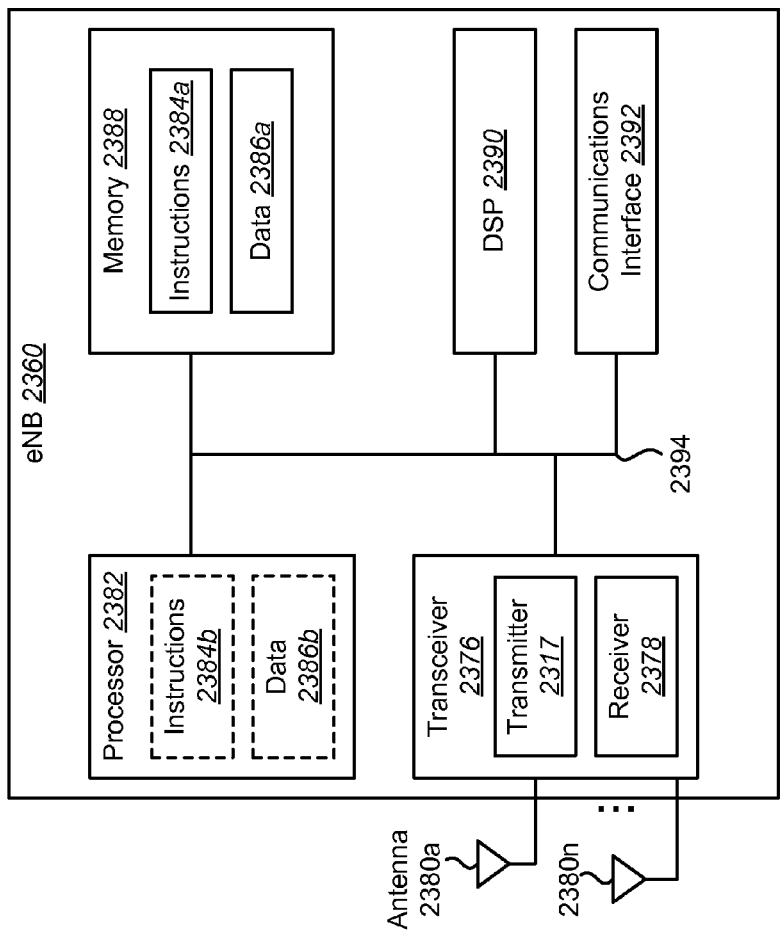
FIG. 23 illustrates various components that may be utilized in an evolved Node B (eNB).

FIG. 23 illustrates various components that may be utilized in an evolved Node B (eNB) 2360. The eNB 2360 may be utilized as the eNB 160 described above. The eNB 2360 includes a processor 2382 that controls operation of the eNB 2360. The processor 2382 may also be referred to as a CPU. Memory 2388, which may include read-only memory (ROM), random access memory (RAM), a combination of the two or any type of device that may store information, provides instructions 2384a and data 2386a to the processor 2382. A portion of the memory 2388 may also include non-volatile random access memory (NVRAM). Instructions 2384b and data 2386b may also reside in the processor 2382. Instructions 2384b and/or data 2386b loaded into the processor 2382 may also include instructions 2384a and/or data 2386a from memory 2388 that were loaded for execution or processing by the processor 2382. The instructions 2384b may be executed by the processor 2382 to implement one or more of the methods 200, 1900 described above.

The eNB 2360 may also include a housing that contains one or more transmitters 2317 and one or more receivers 2378 to allow transmission and reception of data. The transmitter(s) 2317 and receiver(s) 2378 may be combined into one or more transceivers 2376. One or more antennas 2380a-n are attached to the housing and electrically coupled to the transceiver 2376.

The various components of the eNB 2360 are coupled together by a bus system 2394, which may include a power bus, a control signal bus and a status signal bus, in addition to a data bus. However, for the sake of clarity, the various buses are illustrated in FIG. 23 as the bus system 2394. The eNB 2360 may also include a digital signal processor (DSP) 2390 for use in processing signals. The eNB 2360 may also include a communications interface 2392 that provides user access to the functions of the eNB 2360. The eNB 2360 illustrated in FIG. 23 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A User Equipment (UE) for reconfiguring a subframe allocation, comprising:
a processor;
memory in electronic communication with the processor;
instructions stored in the memory, the instructions being executable to:
receive physical (PHY) layer signaling in a downlink subframe;
determine whether an error is detected;
determine a target downlink subframe corresponding to the physical layer signaling; and
convert the target downlink subframe to a special subframe type 2 based on the PHY layer signaling if no error is detected, wherein the special subframe type 2 comprises at least an uplink pilot time slot (UpPTS).

2. The UE of claim 1, wherein determining whether an error is detected is based on a set of downlink subframes that are allowed to be converted to special subframe type 2 subframes among seven TDD UUDL configurations.

3. The UE of claim 1, wherein determining whether an error is detected is based on a set of allowed transitional states between TDD UL/DL configurations.

4. A method for reconfiguring a subframe allocation on a User Equipment (UE), comprising:
receiving physical (PHY) layer signaling in a downlink subframe;
determining whether an error is detected;
determining a target downlink subframe corresponding to the physical layer signaling; and
converting the target downlink subframe to a special subframe type 2 based on the PHY layer signaling if no error is detected, wherein the special subframe type 2 comprises at least an uplink pilot time slot (UpPTS).

5. The method of claim 4, wherein determining whether an error is detected is based on a set of downlink subframes that are allowed to be converted to special subframe type 2 subframes among seven TDD UL/DL configurations.

6. The method of claim 4, wherein determining whether an error is detected is based on a set of allowed transitional states between TDD UL/DL configurations.

* * * * *